US012269684B2

(12) United States Patent
Gao et al.

(10) Patent No.: US 12,269,684 B2
(45) Date of Patent: Apr. 8, 2025

(54) METHOD FOR CONTROLLING TRANSPORT ROBOT, VERTICAL SUPPORT, AND TRANSPORT ROBOT

(71) Applicant: HAI ROBOTICS CO., LTD., Guangdong (CN)

(72) Inventors: Ming Gao, Guangdong (CN); Zhe Kong, Guangdong (CN); Zaijin Li, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 376 days.

(21) Appl. No.: 17/929,418

(22) Filed: Sep. 2, 2022

(65) Prior Publication Data

US 2022/0411186 A1   Dec. 29, 2022

Related U.S. Application Data

(63) Continuation of application No. PCT/CN2021/079571, filed on Mar. 8, 2021.

(30) Foreign Application Priority Data

Mar. 9, 2020   (CN) ............................. 202010158838
Mar. 9, 2020   (CN) ............................. 202020281284
(Continued)

(51) Int. Cl.
*B65G 17/12*    (2006.01)
*B65G 1/127*    (2006.01)

(52) U.S. Cl.
CPC ............. *B65G 1/127* (2013.01); *B65G 17/12* (2013.01)

(58) Field of Classification Search
CPC ...... B65G 1/127; B65G 17/12; B65G 1/1375; B65G 43/00; B65G 1/1378; B65G 1/0492;
(Continued)

(56) References Cited

U.S. PATENT DOCUMENTS 3,876,039 A * 4/1975 Bushnell, Jr. ....... B66F 9/07559
                                                    414/785
4,600,084 A * 7/1986 Ray ......................... B66F 9/205
                                                    137/561 A
(Continued)

FOREIGN PATENT DOCUMENTS

CA          3099882 A1    12/2019
CN        101948087 A     1/2011
(Continued)

OTHER PUBLICATIONS

International search report of PCT/CN2021/079571.
(Continued)

*Primary Examiner* — Gene O Crawford
*Assistant Examiner* — Muhammad Awais
(74) *Attorney, Agent, or Firm* — Frank Gao, Esq.

(57) ABSTRACT

A vertical support for a transport robot includes a column assembly and a driving assembly. The vertical support includes a fixed column frame and a movable column frame movably arranged on the fixed column frame. The driving assembly includes a traction assembly and a retractable assembly connected to the traction assembly. The traction assembly is connected to the carrying device and configured to drive a carrying device of the transport robot to move relative to the movable column frame. The traction assembly includes two sets of traction assemblies located at two opposed sides of the carrying device respectively, the retractable assembly is configured to drive the two sets of the
(Continued)

traction assemblies to synchronously drive the carrying device to ascend or descend.

19 Claims, 71 Drawing Sheets

(30) Foreign Application Priority Data

| | | |
|---|---|---|
| Mar. 9, 2020 | (CN) | 202020281914 |
| Mar. 9, 2020 | (CN) | 202020281973 |
| Mar. 9, 2020 | (CN) | 202020282146 |
| Nov. 2, 2020 | (CN) | 202011205346 |
| Nov. 2, 2020 | (CN) | 202022498181 |
| Nov. 2, 2020 | (CN) | 202022500566 |
| Nov. 2, 2020 | (CN) | 202022501920 |
| Dec. 2, 2020 | (CN) | 202022860411 |
| Dec. 2, 2020 | (CN) | 202022866645 |

(58) Field of Classification Search
CPC . B25J 11/008; B25J 5/007; B25J 9/101; B25J 9/1666; B25J 13/089; B25J 19/0004; B25J 19/0091; B25J 19/02; B66F 9/063; B66F 9/0755; B66F 9/08
USPC .......................................... 198/801; 700/224
See application file for complete search history.

(56) References Cited

U.S. PATENT DOCUMENTS

| | | | | |
|---|---|---|---|---|
| 5,984,050 | A * | 11/1999 | Ronald | B66F 9/08 |
| | | | | 187/234 |
| 7,823,698 | B2 * | 11/2010 | Cano | B66F 9/08 |
| | | | | 187/229 |
| 9,637,310 | B1 | 5/2017 | Zou | |
| 2020/0061838 | A1 * | 2/2020 | Amacker | G06F 3/0346 |

FOREIGN PATENT DOCUMENTS

| | | | | |
|---|---|---|---|---|
| CN | 102674209 | A | | 9/2012 |
| CN | 102794759 | A | | 11/2012 |
| CN | 202964643 | U | | 6/2013 |
| CN | 103832441 | A | | 6/2014 |
| CN | 203716561 | U | | 7/2014 |
| CN | 205398017 | U | * | 7/2016 |
| CN | 106064717 | A | | 11/2016 |
| CN | 106315099 | A | | 1/2017 |
| CN | 106379703 | A | | 2/2017 |
| CN | 107021433 | A | * | 8/2017 |
| CN | 206417822 | U | | 8/2017 |
| CN | 206927553 | U | | 1/2018 |
| CN | 107651623 | A | | 2/2018 |
| CN | 207404781 | U | | 5/2018 |
| CN | 207495485 | U | | 6/2018 |
| CN | 108313932 | A | | 7/2018 |
| CN | 108910706 | A | | 11/2018 |
| CN | 109227529 | A | | 1/2019 |
| CN | 208326596 | U | | 1/2019 |
| CN | 109533850 | A | | 3/2019 |
| CN | 109753070 | A | | 5/2019 |
| CN | 110270973 | A | * | 9/2019 | B25J 19/00 |
| CN | 209338051 | U | | 9/2019 |
| CN | 110482098 | A | * | 11/2019 | B65G 1/0407 |
| CN | 209618093 | U | * | 11/2019 |
| CN | 209758195 | U | | 12/2019 |
| CN | 209797388 | U | | 12/2019 |
| CN | 209834680 | U | | 12/2019 |
| CN | 209853242 | U | | 12/2019 |
| CN | 110683485 | A | | 1/2020 |
| CN | 111232524 | A | | 6/2020 |
| CN | 111332976 | A | | 6/2020 |
| CN | 111470449 | A | | 7/2020 |
| CN | 211813282 | U | | 10/2020 |
| EP | 2404848 | A1 | | 1/2012 |
| EP | 3192616 | A1 | * | 7/2017 | B25J 11/00 |
| EP | 3556723 | A1 | | 10/2019 |
| GB | 1456911 | A | | 11/1976 |
| GB | 2015474 | A | | 9/1979 |
| GB | 2046704 | A | | 11/1980 |
| JP | S49104354 | A | | 10/1974 |
| JP | 3161159 | U | | 7/2010 |
| JP | 2019511437 | A | | 4/2019 |
| JP | 2021502940 | A | | 2/2021 |
| JP | 2023517014 | A | | 4/2023 |
| KR | 20080046380 | A | | 5/2008 |
| TW | 208953 | U | | 7/1993 |
| WO | WO-2019095803 | A1 | * | 5/2019 | B25J 13/08 |
| WO | WO2019095804 | A1 | | 5/2019 |
| WO | WO2019154433 | A2 | | 8/2019 |

OTHER PUBLICATIONS

Author Yang Fan , title of the book Civil Construction Structural Calculation, published Jan. 31, 2019, China Building Materials Industry Press, Related pp. 259-263.
Author Zhao Zhifeng, title of the book Logistics Facilities and Equipment, Published Jan. 1, 2017, Shanghai University of Finance and Economics Press Co. LTD, Related pages: the third p. of catalogue and p. 108-112.
Author Wang Jing, title of master thesis Design and Research on Intelligent Control System of Forklift, published May 7, 2016. Related pages:whole thesis.
Author Yan Wei, China academic Journal Internal Combustion Engine & Parts, 2018(23):187-189, title of the thesis Design of unmanned forklift based on Arduino, Related pages:whole thesis.
Author Chen Weiwang, title of master thesis Research on Mechanical Structure Design of Warp Beam Up and Down Transport Robot, Published Apr. 1, 2018, Related pages:whole thesis.
Author: Nie Wanfen; Chen Guanghua; Title: "Research on the Design of the Control System for the Handling Robot"; Periodical name: Modern Information Technology; Published date: Aug. 16, 2018; Related pages: Modern Information Technology vol. 2 No. 8, Full text; China.
Author: Chen Yuqi; Title: Redefining the product to person: Kubao opens a new era of box intelligent warehousing; Periodical name: ChinaLogistics&Purchasing; Published date: Dec. 16, 2019; Related pages: ChinaLogistics&Purchasing No. 24, Full text; China.

* cited by examiner

METHOD FOR CONTROLLING TRANSPORT ROBOT, VERTICAL SUPPORT, AND TRANSPORT ROBOT

CROSS-REFERENCE TO RELATED APPLICATIONS

This application is a continuation of International Patent Application No. PCT/CN2021/079571 filed on Mar. 8, 2021, which claims priority to Chinese Patent Application No. 202010158838.9, entitled "METHOD AND DEVICE FOR CONTROLLING TRANSPORT ROBOT AND TRANSPORT ROBOT" and filed with the China National Intellectual Property Administration on Mar. 9, 2020; Chinese Patent Application No. 202020282146.0, entitled "VERTICAL SUPPORT" and filed with the China National Intellectual Property Administration on Mar. 9, 2020; Chinese Patent Application No. 202020281914.0, entitled "VERTICAL SUPPORT" and filed with the China National Intellectual Property Administration on Mar. 9, 2020; Chinese Patent Application No. 202020281284.7, entitled "TRANSPORT ROBOT" and filed with the China National Intellectual Property Administration on Mar. 9, 2020; Chinese Patent Application No. 202020281973.8, entitled "TRANSPORT ROBOT" and filed with the China National Intellectual Property Administration on Mar. 9, 2020; Chinese Patent Application No. 202022501920.5, entitled "TRANSPORT ROBOT" and filed with the China National Intellectual Property Administration on Nov. 2, 2020; Chinese Patent Application No. 202022500566.4, entitled "VERTICAL SUPPORT AND TRANSPORT ROBOT" and filed with the China National Intellectual Property Administration on Nov. 2, 2020; Chinese Patent Application No. 202022498181.9, entitled "TRANSPORT ROBOT" and filed with the China National Intellectual Property Administration on Nov. 2, 2020; Chinese Patent Application No. 202011205346.7, entitled "TRANSPORT ROBOT" and filed with the China National Intellectual Property Administration on Nov. 2, 2020; Chinese Patent Application No. 202022860411.1, entitled "TRANSPORT ROBOT" and filed with the China National Intellectual Property Administration on Dec. 2, 2020; Chinese Patent Application No. 202022866645.7, entitled "TRANSPORT ROBOT" and filed with the China National Intellectual Property Administration on Dec. 2, 2020, which are incorporated herein by reference in their entireties.

TECHNICAL FIELD

This application relates to the field of intelligent warehousing, and in particular, to a method for controlling a transport robot, a vertical support, and a transport robot.

BACKGROUND

Intelligent warehousing is a step in the logistics process. The application of intelligent warehousing ensures the speed and accuracy of data input in various steps of warehouse management of goods, so as to ensure that enterprises can accurately grasp the real data of the inventory in a timely and accurate manner, and reasonably maintain and control the enterprise inventory. By means of scientific coding, batches and shelf life of inventory goods can also be conveniently managed. By using the storage location management function of the SNHGES system, current locations of all inventory goods can be grasped in time, which is conducive to improving the efficiency of warehouse management. A transport robot plays an important role in intelligent warehousing. The transport robot can receive instructions to retrieve, store, and transport goods at a specified position, which improves the efficiency of transportation in the warehouse.

Currently, fixed columns of a transport robot are fixed in height, and a carrying device can only ascend or descend within a stroke set by the fixed columns. However, when a to-be-carried goods is higher than a height of the fixed columns, the carrying device cannot carry these goods, which is inconvenient for use. In addition, the height of the transport robot cannot be adjusted, resulting in a great difficulty in transporting and shuttling in different spaces.

SUMMARY

Embodiments of this application provide a method and device for controlling a transport robot, a vertical support, and a transport robot, so that the carrying device can ascend or descend in a wider height range, providing a broader range of applications.

According to a first aspect, this application provides a method for controlling a transport robot. The transport robot includes a vertical support and a carrying device. The vertical support includes a fixed column frame and a movable column frame. The carrying device is movably arranged on the movable column frame. The movable column frame is movably arranged on the fixed column frame. The carrying device is configured to carry goods. The driving assembly includes a traction assembly and a retractable assembly connected to the traction assembly. The traction assembly is connected to the carrying device, the retractable assembly is arranged on the fixed column frame. The traction assembly is configured to drive, through the retractable assembly, at least one of: the carrying device to move relative to the movable column frame, and the movable column frame to move relative to the fixed column frame. The traction assembly includes two sets of traction assemblies located at two opposed sides of the carrying device respectively, the retractable assembly is configured to drive the two sets of the traction assemblies to synchronously drive the carrying device to ascend or descend. The method includes: receiving a movement instruction; and driving, according to the movement instruction, at least one of: the carrying device to move relative to the movable column frame, and the movable column frame to move relative to the fixed column frame.

According to a second aspect, this application provides a device for controlling a transport robot. The transport robot includes a vertical support and a carrying device. The vertical support includes a fixed column frame and a movable column frame. The carrying device is movably arranged on the movable column frame. The movable column frame is movably arranged on the fixed column frame. The carrying device is fixed on the movable column frame. In addition, the carrying device is configured to carry goods. The driving assembly includes a traction assembly and a retractable assembly connected to the traction assembly. The traction assembly is connected to the carrying device, the retractable assembly is arranged on the fixed column frame. The traction assembly is configured to drive, through the retractable assembly, at least one of: the carrying device to move relative to the movable column frame, and the movable column frame to move relative to the fixed column frame. The traction assembly includes two sets of traction assemblies located at two opposed sides of the carrying device respectively, the retractable assembly is configured to drive the two sets of the traction assemblies to synchronously drive the carrying device to ascend or descend. The device includes: a movement instruction receiving module, configured to receive a movement instruction; and a driving module, configured to drive at least one of: the carrying device to move relative to the movable column frame, and the movable column frame to move relative to the fixed column frame.

According to a third aspect, this application provides a transport robot, including: a vertical support, a carrying device, a driving assembly, at least one processor, and a memory. The vertical support includes a fixed column frame and a movable column frame, where the movable column frame is movably arranged on the fixed column frame. The carrying device is movably arranged on the movable column frame. The driving assembly, configured to drive at least one of: the carrying device to move relative to the movable column frame, and the movable column frame to move relative to the fixed column frame. The memory is communicatively connected to the at least one processor, and stores instructions executable by the at least one processor, the instructions, when executed by the at least one processor, causing the at least one processor to perform the foregoing method.

According to a fourth aspect, this application provides a vertical support for a transport robot. The transport robot includes a chassis, a goods storage device, and a carrying device. The vertical support includes: a column assembly configured to mount the goods storage device and the carrying device and a driving assembly. The column assembly includes a fixed column frame and a movable column frame, one end of the fixed column frame is configured to be mounted on the chassis of the transport robot, the movable column frame is mounted on the fixed column frame, and the movable column frame is capable of ascending or descending relative to the fixed column frame within a preset stroke. The driving assembly includes a traction assembly and a retractable assembly connected to the traction assembly. The traction assembly is connected to the carrying device. The retractable assembly is arranged on the fixed column frame. The traction assembly is configured to drive, through the retractable assembly, at least one of: the carrying device to move relative to the movable column frame, and the movable column frame to move relative to the fixed column frame. The traction assembly includes two sets of traction assemblies located at two opposed sides of the carrying device respectively, the retractable assembly is configured to drive the two sets of the traction assemblies to synchronously drive the carrying device to ascend or descend.

According to a fifth aspect, this application provides a transport robot, including a vertical support, a carrying device and a driving assembly. The vertical support includes a fixed column frame and a movable column frame movably arranged on the fixed column frame. The carrying device is movably arranged on the movable column frame. The driving assembly includes a traction assembly and a retractable assembly connected to the traction assembly. The traction assembly is connected to the carrying device, and the retractable assembly is arranged on the fixed column frame. The traction assembly comprises two sets of traction assemblies located at two opposed sides of the carrying device respectively; the retractable assembly is configured to drive the two sets of the traction assemblies to synchronously drive at least one of the carrying device and the movable column frame to ascend or descend.

The embodiments of this application provide a method and device for controlling a transport robot, a vertical support, and a transport robot. The carrying device can ascend or descend through the movable column frame. In addition, when a carrying position specified by a user is higher than a top of the movable column frame, the driving assembly can drive the carrying device and the movable column frame to ascend relative to the fixed column frame, so that the carrying device can reach the carrying position specified by the user. In addition, with different ascending or descending manners for the carrying device, the transport robot can be more widely used.

DETAILED DESCRIPTION

In order to make objectives, technical solutions, and advantages of embodiments of this application clearer, the technical solutions in the embodiments of this application are clearly and completely described below with reference to the accompanying drawings in the embodiments of this application. Apparently, the embodiments described below are merely some rather than all of the embodiments of this application. All other embodiments obtained by a person of ordinary skill in the art based on the embodiments of this application without creative efforts shall fall within the protection scope of this application.

Embodiment 1

A transport robot 100 may be applicable to an intelligent storage system, an intelligent logistics system, an intelligent sorting system, and the like. In the embodiments of this application, an example in which the transport robot 100 is applicable to an intelligent storage system is used for detailed description.

Figure 1:
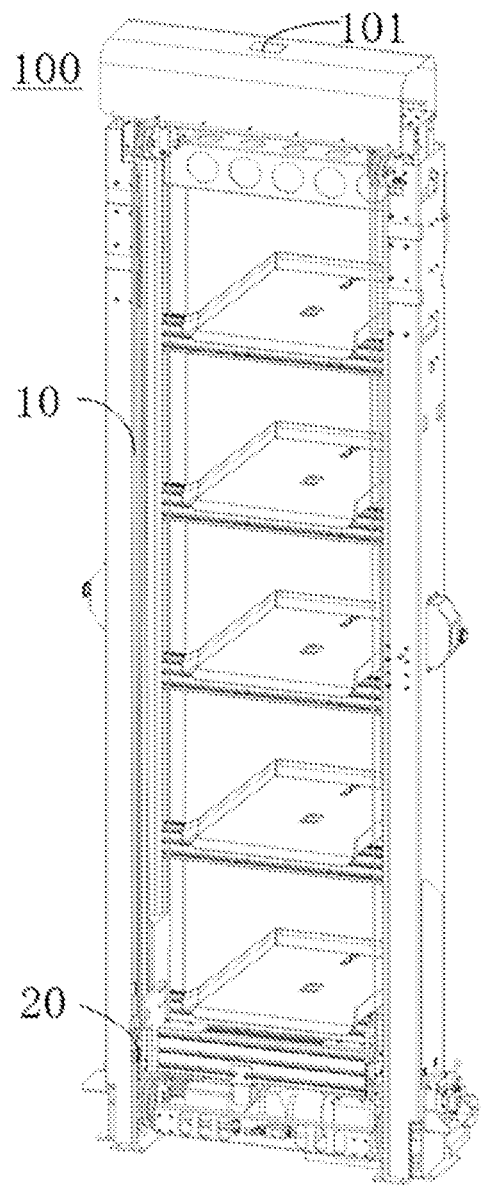
FIG. 1 is a schematic structural diagram of a transport robot according to an embodiment of this application.
Figure 2:
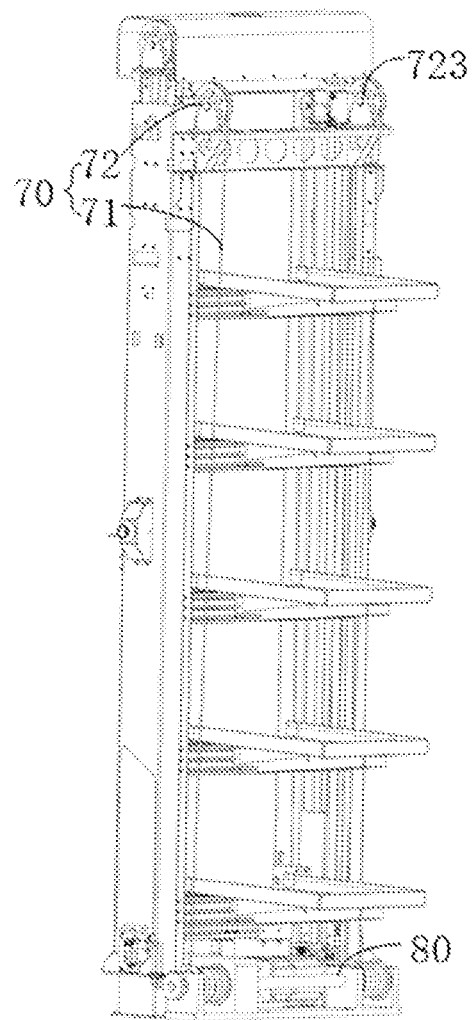
FIG. 2 is a schematic diagram of FIG. 1 viewed from another angle.

As shown in FIG. 1 and FIG. 2, the transport robot 100 according to an embodiment of this application includes a movable chassis (also referred to as a chassis not shown), a vertical support (not denoted), a carrying device (not shown), and a driving assembly (not denoted).

The vertical support includes a column assembly. The column assembly includes a fixed column frame 10 and a movable column frame 20. One end of the fixed column frame 10 is mounted on the movable chassis. The movable column frame 20 is movably mounted on the fixed column frame 10, and the movable column frame 20 is movable relative to the fixed column frame 10 along a length direction of the fixed column frame 10. The movable column frame 20 is capable of ascending or descending within a preset stroke. The carrying device is connected to the movable column frame 20, and is movable relative to the movable column frame 20 along a length direction of the movable column frame 20. The driving assembly is connected to the carrying device, and configured to drive the carrying device to move relative to the movable column frame 20 and/or the movable column frame 20 to move relative to the fixed column frame 10. The movable chassis is configured to carry the fixed column frame 10, the movable column frame 20, the carrying device (not shown), and the driving assembly. The movable chassis is used for the transport robot 100 to move on the ground, and the carrying device is used for the transport robot 100 to pick and place goods.

Figure 3:
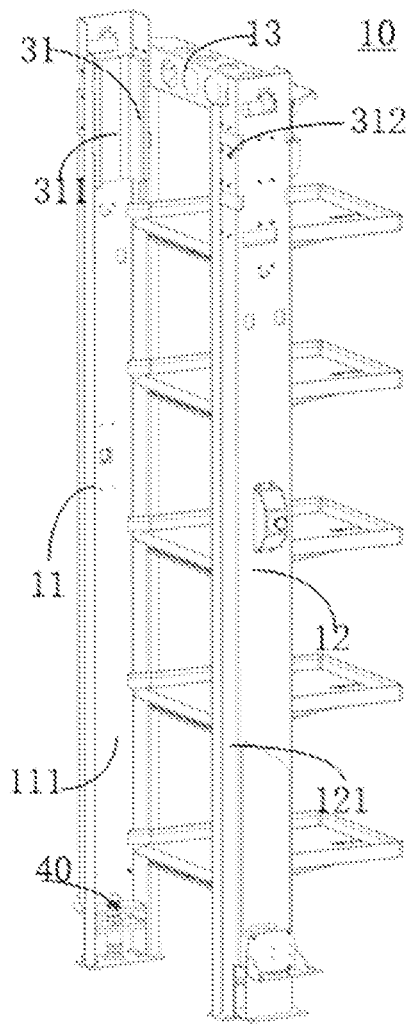
FIG. 3 is a schematic structural diagram of a fixed column frame in FIG. 1.
Figure 4:
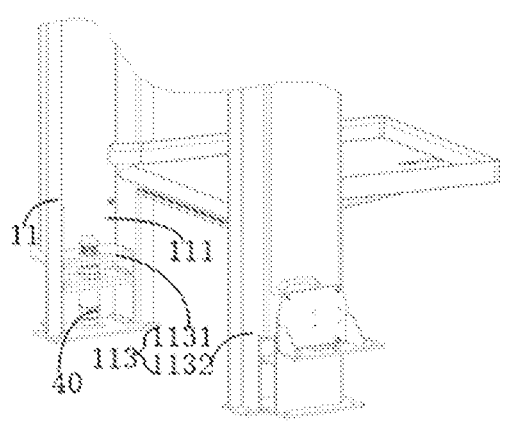
FIG. 4 is a schematic structural diagram of a part of FIG. 3.

Referring to FIG. 3 and FIG. 4, the fixed column frame 10 includes a first fixed column 11, a second fixed column 12, and a fixed beam 13. One end of the first fixed column 11 and one end of the second fixed column 12 are configured to be connected to the movable chassis, and the first fixed column 11 and the second fixed column 12 are arranged at a preset interval. Two ends of the fixed beam 13 are connected to an other end of the first fixed column 11 and an other end of the second fixed column 12 respectively. The first fixed column 11 and the second fixed column 12 are provided with a first accommodating groove 111 and a second accommodating groove 121 respectively. The movable column frame 20 is movably mounted between the first fixed column 11 and the second fixed column 12, and the movable column frame 20 is configured to move along the first fixed column 11 and the second fixed column 12.

It can be understood that a specific value of the preset interval described above is not limited, but a distance between a center axis of the first fixed column 11 and a center axis of the second fixed column 12 may be adjusted according to actual needs.

Figure 5:
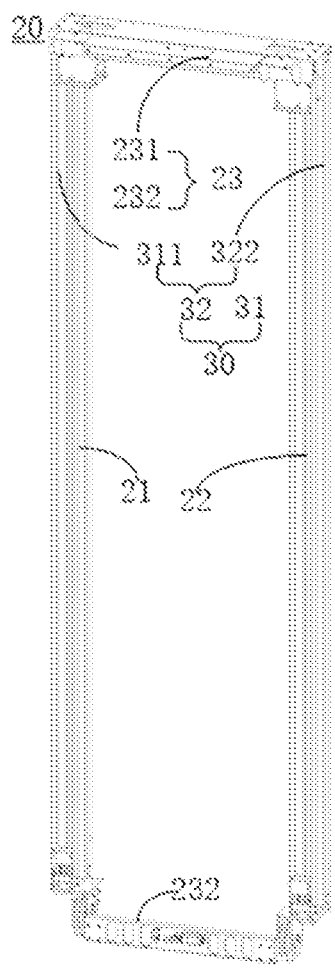
FIG. 5 is a schematic structural diagram of a movable column frame in FIG. 1.
Figure 6:
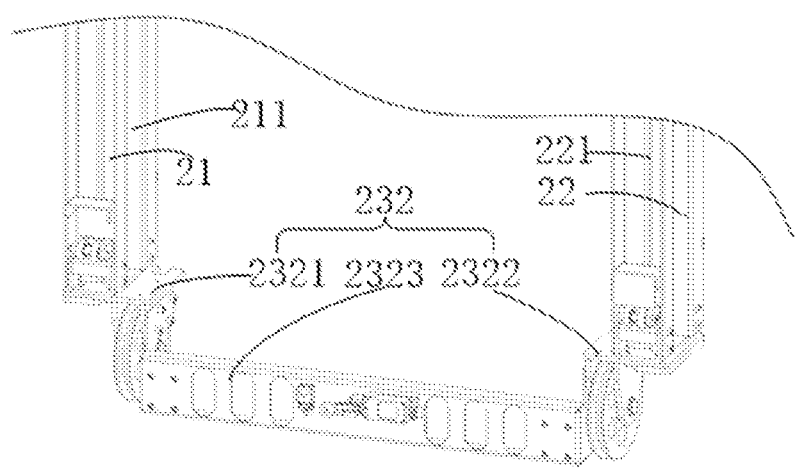
FIG. 6 is a schematic structural diagram of a part of FIG. 5.

Referring to FIG. 5 and FIG. 6, the movable column frame 20 includes a first movable column 21, a second movable column 22, and a movable beam set 23. The first movable column 21 is accommodated in the first accommodating groove 111. The first movable column 21 is movable along the first accommodating groove 111. The second movable column 22 is accommodated in the second accommodating groove 121. The second movable column 22 is movable along the second accommodating groove 121. Two ends of the movable beam set 23 are connected to the first movable column 21 and the second movable column 22 respectively, so that the first movable column 21 and the second movable column 22 can move synchronously. The first movable column 21 and the second movable column 22 are also symmetrically arranged at another preset interval, and the interval between the first movable column 21 and the second movable column 22 is less than the interval between the first fixed column 11 and the second fixed column 12.

The movable beam set 23 includes a top beam 231 and a bottom beam 232, located at two ends of the movable column frame 20 respectively. Specifically, two ends of the top beam 231 are connected to one end of the first movable column 21 and one end of the second movable column 22 respectively, and two ends of the bottom beam 232 are connected to an other end of the first movable column 21 and an other end of the second movable column 22 respectively. The bottom beam 232 includes a first bent plate 2321, a second bent plate 2322, and a beam bar 2323. Two ends of the beam bar 2323 are connected to one end of the first bent plate 2321 and one end of the second bent plate 2322 respectively. An other end of the first bent plate 2321 and an other end of the second bent plate 2322 are connected to one end of the first movable column 21 and one end of the second movable column 22 respectively.

Referring to FIG. 3 and FIG. 5, in some embodiments, the vertical support further includes a guide assembly 30. The guide assembly 30 includes a guide block 31 and a guide rail 32. The guide block 31 includes a first guide block 311 and a second guide block 312. The guide rail 32 includes a first guide rail 321 and a second guide rail 322. The first guide block 311 and the second guide block 312 are mounted at a groove bottom of the first accommodating groove 111 and a groove bottom of the second accommodating groove 121 respectively. The first guide rail 321 and the second guide rail 322 are arranged on a side wall of the first movable column 21 and a side wall of the second movable column 22 respectively. The guide block 31 is configured to slide relative to the guide rail 32, so that the movable column frame 20 can ascend or descend relative to the fixed column frame 10 within a preset stroke. In this way, the movable column frame 20 can extend or retract relative to the fixed column frame 10 within a preset stroke set by the guide rail 32.

It should be noted that the preset stroke is determined by the guide rail 32. In this embodiment, the guide block 31 is located at one end of the fixed column frame 20 away from the movable chassis, and is close to a top end of the fixed column frame 20, so as to prevent the guide block 31 from being separated from the guide rail 32 when the movable column frame 20 has not extended to a highest position.

In some embodiments, the first guide block 311 and the second guide block 312 are mounted on a side wall of the first movable column 21 and a side wall of the second movable column 22 respectively. The first guide rail 321 and the second guide rail 322 are arranged at a groove bottom of the first accommodating groove 111 and a groove bottom of the second accommodating groove 121 respectively. The guide block 31 is configured to slide relative to the guide rail 32, so that the movable column frame 20 can ascend or descend relative to the fixed column frame 10 within a preset stroke. In this embodiment, the first guide block 311 and the second guide block 312 are arranged at one end of the first movable column 21 and one end of the second movable column 22 that are close to the movable chassis respectively, so that when the movable column frame 20 has not moved to the highest position of the preset stroke, the guide block 31 is always engaged with and does not detach from the guide rail 32.

Referring to FIG. 4, the vertical support further includes a main shock absorbing member 40. The main shock absorbing member 40 is mounted at one end of the fixed column frame 10 close to the movable chassis, and located below the movable column frame 20. When the movable column frame 20 descends to a lowest point of the preset stroke of ascending and descending, the movable column frame 20 abuts against the main shock absorbing member 40. The main shock absorbing member 40 is configured to buffer an impact force generated when the movable column frame 20 descends.

It should be noted that the main shock absorbing member 40 is located below the movable column frame 20, and takes a plane in contact with the chassis or a plane on which the vertical support is fixedly mounted as a reference plane. Comparing vertical distances from centers of gravity of two objects to the plane, an object close to the reference plane is located below an object farther away from the reference plane.

In some embodiments, the fixed column frame 10 further includes a limit baffle 113. The limit baffle 113 includes a first limit baffle 1131 and a second limit baffle 1132. The first limit baffle 1131 and the second limit baffle 1132 are mounted at one end of the first fixed column 11 and one end of the second fixed column 12 respectively. The first limit baffle 1131 and the second limit baffle 1132 are detachably mounted with the main shock absorbing member 40. When one end of the movable column frame 20 abuts against the main shock absorbing member 40, the movable column frame 20 descends to the lowest point of the preset stroke. It can be understood that the main shock absorbing member 40 may be a spring, a shock absorber, or even a silicone buffer piece. Preferably, the main shock absorbing member 40 is a shock absorber. Specifically, during use, the first limit baffle 1131 and the second limit baffle 1132 are provided with through holes (not denoted), and a telescopic end of the shock absorber extends from the through holes and is configured to abut against the movable column frame 20. When the movable column frame 20 descends and abuts against the telescopic end of the shock absorber, the telescopic end is pushed and gradually retracts inward, thereby gradually reducing an impact force generated when the movable column frame 20 descends, so as to avoid direct and rigid collision of the movable column frame 20 with the fixed column frame 10.

Figure 7:
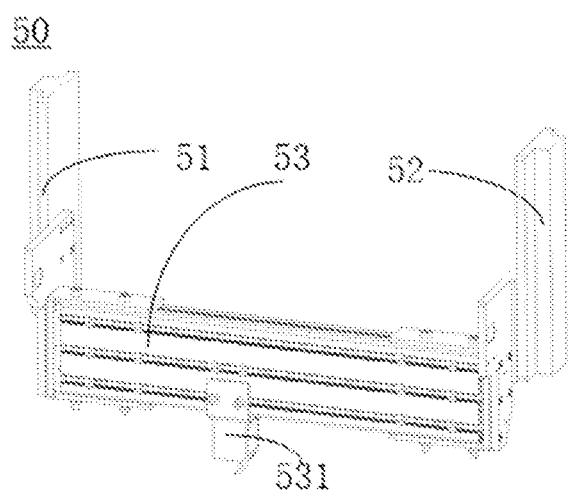
FIG. 7 is a schematic structural diagram of a fork mounting assembly in FIG. 1.

Referring to FIG. 6 and FIG. 7, in some embodiments, the vertical support further includes a fork mounting assembly 50. The fork mounting assembly 50 includes a first sliding block 51, a second sliding block 52, and a connection block 53. A first slide rail 211 is arranged at a side of the first movable column 21 away from the first fixed column 11. A second slide rail 221 is arranged at a side of the second movable column 22 away from the second fixed column 12. The first sliding block 51 is movably mounted on the first slide rail 211. The second sliding block 52 is movably mounted on the second slide rail 221. Two ends of the connection block 53 are detachably connected to the first sliding block 51 and the second sliding block 52 respectively, and a blocking piece 531 is arranged on the connection block 53. Specifically, during use, when the fork mounting assembly 50 is pulled along an axial direction of the fixed column frame 10, the first sliding block 51 and the second sliding block 52 slide along the first slide rail 211 and the second slide rail 221 respectively, so that the fork mounting assembly 50 ascends or descends within the preset stroke of ascending or descending. In this embodiment, the carrying device is mounted on the fork mounting assembly 50, and the carrying device can ascend or descend synchronously through the fork mounting assembly 50, so that the transport robot can carry goods.

Figure 8:
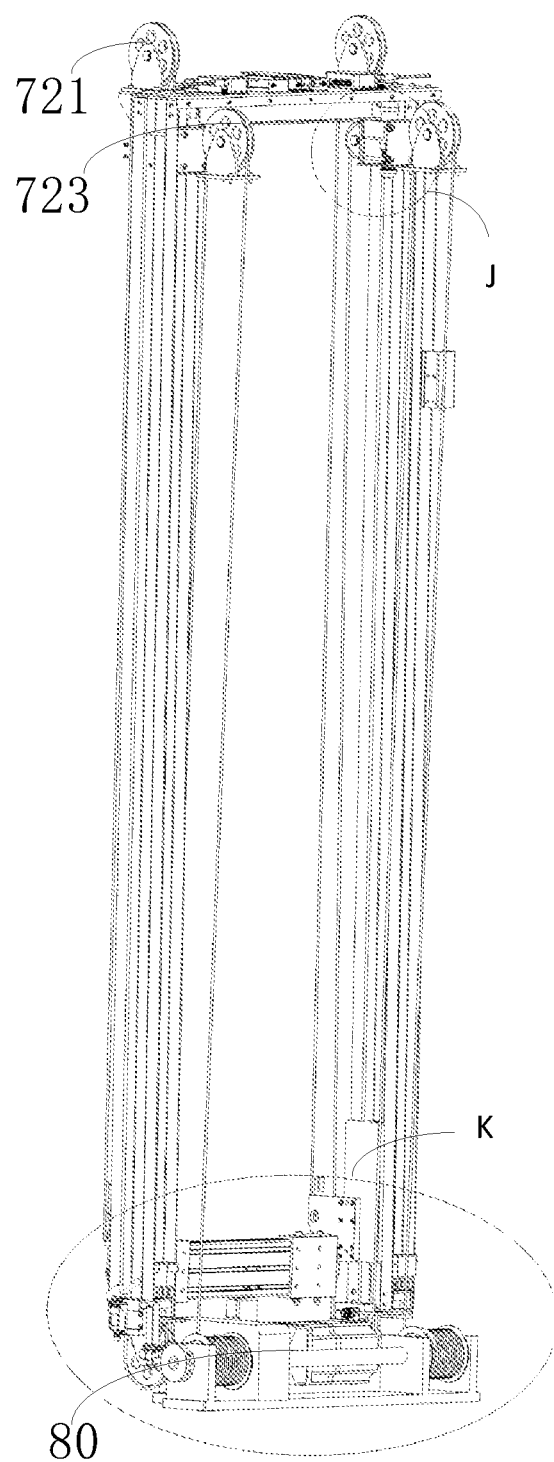
FIG. 8 is a schematic structural diagram of a part of FIG. 1.
Figure 9:
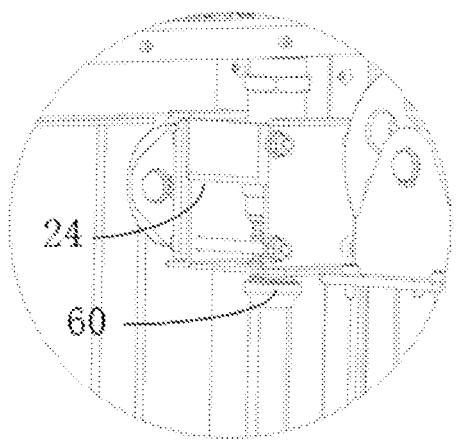
FIG. 9 is a partial enlarged view at J of FIG. 8.
Figure 10:
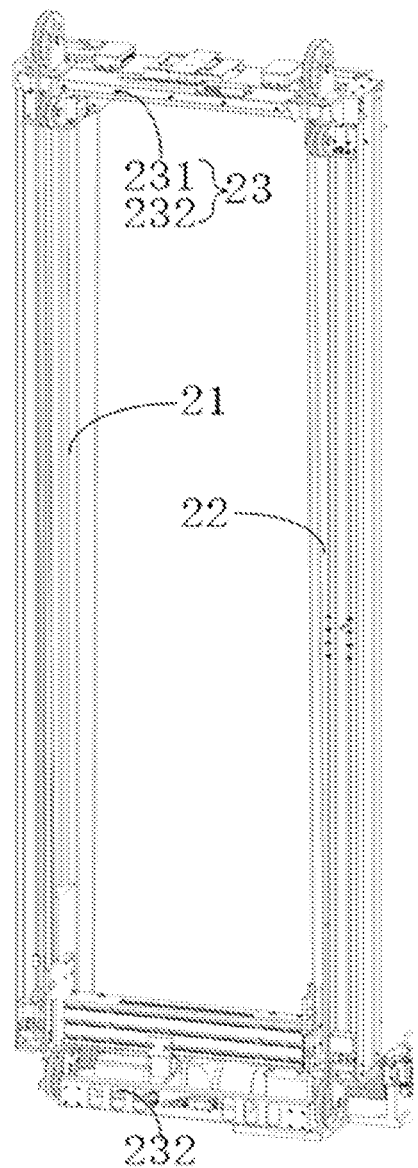
FIG. 10 is a schematic structural diagram of a part of FIG. 1.
Figure 11:
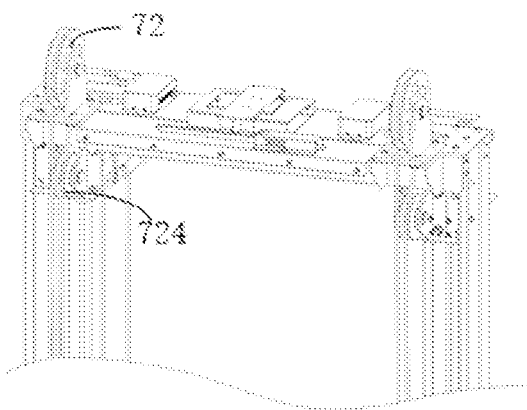
FIG. 11 is a schematic structural diagram of a part of FIG. 10.
Figure 12:
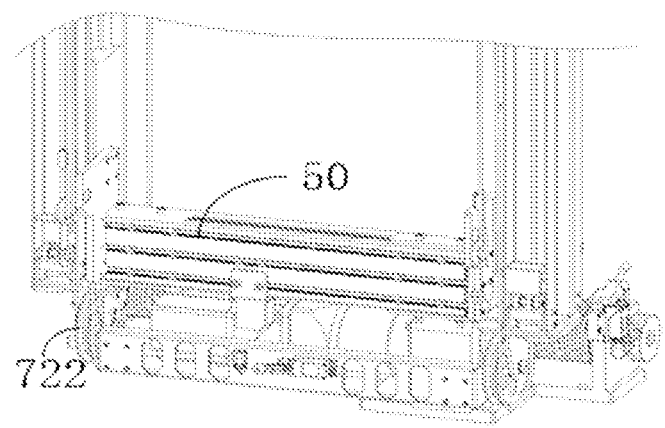
FIG. 12 is a schematic structural diagram of another part of FIG. 10.

As shown in FIG. 8 and FIG. 9, in some embodiments, the vertical support further includes a secondary shock absorbing member 60. The secondary shock absorbing member 60 is mounted at one end of the movable column frame 20 away from the movable chassis, and configured to avoid violent collision of the fork mounting assembly 50 with the movable column frame 20. Similarly, the secondary shock absorbing member 60 may be a spring, a shock absorber, or even a silicone buffer piece. Preferably, the secondary shock absorbing member 60 is a shock absorber.

During use, an opening cover 24 is arranged at one end of the first movable column 21 and one end of the second movable column 22 that are away from the movable chassis. Specifically, the opening cover 24 is arranged at one end of the first slide rail 211 and one end of the second slide rail 221, one end of the opening cover 24 facing the movable chassis is provided with an opening, the shock absorber is mounted in the opening cover 24, and the telescopic end of the shock absorber extends through the opening, and is configured to abut against the fork mounting assembly 50. When the first sliding block 51 and the second sliding block 52 ascend to the highest position along the first slide rail 211 and the second slide rail 221 respectively, the first sliding block 211 and the second sliding block 221 abut against the secondary shock absorbing member 60 respectively, so as to avoid rigid collision of the movable column frame 20 with the first sliding block 211 and the second sliding block 221.

In some embodiments, the vertical support further includes a stroke switch (not denoted). The stroke switch is mounted at one end of the movable column frame 20 close to the movable chassis. When the fork mounting assembly 50 descends to the lowest position of the movable column frame 20, the blocking piece 531 abuts against the stroke switch, and at this time, the fork mounting assembly 50 descends to a lower limit position of the preset stroke of ascending and descending, that is, the lowest position that the fork mounting assembly 50 can descend to.

Referring to FIG. 2, FIG. 8, and FIG. 10 to FIG. 13, in some embodiments, the driving assembly (not denoted) described above includes a traction assembly 70 and a retractable assembly 80. The traction assembly 70 includes a traction rope 71 and a guide wheel set 72. One end of the traction rope 71 winds around the guide wheel set 72 and is tied to the retractable assembly 80. The retractable assembly 80 retracts or releases the traction rope 71, so that the movable column frame 20 ascends or descends relative to the fixed column frame 10. It can be understood that, in order to enable the movable column frame 20 to ascend or descend relative to the fixed column frame 10, an other end of the traction rope 71 is directly or indirectly tied to the movable column frame 20, so that the movable column frame 20 receives a traction force of the traction rope 71 to ascend or descend. In this embodiment, an other end of the traction rope 71 is tied to the fork mounting assembly 50. When the fork mounting assembly 50 ascends to a top end of the movable column frame 20, the retractable assembly 80 continues to retract the traction rope 71. At this time, the fork mounting assembly 50 ascends synchronously against the movable column frame 20, so that the traction rope 71 indirectly completes traction of the movable column frame 20.

The traction rope 71 may be a steel wire rope made of steel wire or a nylon rope. Preferably, the traction rope 71 is a steel wire rope, so as to ensure that when the fork mounting assembly 50 ascends or descends, the traction rope 71 does not break due to excessively heavy goods carried by a fork.

The guide wheel set 72 includes a top pulley 721, a bottom pulley 722, and a main pulley 723. The top pulley 721 is detachably mounted at one end of the movable column frame 20 away from the movable chassis. The bottom pulley 722 is detachably mounted at an other end of the movable column frame 20. The main pulley 723 is mounted at one end of the fixed column frame 10 away from the movable chassis. Specifically, in this embodiment, the top pulley 721 is mounted on the top beam 231. The bottom pulley 722 is mounted on the bottom beam 232. The main pulley 723 is mounted on the fixed beam 13. One end of the traction rope 71 is tied to the retractable assembly 80 after sequentially winding around the top pulley 721, the bottom pulley 722, and the main pulley 723. An other end of the traction rope 71 is tied to the fork mounting assembly 50. In this way, when the retractable assembly 80 retracts the traction rope 71, the traction rope 71 can directly pull the fork mounting assembly 50 to ascend or descend.

In some embodiments, the guide wheel set 72 further includes a tension pulley 724, detachably mounted at the end of the movable column frame 20 away from the movable chassis, and located between the top pulley 721 and the bottom pulley 722. Specifically, the tension pulley 724 is against the traction rope 71, that is, one end of the traction rope 71 first winds around the top pulley 721, then winds around the tension pulley 724, and finally winds around the bottom pulley 722, so as to prevent the traction rope 71 from being overtightened and directly broken.

Figure 13:
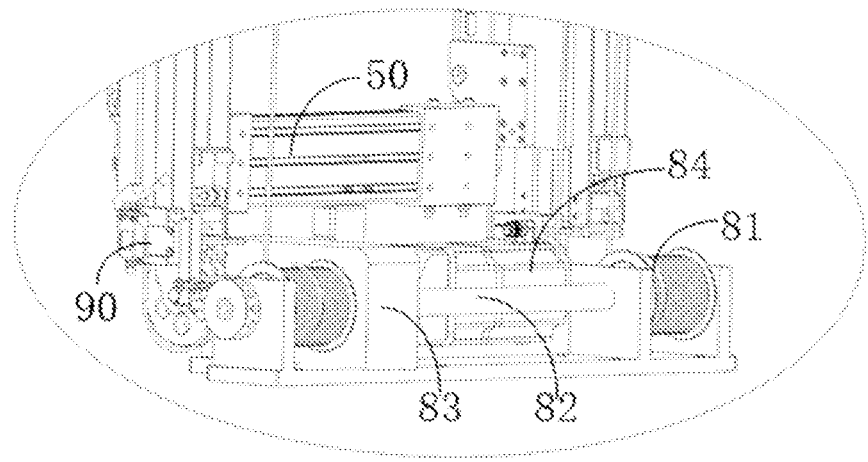
FIG. 13 is a schematic structural diagram at K of FIG. 8.

Referring to FIG. 13, in some embodiments, the retractable assembly 80 includes a spool 81, a transmission shaft 82, a speed control box 83, and a motor 84. The spool 81 is configured to wind the traction rope 71. An output shaft of the motor 84 is connected to an input end of the speed control box 83. An output end of the speed control box 83 is connected to the transmission shaft 82. The speed control box 83 is configured to adjust a rotation speed of the transmission shaft 82. One end of the transmission shaft 82 is connected to the spool 81. Specifically, during use, the motor 84 operates, so that the transmission shaft 82 rotates, and the spool 81 is driven to rotate clockwise or counterclockwise, to release or retract the traction rope 71. In this way, the fork mounting assembly 50 is controlled to ascend or descend, and the movable column frame 20 extends or retracts relative to the fixed column frame 10.

During specific use, the fork mounting assembly 50 and the movable column frame 20 are at initial positions, that is, at lowest positions of the preset stroke. When the motor is started, the spool 81 starts to wind the traction rope 71, and the fork mounting assembly 50 tied to one end of the traction rope 71 gradually ascends. When the fork mounting assembly 50 ascends to the highest position of the preset stroke of ascending and descending, the secondary shock absorbing member 60 abuts against the fork mounting assembly 50, and at this time, the fork mounting assembly 50 stops ascending. When the motor continues to work, the spool 81 continues to wind, and at this time, the fork mounting assembly 50 ascends relative to the fixed column frame 10 against the movable column frame 20. When the guide block 31 is about to be separated from the guide rail 32, the movable column frame 20 ascends to the highest point. According to another aspect, when the motor rotates reversely, the spool releases the traction rope, and the movable column frame 20 gradually descends along an axial direction of the fixed column frame 10. When the movable column frame 20 abuts against the main shock absorbing member 40, the movable column frame 20 stops descending, the spool continues to release the retraction rope 71, and the fork mounting assembly 50 starts to descend. When the fork mounting assembly 50 touches the stroke switch, the fork mounting assembly 50 descends to the lowest point, and at this time, the motor is controlled to stop rotating.

In some embodiments, the vertical support further includes a storage device (not denoted), mounted on the fixed column frame 10. Specifically, the fixed column frame 10 is provided with a plurality of mounting beams (not denoted) at preset intervals. The storage device is mounted on the mounting beams, and is configured to store goods carried by the carrying device.

In some embodiments, the carrying device includes a tray and a carrying component. The tray is configured to store goods. The carrying component is configured to push out the goods stored on the storage device, or pull the goods on the storage device to the tray, so that the carrying device carries the goods to storage devices at different heights.

Referring to FIG. 1 again, in some embodiments, the transport robot 100 further includes a first detector 101. The first detector 101 is mounted at the end of the movable column frame 20 away from the movable chassis. The first detector 101 is connected to the driving assembly. The first detector 101 is configured to detect a distance between the movable column frame 20 and a building above the movable column frame.

Specifically, the first detector 101 is mounted on the top beam 231 of the movable column frame 20. The first detector 101 is connected to the motor 84 of the driving assembly. The first detector 101 can move with the movable column frame 20 and detect the distance between the top end of the movable column frame 20 and the building above the movable column frame in real time. When a real-time distance detected by the first detector 101 is less than a preset value, the first detector 101 controls the motor 84 of the driving assembly to suspend work, so as to avoid that the movable column frame 20 continues to move towards the building above the movable column frame and a collision is caused, and avoid that the transport robot 100 causes damage and a safety accident.

In some embodiments, the transport robot further includes a second detector (not shown). The second detector is connected to the motor 84 of the driving assembly. The second detector is configured to detect two limit positions of the movable column frame 20 moving relative to a length direction of the fixed column frame 10, so as to control stop or start of the motor 84. The two limit positions are respectively an upper limit position to which the movable column frame 20 can move away from the movable chassis along the length direction of the fixed column frame 10, and a lower limit position to which the movable column frame 20 can move toward the movable chassis along the length direction of the fixed column frame 10. In a specific implementation, the second detector may be a ranging sensor. The ranging sensor may be directly mounted at one end of the fixed column frame 10 close to the movable chassis and opposite to a bottom surface of the movable column frame 20. Alternatively, the second detector may be a stroke switch set. The stroke switch set includes a first stroke switch and a second stroke switch, the first stroke switch is mounted at one end of the fixed column frame 10 close to the movable chassis, the second stroke switch is mounted at one end of the fixed column frame 10 away from the movable chassis, and one end of the movable column frame 20 corresponding to the first stroke switch is provided with a bump. When the movable column frame 20 moves to the lower limit position, the bump triggers the first stroke switch, and when the movable column frame 20 moves to the upper limit position, the bump triggers the second stroke switch.

In some embodiments, the transport robot 100 further includes a sensing device (not shown). The sensing device is configured to sense whether there is an obstacle in front of the transport robot 100. The sensing device may be a sensor such as a photoelectric sensor, or a camera detection sensor, or a combination of the two. It can be understood that the sensing device may be mounted on the vertical support of the transport robot, or on the movable chassis of the transport robot, or at another position of the transport robot, as long as it does not affect the carrying of goods by the carrying device and the ascending and descending of the movable column frame.

Figure 14:
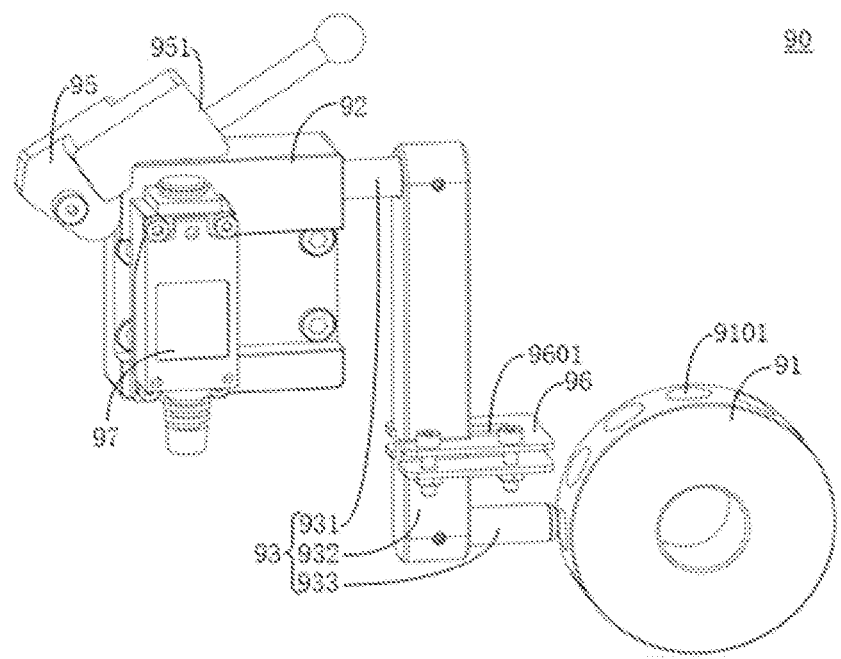
FIG. 14 is a schematic structural diagram of a braking device of FIG. 13.
Figure 15:
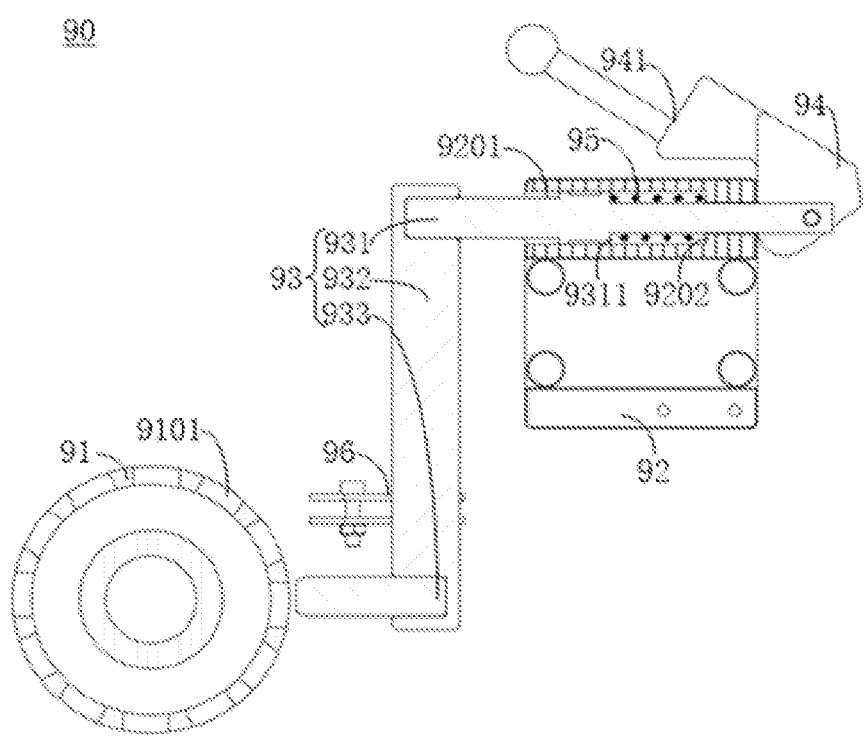
FIG. 15 is a sectional view of the braking device of FIG. 14.

Referring to FIG. 13 to FIG. 15, in some embodiments, the transport robot 100 further includes a braking device 90. The braking device 90 is configured to brake the movable column frame 20, so that the movable column frame 20 stops moving relative to the fixed column frame 10. By arranging the braking device 90, on the one hand, emergency braking can be implemented during the transporting work of the transport robot 100, and on the other hand, the driving assembly of the transport robot 100 can be prevented from being activated by mistake.

The braking device 90 includes a brake disc 91, a guide base 92, and a stopper 93.

The brake disc 91 is connected to the driving assembly, an output end of the driving assembly can drive the brake disc 91 to rotate, and the brake disc 91 can brake the output end of the driving assembly. The brake disc 91 is provided with at least one pin hole 9101, the guide base 92 is mounted on the fixed column frame 10, the guide base 92 is provided with a slot 9201, the stopper 93 is movably inserted into the slot 9201, and the stopper 93 is movable along the slot 9201, so that one end of the stopper 93 is inserted into or disengaged from the pin hole 9101, thereby preventing the brake disc 91 from rotating or releasing the restriction on the brake disc 91. When one end of the stopper 93 is inserted into the pin hole 9101, the brake disc 91 implements the braking of the output end of the driving assembly, so that the driving assembly stops driving.

In this embodiment, the brake disc 91 is connected to the spool 81 and arranged coaxially with the spool 81. The brake disc 91 can rotate with the spool 81. In addition, at least one pin hole 9101 is provided along a circumferential side wall of the brake disc 91, that is, the pin hole 9101 is provided radially on the brake disc 91. The stopper 93 is arranged at one side of the circumferential side wall of the brake disc 91. When the brake disc 91 rotates, one end of the stopper 93 can be aligned with any pin hole 9101 on a side wall of the brake disc 91 and inserted into the pin hole 9101.

The braking device 90 further includes a cam 94. The cam 94 is located at one side of the guide base 92 away from the brake disc 91. One end of the stopper 93 away from the brake disc 91 is rotatably connected to the cam 94. A wheel surface of the cam 94 is configured to abut against a surface of the guide base 92 facing away from the brake disc 91, so that the cam 94, when rotating, drives the stopper 93 to move along the slot 9201.

The braking device 90 further includes an elastic member 95. One end of the elastic member 95 is connected to the stopper 93. An other end of the elastic member 95 is connected to the guide base 92 or the fixed column frame 10. The elastic member 95 is configured to provide an elastic force for the cam 94 to abut against the guide base 92 and for the stopper 93 to maintain stationary. The elastic member 95 is a compression spring. Certainly, the elastic member 95 may alternatively be another component with an elastic force, such as a leaf spring, or the like.

In this embodiment, the stopper 93 includes a first latch 931, a connection rod 932, and a second latch 933. The first latch 931 is movably inserted into the slot 9201. One end of the first latch 931 away from the brake disc 91 is connected to the cam 94. One end of the connection rod 932 is connected to an other end of the first latch 931. A retaining ring 9311 protrudes and is arranged at a middle portion between two ends of the first latch 931. An abutting portion 9202 protrudes and is arranged on a slot wall of the slot 9201. The abutting portion 9202 is located between the retaining ring 9311 and the cam 94. The elastic member 95 is sleeved on the first latch 931, and the elastic member 95 is configured to abut between the retaining ring 9311 and the abutting portion 9202. That is, the elastic member 95 is elastically compressed between the retaining ring 9311 and the abutting portion 9202, and the elastic member 95 always maintains in an elastically compressed state. An other end of the connection rod 932 is connected to one end of the second latch 933, and the first latch 931 is movable along the slot 9201, so that an other end of the second latch 933 is inserted into or disengaged from the pin hole 9101. Preferably, the first latch 931 and the second latch 933 are arranged vertically with the connection rod 932.

The braking device 90 further includes a guide member 96. The guide member 96 is mounted on the fixed column frame 10. The guide member 96 is provided with a guide groove 9601. The connection rod 932 passes through the guide groove 9601. The connection rod 932 can slide along the guide groove 9601, so as to prevent the first latch 931 from rotating when the first latch 931 moves along the slot 9201.

In some embodiments, the stopper 93 may alternatively be of another shape, such as an inline pin structure.

A wrench 941 is arranged on the cam 94, and the cam 94 can be rotated by turning the wrench 941, so that the driving assembly stops working. It can be understood that, according to actual situations, the cam 94 may alternatively be arranged and driven to rotate through driving the motor, so as to implement the braking of the movable column frame 20.

The braking device 90 further includes a third detector 97. The third detector 97 is configured to detect whether one end of the stopper 93 is inserted into the pin hole 9101. The third detector 97 is connected to the motor 84 of the driving assembly, so as to control the start and stop of the motor 84.

Specifically, the third detector 97 is a stroke switch. The stroke switch is mounted on the guide base 92. A bump of the stroke switch is arranged toward a side of the wrench 941. When the wrench 941 is turned to enable the second latch 933 to be disengaged from the pin hole 9101, the wrench 941 comes into contact with the bump of the stroke switch. When the wrench 941 is turned to enable the second latch 933 to be inserted into the pin hole 9101, the wrench 941 is separated from the bump of the stroke switch.

Embodiment 2

Figure 16:
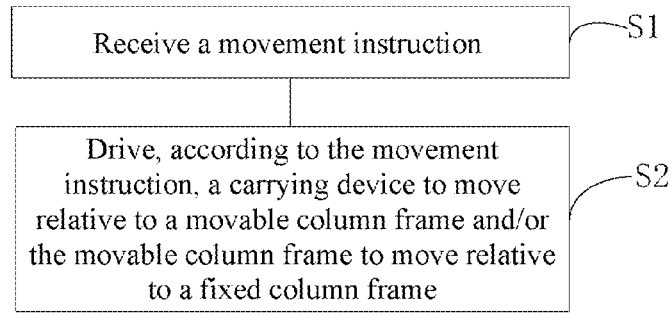
FIG. 16 is a block diagram of a flowchart of a method for controlling a transport robot according to Embodiment 1 of this application.

This embodiment of this application provides a method for controlling a transport robot. The structure and function of the transport robot are the same as those of the transport robot described above. For the structure and function of the transport robot, reference may be made to the foregoing embodiments. Details are not described herein again. Specifically, referring to FIG. 16, the method includes the following operations.

Operation S1: Receive a movement instruction.

The movement instruction refers to a control instruction of a series of movements performed by the transport robot to transport goods, for example: controlling the carrying device to ascend or descend relative to the movable column frame, or controlling the movable column frame to ascend or descend relative to the fixed column frame, or controlling the carrying device and the movable column frame to ascend or descend simultaneously.

Operation S2: Drive, according to the movement instruction, a carrying device to move relative to a movable column frame and/or the movable column frame to move relative to a fixed column frame.

The movement instruction carries a movement direction and a movement height. After receiving the movement instruction, the transport robot drives, according to the movement direction, the carrying device and/or the movable column frame to move until the carrying device reaches the movement height.

In some embodiments, the movement instruction may be an instruction carrying a final height. After receiving the movement instruction, the transport robot may first identify a current height of the carrying device thereof, determine a movement direction and a movement distance according to the current height and a required height indicated by the movement instruction, and then control the carrying device to move. It can be understood that, according to the movement instruction, the carrying device and/or the movable column frame are driven to move, and there is no limitation on a movement sequence. That is, the carrying device may be driven to move relative to the movable column frame first, and then the movable column frame is driven to move relative to the fixed column frame; or the movable column frame may be driven to move relative to the fixed column frame first, and then the carrying device is driven to move relative to the movable column frame; or the carrying device and the movable column frame move simultaneously.

Figure 17:
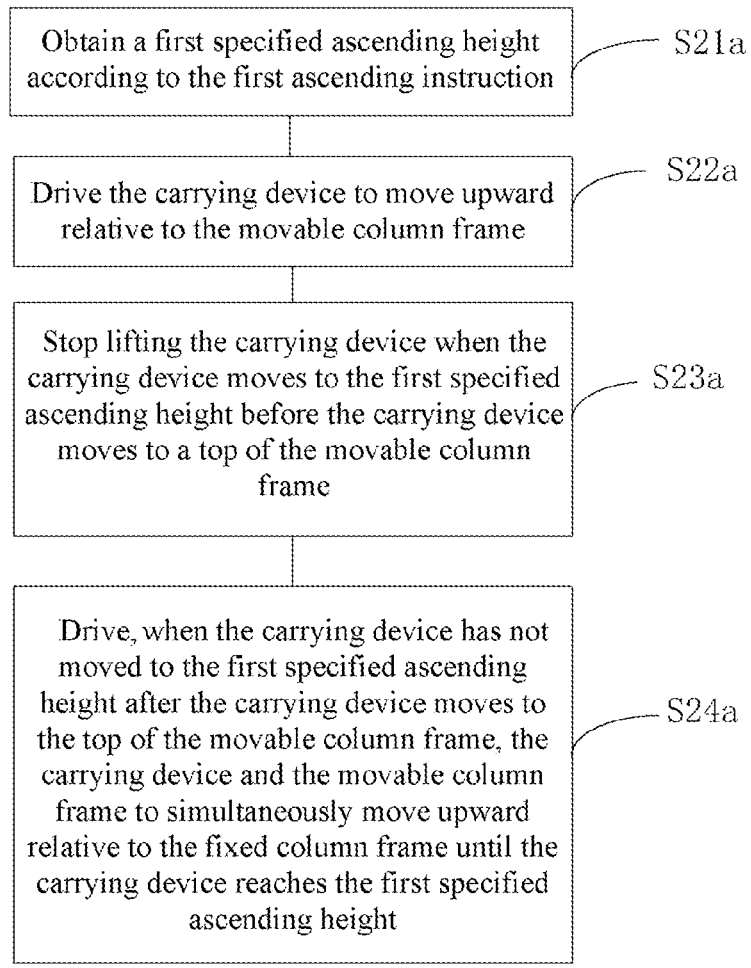
FIG. 17 is a detailed flowchart of an ascending process of operation S2 in a method for controlling a transport robot according to Embodiment 1 of this application.

In some embodiments, the movement instruction includes a first ascending instruction. As shown in FIG. 17, operation S2 includes the following operations:

Operation S21*a*: Obtain a first specified ascending height according to the first ascending instruction.

The first specified ascending height refers to a height difference between a specified carrying position and a current position of the carrying device after a user designates the carrying device to ascend to the specified carrying position according to needs thereof. The transport robot can calculate a height that the carrying device needs to ascend to the specified position through a server, and then the server converts a required ascending height into a corresponding control signal and feeds back the control signal to the transport robot. The transport robot ascends according to a corresponding parameter in the obtained control signal, so as to reach the specified ascending height.

Operation S22*a*: Drive the carrying device to move upward relative to the movable column frame.

Operation S23*a*: Stop lifting the carrying device when the carrying device moves to the first specified ascending height before the carrying device moves to a top of the movable column frame.

Operation S24*a*: Drive, when the carrying device has not moved to the first specified ascending height after the carrying device moves to the top of the movable column frame, the carrying device and the movable column frame to simultaneously move upward relative to the fixed column frame until the carrying device reaches the first specified ascending height.

When the specified carrying position is not higher than the top of the movable column frame, it means that the specified carrying position is within a stroke range of the carrying device moving relative to the movable column frame, the carrying device can be directly controlled to ascend relative to the movable column frame until the carrying device moves to the first specified ascending height, and then the lifting of the carrying device is stopped.

However, when the specified carrying position is higher than the top of the movable column frame, and because the specified carrying position exceeds a highest position that the carrying device can move within the movable column frame, at this time, it is impossible to reach the required carrying position of the user only by moving the carrying device. Therefore, after the carrying device moves to the highest position of the movable column frame, the movable column frame can be controlled to ascend relative to the fixed column frame. When the carrying device ascends to the specified carrying position, that is, the first specified ascending height, the movable column frame stops ascending.

Figure 18:
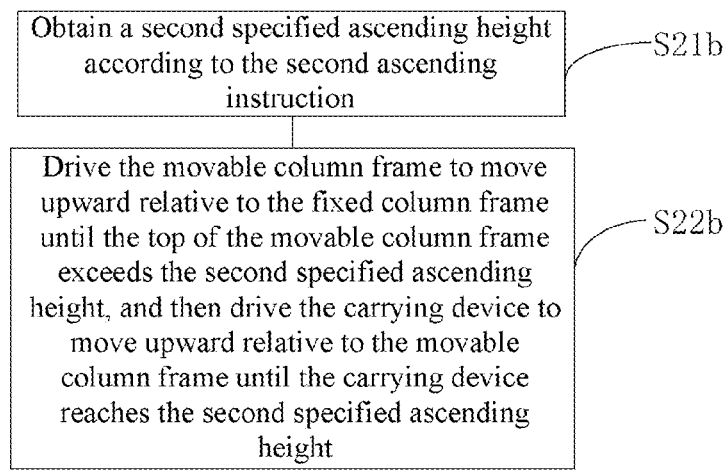
FIG. 18 is another detailed flowchart of an ascending process of operation S2 in a method for controlling a transport robot according to Embodiment 1 of this application.

In some embodiments, the movement instruction further includes a second ascending instruction. As shown in FIG. 18, S2 includes the following operations:

Operation S21*b*: Obtain a second specified ascending height according to the second ascending instruction.

Operation S22*b*: Drive the movable column frame to move upward relative to the fixed column frame until the top of the movable column frame exceeds the second specified ascending height, and then drive the carrying device to move upward relative to the movable column frame until the carrying device reaches the second specified ascending height.

A difference between this embodiment and the foregoing embodiment is that: in this embodiment, the movable column frame is driven to move first, and then the carrying device is driven to move. Certainly, when the movable column frame is driven to move, the carrying device may maintain stationary with respect to the movable column frame, or may follow the movable column frame to move. Certainly, in order to implement that when the movable column frame is driven to move, the carrying device may maintain stationary with respect to the movable column frame, or may follow the movable column frame to move. An arrangement manner of the driving assembly in the transport robot may also be different. For example, two independent driving assemblies is arranged in the transport robot. One driving assembly is configured to drive the movable column frame to ascend relative to the fixed column frame, which may be driven by a combination of components such as the traction rope, the spool, and the motor in the foregoing embodiment. The other driving assembly is configured to drive the carrying device to ascend relative to the movable column frame. For example, an air cylinder may be configured for driving. In this case, the air cylinder is mounted on the movable column frame, and an extension end of the air cylinder is connected to the carrying device. Two independent sets of driving assemblies are used for independent control, and do not affect each other.

Figure 19:
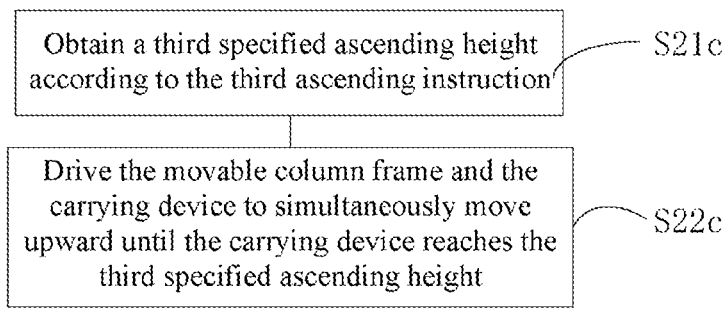
FIG. 19 is still another detailed flowchart of an ascending process of operation S2 in a method for controlling a transport robot according to Embodiment 1 of this application.

In some embodiments, the movement instruction further includes a third ascending instruction. As shown in FIG. 19, a third ascending manner of the carrying device is as follows:

Operation S21c: Obtain a third specified ascending height according to the third ascending instruction.

Operation S22c: Drive the movable column frame and the carrying device to simultaneously move upward until the carrying device reaches the third specified ascending height.

It can be understood that, the movable column frame and the carrying device of the transport robot simultaneously move upward until the carrying device reaches the third specified ascending height. The movable column frame and the carrying device may ascend at different speeds, or may ascend synchronously at the same speed. When the carrying device reaches the third specified ascending height, the driving assembly stops driving, so that the carrying device is at the carrying position specified by the user.

Figure 20:
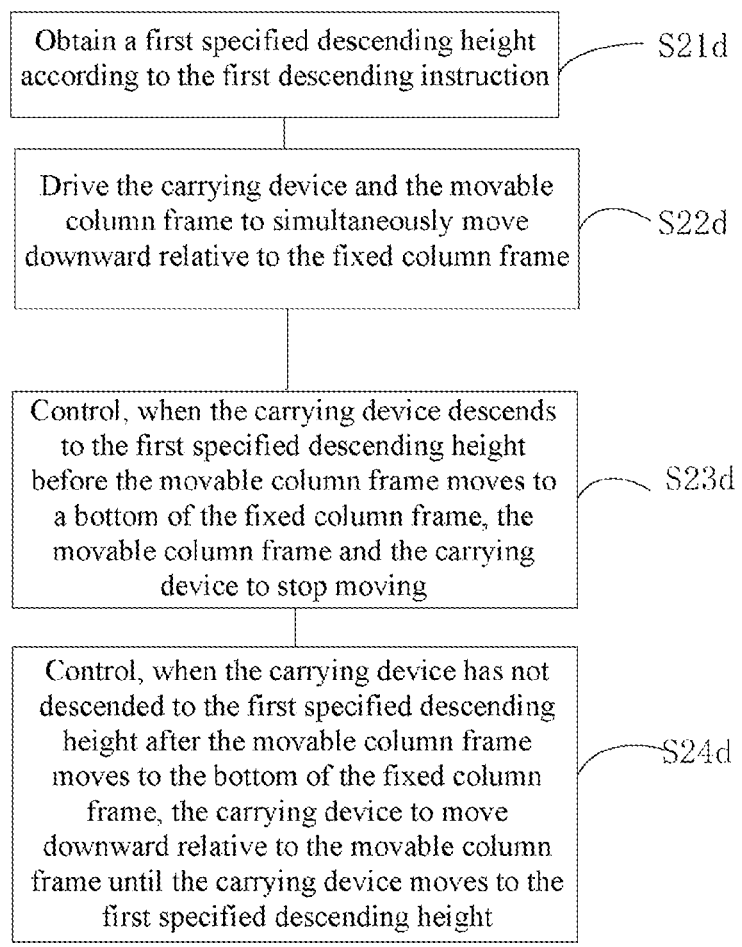
FIG. 20 is a detailed flowchart of a descending process of operation S2 in a method for controlling a transport robot according to Embodiment 1 of this application.

In some embodiments, the movement instruction includes a first descending instruction. As shown in FIG. 20, a first descending manner of the carrying device is as follows:

Operation S21d: Obtain a first specified descending height according to the first descending instruction.

The first specified descending height refers to a height difference between a specified carrying position and a current position of the carrying device after the user designates the carrying device to descend to a specified carrying position according to needs thereof. The transport robot can calculate a height that the carrying device needs to descend from the specified position through the server, and then the server converts a required descending height into a corresponding control signal and feeds back the control signal to the transport robot. The transport robot descends according to a corresponding parameter in the obtained control signal, so as to reach the specified descending height.

Operation S22d: Drive the carrying device and the movable column frame to simultaneously move downward relative to the fixed column frame.

Operation S23d: Control, when the carrying device descends to the first specified descending height before the movable column frame moves to a bottom of the fixed column frame, the movable column frame and the carrying device to stop moving.

It can be understood that when a carrying position specified by the user is in a stroke in which the movable column frame can further descend relative to the fixed column frame, the carrying device and the movable column frame are still in a synchronously moving state. When the carrying device descends to the specified carrying position, that is, when the carrying device descends to the first specified descending height, the driving assembly stops driving, so that the carrying device and the movable column frame stop descending.

Operation S24d: Control, when the carrying device has not descended to the first specified descending height after the movable column frame moves to the bottom of the fixed column frame, the carrying device to move downward relative to the movable column frame until the carrying device moves to the first specified descending height.

It can be understood that, after the movable column frame moves to a bottom of the fixed column frame, a bottom of the movable column frame is abutted against by the bottom of the fixed column frame, and the movable column frame cannot descend relative to the fixed column frame, that is, the movable column frame descends to the lowest position. However, at this time, the carrying device is at a top position of the movable column frame. When the carrying position specified by the user is lower than the top of the movable column frame, the carrying device has not descended to the specified carrying position, that is, the carrying device has not moved to the first specified descending height, and the carrying device needs to further descend until the carrying device moves to the first specified descending height.

Figure 21:
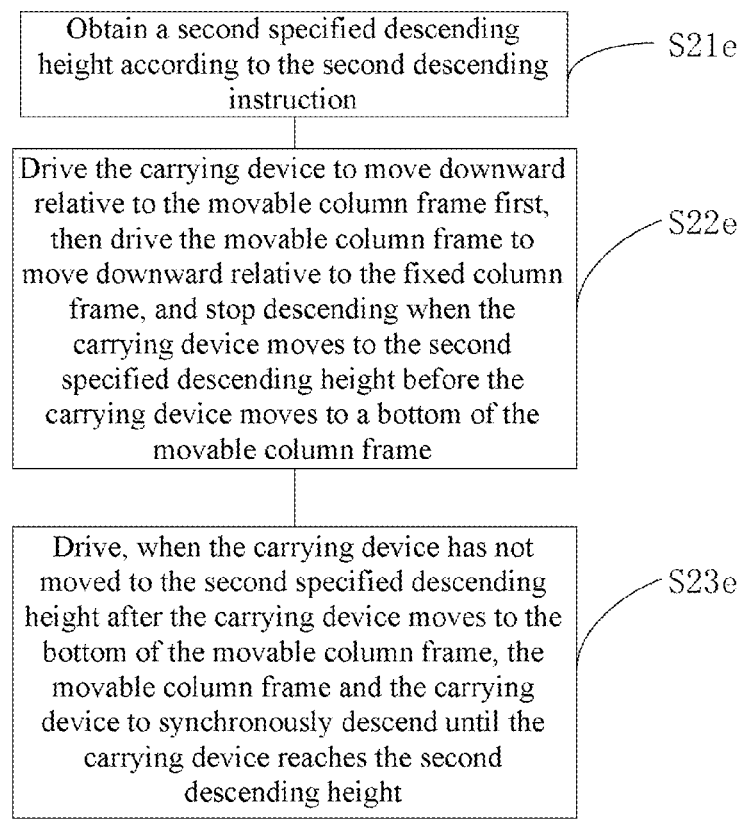
FIG. 21 is another detailed flowchart of a descending process of operation S2 in a method for controlling a transport robot according to Embodiment 1 of this application.

In some embodiments, the movement instruction further includes a second descending instruction. As shown in FIG. 21, a second descending manner of the carrying device is as follows:

Operation S21e: Obtain a second specified descending height according to the second descending instruction.

Operation S22e: Drive the carrying device to move downward relative to the movable column frame first, then drive the movable column frame to move downward relative to the fixed column frame, and stop descending when the carrying device moves to the second specified descending height before the carrying device moves to a bottom of the movable column frame.

In this descending manner, two sets of independent driving assemblies are required to be arranged in the transport robot, so that the carrying device and the movable column frame can simultaneously move relative to the fixed column frame. The structures of the two sets of independent driving assemblies are the same as that in the second ascending manner of the carrying device described above. The difference is that the two sets of driving assemblies are configured to control the carrying device and the movable column frame to descend respectively. Details are not described herein again.

Operation S23e: Drive, when the carrying device has not moved to the second specified descending height after the carrying device moves to the bottom of the movable column frame, the movable column frame and the carrying device to synchronously descend until the carrying device reaches the second descending height.

Figure 22:
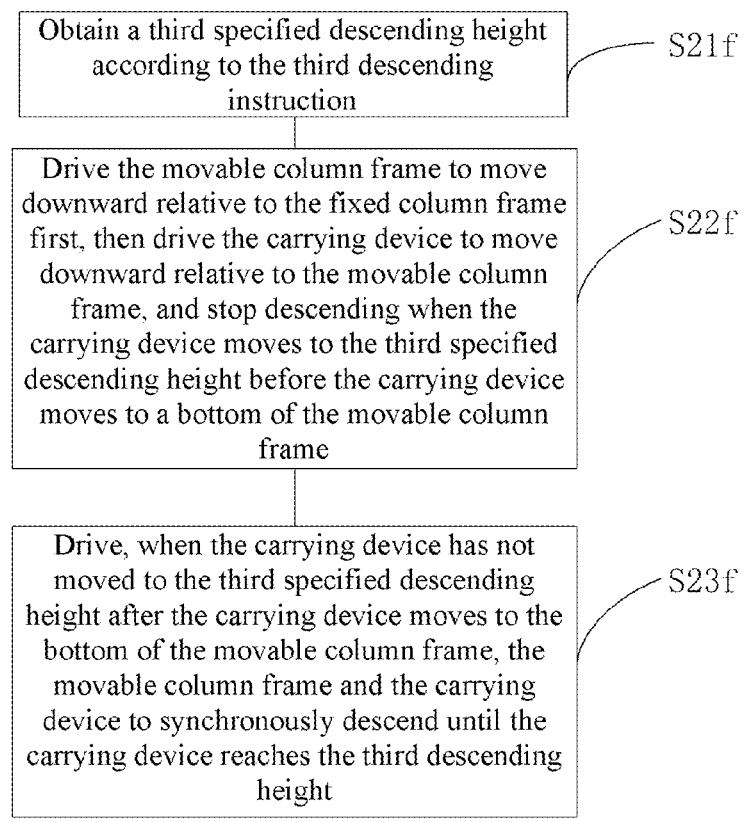
FIG. 22 is still another detailed flowchart of a descending process of operation S2 in a method for controlling a transport robot according to Embodiment 1 of this application.

In some embodiments, the movement instruction further includes a third descending instruction. As shown in FIG. 22, a third descending manner of the carrying device is as follows:

Operation S21f: Obtain a third specified descending height according to the third descending instruction.

Operation S22f: Drive the movable column frame to move downward relative to the fixed column frame first, then drive the carrying device to move downward relative to the movable column frame, and stop descending when the carrying device moves to the third specified descending height before the carrying device moves to a bottom of the movable column frame.

Operation S23f: Drive, when the carrying device has not moved to the third specified descending height after the carrying device moves to the bottom of the movable column frame, the movable column frame and the carrying device to synchronously descend until the carrying device reaches the third descending height.

In this embodiment, the carrying device can ascend or descend through the movable column frame. In addition, when a carrying position specified by the user is higher than the top of the movable column frame, the driving assembly can drive the carrying device and the movable column frame to ascend relative to the fixed column frame, so that the carrying device can reach the carrying position specified by the user. In addition, with different ascending or descending manners for the carrying device, the transport robot can be more widely used.

Embodiment 3

Figure 23:
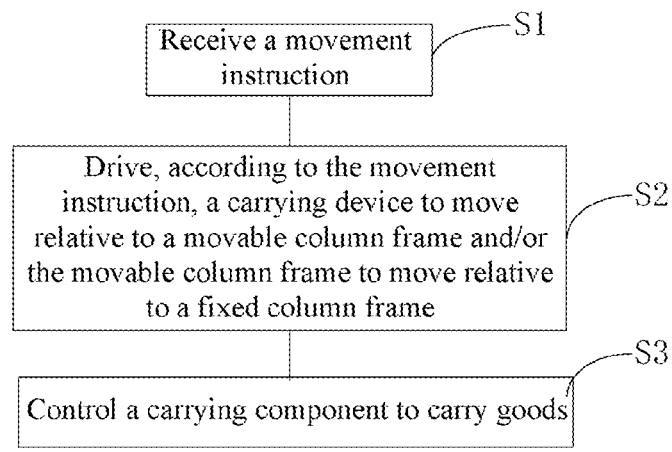
FIG. 23 is a block diagram of a flowchart of a method for controlling a transport robot according to Embodiment 2 of this application.

This embodiment of this application also provides a method for controlling a transport robot. Referring to FIG. 23, for the structure and function of the transport robot, reference may be made to the foregoing embodiment. Details are not described herein again. A difference between this embodiment and the foregoing embodiment is that the following method operations are also included:

Operation S3: Control a carrying component to carry goods.

When the carrying device reaches the specified carrying position in the manner of the foregoing embodiment, the server sends a carrying signal to the carrying device, the carrying device receives the carrying signal, and then the carrying component carries the goods.

In some embodiments, operation S3 is specifically to: control the carrying component to push out goods on a tray.

When the user controls the carrying device to perform a retrieval operation, the carrying component pushes out the goods located on the tray to a storage device or to a goods storage device externally arranged.

In some embodiments, operation S3 is specifically to: control the carrying component to pull goods located on the storage device to the tray.

When the user controls the carrying device to perform a pick-up operation, the carrying component pulls the goods located on the storage device to the tray, so that the carrying device can transport the goods to carrying positions at different heights.

In this embodiment, the carrying device can ascend or descend through the movable column frame. In addition, when a carrying position specified by the user is higher than the top of the movable column frame, the driving assembly can drive the carrying device and the movable column frame to ascend relative to the fixed column frame, so that the carrying device can reach the carrying position specified by the user. In addition, with the help of the carrying device to carry goods, it is easy to implement automatic and efficient transport of goods, which is more convenient to use.

Embodiment 4

Figure 24:
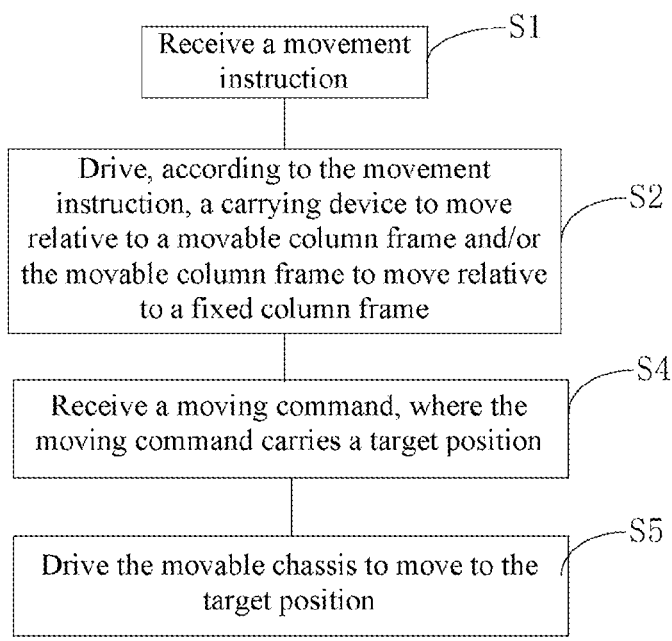
FIG. 24 is a block diagram of a flowchart of a method for controlling a transport robot according to Embodiment 3 of this application.

This embodiment of this application also provides a method for controlling a transport robot. Referring to FIG. 24, for the structure and function of the transport robot, reference may be made to the foregoing embodiment. Details are not described herein again. The method includes the following operations:

Operation S1: Receive a movement instruction.

Operation S2: Drive, according to the movement instruction, a carrying device to move relative to a movable column frame, and/or the movable column frame to move relative to a fixed column frame.

Operation S4: Receive a moving command, where the moving command carries a target position.

When the user needs to move the transport robot to a specified place for transporting goods, a moving instruction may be sent by a server to a movable chassis of the transport robot. The movable chassis moves to the specified place according to the received moving instruction. In addition to the target position, the moving instruction further includes a travel path on which the transport robot travels to the target position. The transport robot may communicate with the server through a wireless network, or communicate with the server in a wired manner.

Operation S5: Drive the movable chassis to move to the target position.

It is worth noting that during the movement of the transport robot, the transport robot can perform an obstacle avoidance operation, specifically: firstly, determining whether there is an obstacle on a travel path of the transport robot in a traveling direction when the transport robot moves; obtaining, if yes, a first height of the obstacle from a ground; secondly, obtaining a second height of a top of the transport robot from the ground currently, and a third height of the top of the transport robot from the ground when the movable column frame is fully retracted; thirdly, determining whether the transport robot is capable of passing through: determining whether the second height is greater than the first height; determining, if yes, whether the third height is less than the first height; and reducing, if yes, a height of the top of the transport robot from the ground until the height is less than the first height; and fourthly, the transport robot passing through the obstacle. Certainly, if the third height is greater than or equal to the first height, the transport robot is controlled to bypass the obstacle, that is, a new route to the target position is planned and the movement is performed.

It can be understood that the obstacle and the height of the obstacle from the ground obtained by the transport robot may be obtained from a pre-stored three-dimensional map, or may be obtained by configuring a sensing device such as a sensor or a camera on the transport robot. The three-dimensional map may be obtained through the server, or data of the relevant map may be pre-stored in a storage medium of the transport robot.

In some embodiments, operation S4 and operation S5 may precede operation S1.

In this embodiment, the transport robot may move to the target position after receiving the moving instruction, and transport the goods, which can implement the multi-position transport of goods, and is more intelligent to use.

Embodiment 5

Figure 25:
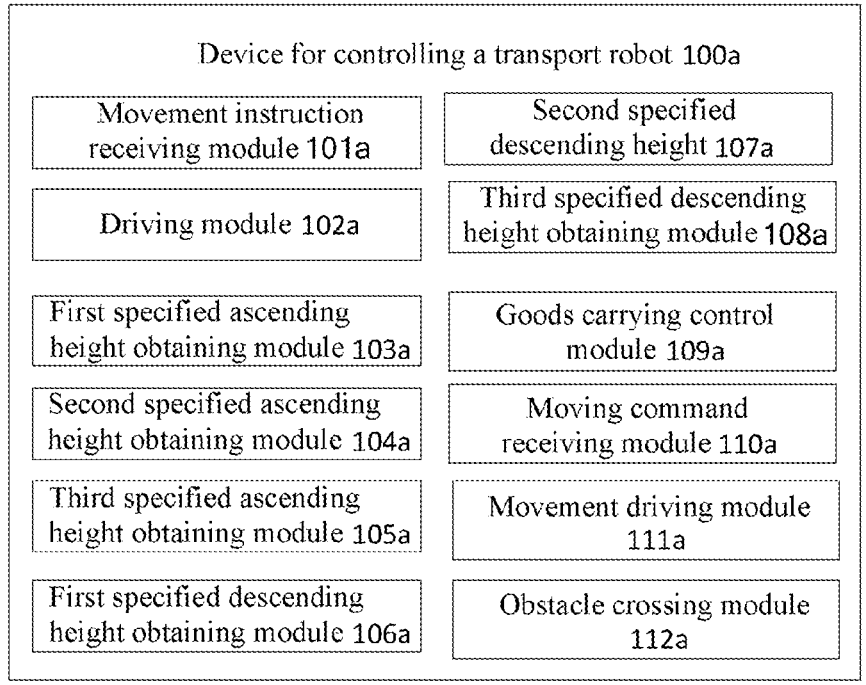
FIG. 25 is a schematic diagram of a device for controlling a transport robot according to an embodiment of this application.
Figure 26:
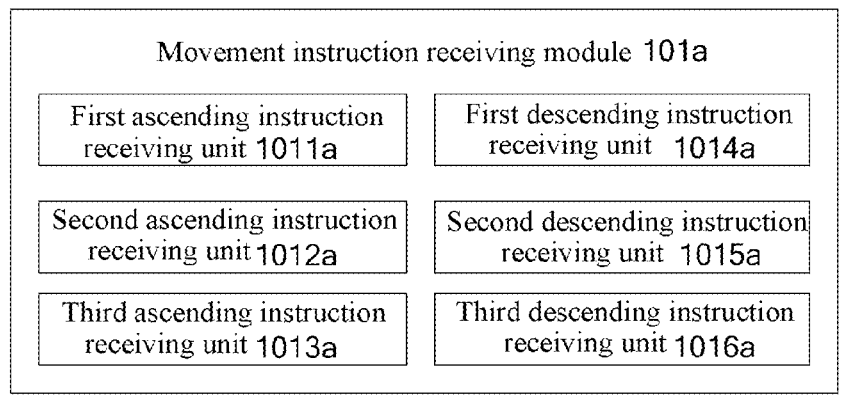
FIG. 26 is a detailed schematic diagram of some modules of FIG. 25.

FIG. 25 and FIG. 26 are schematic diagrams of a device for controlling a transport robot according to an embodiment of this application. The device 100a for controlling a transport robot is applicable to a transport robot. The transport robot includes a vertical support and a carrying device. The vertical support includes a fixed column frame 10 and a movable column frame 20. The carrying device is movably arranged on the movable column frame 20. The movable column frame 20 is movably arranged on the fixed column frame 10. The carrying device is fixed on the movable column frame 20. In addition, the carrying device is configured to carry goods. The device includes:

a movement instruction receiving module 101a, configured to receive a movement instruction; and a driving module 102a, configured to drive the carrying device to move relative to the movable column frame 20 and/or drive the movable column frame 20 to move relative to the fixed column frame 10.

In some embodiments, the movement instruction receiving module 101a includes a first ascending instruction receiving unit 1011a, configured to receive the first ascending instruction.

The device further includes a first specified ascending height obtaining module 103a, configured to obtain the first specified ascending height according to the first ascending instruction.

The driving module 102a is further configured to drive the carrying device to move upward relative to the movable column frame 20. Before the carrying device moves to the top of the movable column frame 20, and when the carrying device moves to the first specified ascending height, the lifting of the carrying device is stopped. After the carrying device moves to the top of the movable column frame 20, and when the carrying device has not moved to the first specified ascending height, the carrying device and the movable column frame 20 are driven to simultaneously move upward relative to the fixed column frame 10 until the carrying device reaches the first specified ascending height.

In some embodiments, the movement instruction receiving module 101a further includes a second ascending instruction receiving unit 1012a, configured to receive the second ascending instruction.

The device further includes a second specified ascending height obtaining module 104a, configured to obtain the second specified ascending height according to the second ascending instruction.

The driving module 102a is further configured to drive the movable column frame 20 to move upward relative to the fixed column frame 10 until the top of the movable column frame exceeds the second specified ascending height, and then drive the carrying device to move upward relative to the movable column frame 20 until the carrying device reaches the second specified ascending height.

In some embodiments, the movement instruction receiving module 101a further includes a third ascending instruction receiving unit 1013a, configured to receive the third ascending instruction.

The device further includes a third specified ascending height obtaining module 105a, configured to obtain the third specified ascending height according to the third ascending instruction.

The driving module 102a is further configured to drive the movable column frame 20 and the carrying device to simultaneously move upward until the carrying device reaches the third specified ascending height.

In some embodiments, the movement instruction receiving module 101a further includes a first descending instruction receiving unit 1014a, configured to receive the first descending instruction.

The device further includes a first specified descending height obtaining module 106a, configured to obtain the first specified descending height according to the first descending instruction.

The driving module 102a is further configured to drive the carrying device and the movable column frame 20 to simultaneously move downward relative to the fixed column frame 10. Before the movable column frame 20 moves to the bottom of the fixed column frame 10, and when the carrying device descends to the first specified descending height, the movable column frame 20 and the carrying device are controlled to stop moving. After the movable column frame 20 moves to the bottom of the fixed column frame 10, and when the carrying device has not descended to the first specified descending height, the carrying device is controlled to move downward relative to the movable column frame 20 until the carrying device moves to the first specified descending height.

In some embodiments, the movement instruction receiving module 101a further includes a second descending instruction receiving unit 1015a, configured to receive the second descending instruction.

The device further includes a second specified descending height obtaining module 107a, configured to obtain the second specified descending height according to the second descending instruction.

The driving module 102a is further configured to drive the carrying device to move downward relative to the movable column frame 20 first, then drive the movable column frame 20 to move downward relative to the fixed column frame 10, and stop descending when the carrying device moves to the second specified descending height before the carrying device moves to the bottom of the movable column frame 20. The driving module is further configured to drive, when the carrying device has not moved to the second specified descending height after the carrying device moves to the bottom of the movable column frame 20, the movable column frame 20 and the carrying device to synchronously descend until the carrying device reaches the second descending height.

In some embodiments, the movement instruction receiving module 101a further includes a third descending instruction receiving unit 1016a, configured to receive the third descending instruction.

The device further includes a third specified descending height obtaining module 108a, configured to obtain the third specified descending height according to the third descending instruction.

The driving module 102a is further configured to drive the movable column frame 20 to move downward relative to the fixed column frame 10 first, then drive the carrying device to move downward relative to the movable column frame 20, and stop descending when the carrying device moves to the third specified descending height before the carrying device moves to the bottom of the movable column frame 20. The driving module 102a is further configured to drive, when the carrying device has not moved to the third specified descending height after the carrying device moves to the bottom of the movable column frame 20, the movable column frame 20 and the carrying device to synchronously descend until the carrying device reaches the third descending height.

In some embodiments, the device further includes a goods carrying control module 109a, configured to control the carrying component to carry goods.

Further, the goods carrying control module 109a includes a goods pushing unit, configured to control the carrying component to push out goods located on the tray.

Further, the goods carrying control module 109a includes a goods pulling unit, configured to control the carrying component to pull goods located on the storage device to the tray.

In some embodiments, the device further includes a moving command receiving module 110a, configured to receive a moving command, where the moving command includes a target position, and certainly, the moving command further includes a travel path on which the transport robot moves to the target position; and a movement driving module 111a, configured to drive the movable chassis to move to the target position.

In some embodiments, the device further includes an obstacle crossing module 112a. The obstacle crossing module 112a is configured to determine whether there is an obstacle on a travel path of the transport robot 100 in a traveling direction when the transport robot 100 moves; obtain, if yes, a first height of the obstacle from a ground; obtain a second height of a top of the transport robot 100 from the ground currently, and a third height of the top of the transport robot 100 from the ground when the movable column frame 20 is fully retracted; determine whether the second height is greater than the first height; determine, if yes, whether the third height is less than the first height; and reduce, if yes, a height of the transport robot from the ground until the height is less than the first height; and the transport robot passing through the obstacle.

In some embodiments, the obstacle crossing module 112a is further configured to control, when the third height of the top of the transport robot 100 from the ground is greater than or equal to the first height of the obstacle from the ground when the movable column frame 20 is fully retracted, the transport robot to bypass the obstacle, that is, to plan a new route to reach the target position and perform movement.

It can be understood that, in addition to the ground as a reference plane, the obstacle crossing module 112a may also use another plane as the reference plane, which is not limited to the foregoing description.

Embodiment 6

Figure 27:
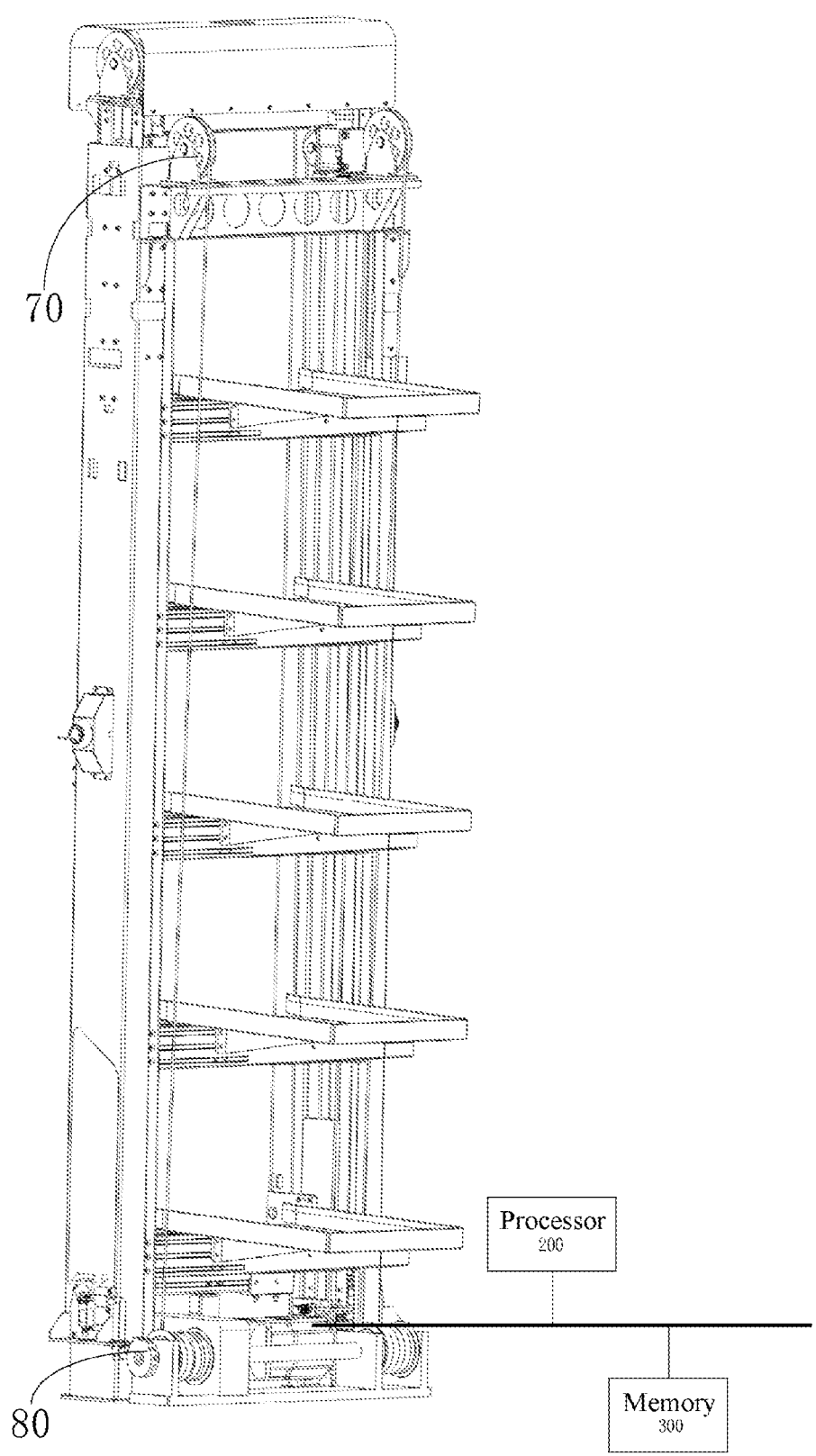
FIG. 27 is a schematic structural diagram of a transport robot according to an embodiment of this application.

This embodiment of this application also provides a transport robot 100. Referring to FIG. 27, the transport robot 100 includes at least one processor 200 in addition to the mechanical structure described above; and a memory 300, communicatively connected to the at least one processor 200. In FIG. 27, for example, there is one processor 200. The memory 300 stores instructions executable by the at least one processor 200, the instructions, when executed by the at least one processor 200, causing the at least one processor 200 to perform the method for controlling a transport robot in FIG. 16 to FIG. 24. The processor 200 and the memory 300 may be connected by using a bus or in another manner. A connection by using the bus is used as an example in FIG. 27.

The memory 300, as a non-volatile computer-readable storage medium, may be configured to store a non-volatile software program, a non-volatile computer-executable program and a module, for example, program instructions/modules corresponding to a method for controlling a transport robot in the embodiments of this application, for example, the modules shown in FIG. 25 and FIG. 26. The processor 200 performs various functional applications and data processing of a server by running the non-volatile software program, instructions and module stored in the memory 300, that is, implementing the method for controlling a transport robot provided in the foregoing method embodiments.

The memory 300 may include a program storage area and a data storage area. The program storage area may store an operating system and an application program that is required for at least one function. A data storage area may store data created according to use of a device for controlling a transport robot. In addition, the memory 300 may include a high speed random access memory, and may further include a non-volatile memory, such as at least one magnetic disk storage device, a flash storage device or other non-volatile solid state storage devices. In some embodiments, the memory 300 may optionally include memories remotely disposed relative to the processor 200, and the remote memories may be connected to the device for controlling a transport robot through a network. The foregoing examples of the network include, but are not limited to, the Internet, an intranet, a local area network, a mobile communication network, and a combination thereof.

One or more modules are stored in the memory 300, when executed by one or more processors 200, causing the processor to perform the method for controlling a transport robot in any of the foregoing method embodiments. For example, the method operations in FIG. 16 to FIG. 24 are performed, to implement the functions of the modules and units in FIG. 25 and FIG. 26.

The foregoing product may perform the method provided in the embodiments of this application, and have the corresponding functional modules for performing the method and beneficial effects thereof. For technical details not described in detail in this embodiment, refer to the method provided in the embodiments of this application.

An embodiment of this application further provides a non-volatile computer-readable storage medium. The computer-readable storage medium stores computer-executable instructions. The computer-executable instructions are executed by one or more processors. For example, the method operations in FIG. 16 to FIG. 24 are performed, to implement the functions of the modules in FIG. 25 and FIG. 26.

An embodiment of this application further provides a computer program product, including a computer program stored in a non-volatile computer-readable storage medium. The computer program includes program instructions, the program instructions, when executed by a computer, causing the computer to perform the method for controlling a transport robot in any of the foregoing method embodiments. For example, the method operations in FIG. 16 to FIG. 24 are performed, to implement the functions of the modules in FIG. 25 and FIG. 26.

It should be noted that, the foregoing described apparatus embodiments are merely exemplary. The units described as separate parts may be or may not be physically separated. The part displayed as a unit may be or may not be a physical unit, that is, may be located at one place or distributed on a plurality of network units. Some or all of the modules may be selected according to actual needs to achieve the objectives of the solutions of the embodiments.

Based on the descriptions of the foregoing implementations, a person of ordinary skill in the art may clearly understand that the implementations may be implemented by software in addition to a universal hardware platform, or by hardware. A person skilled in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The storage medium may be a magnetic disk, an optical disc, a read-only memory (ROM), a random access memory (RAM), or the like.

Embodiment 7

Figure 28:
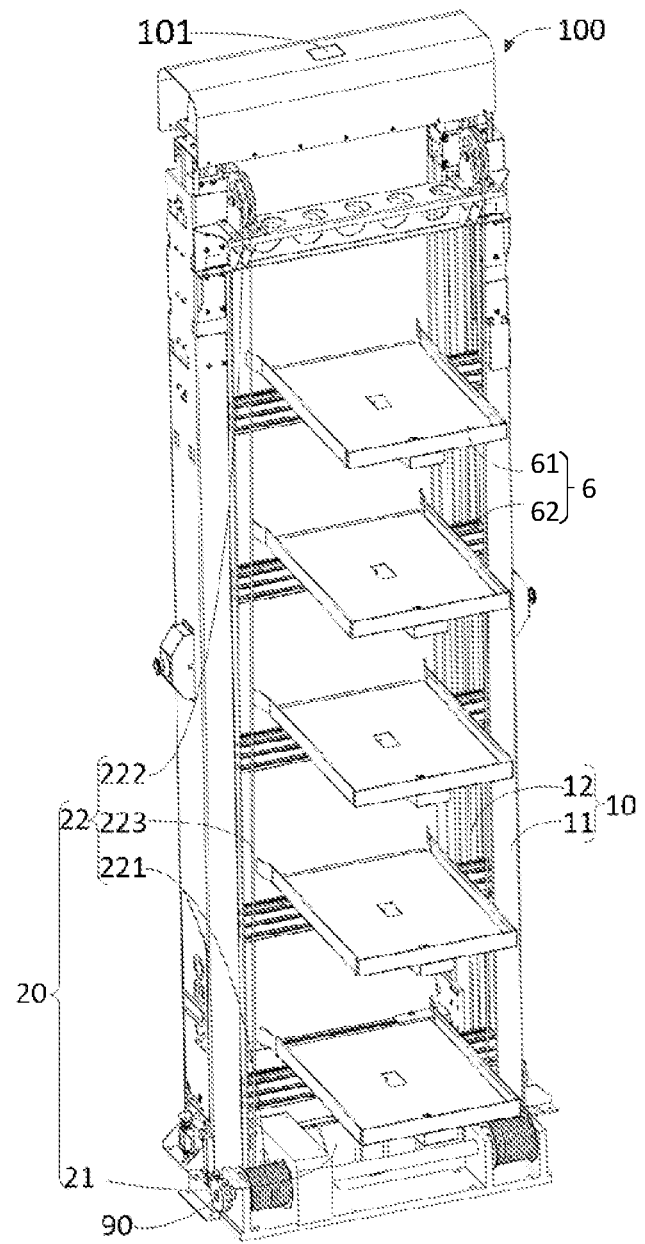
FIG. 28 is a three-dimensional structural diagram of a transport robot according to an embodiment of this application, where a movable chassis of the transport robot is not shown.
Figure 29:
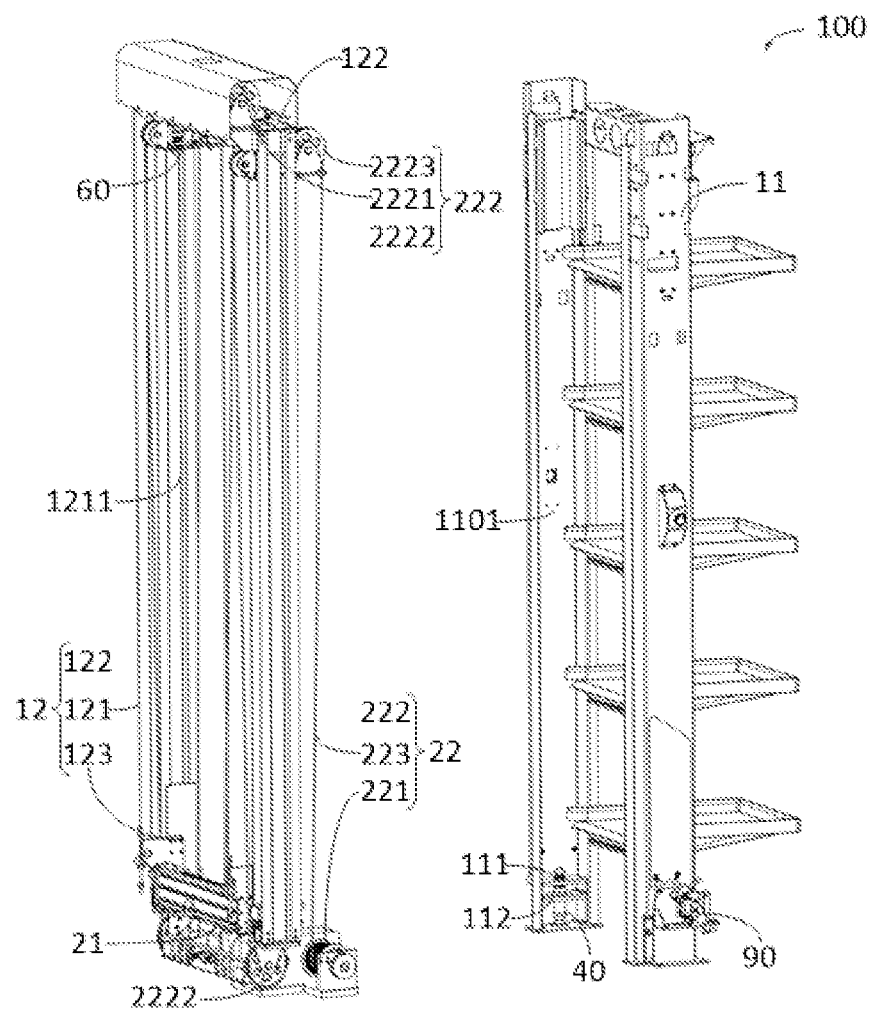
FIG. 29 is an exploded structural diagram of the transport robot of FIG. 28.
Figure 30:
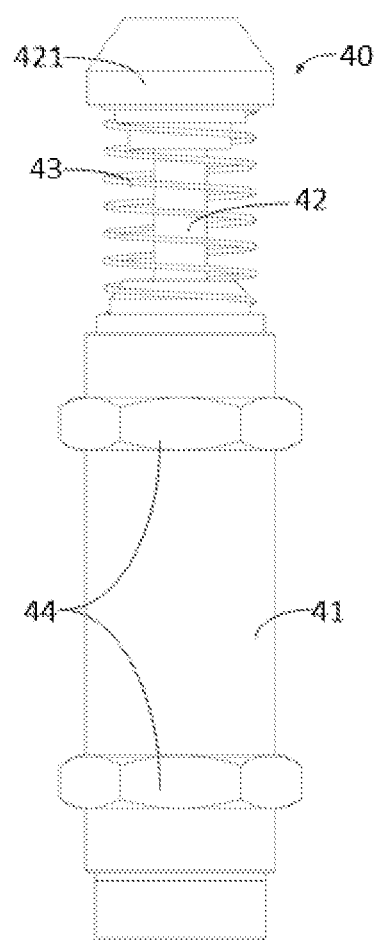
FIG. 30 is a side view of a main shock absorbing member of the transport robot of FIG. 28.
Figure 31:
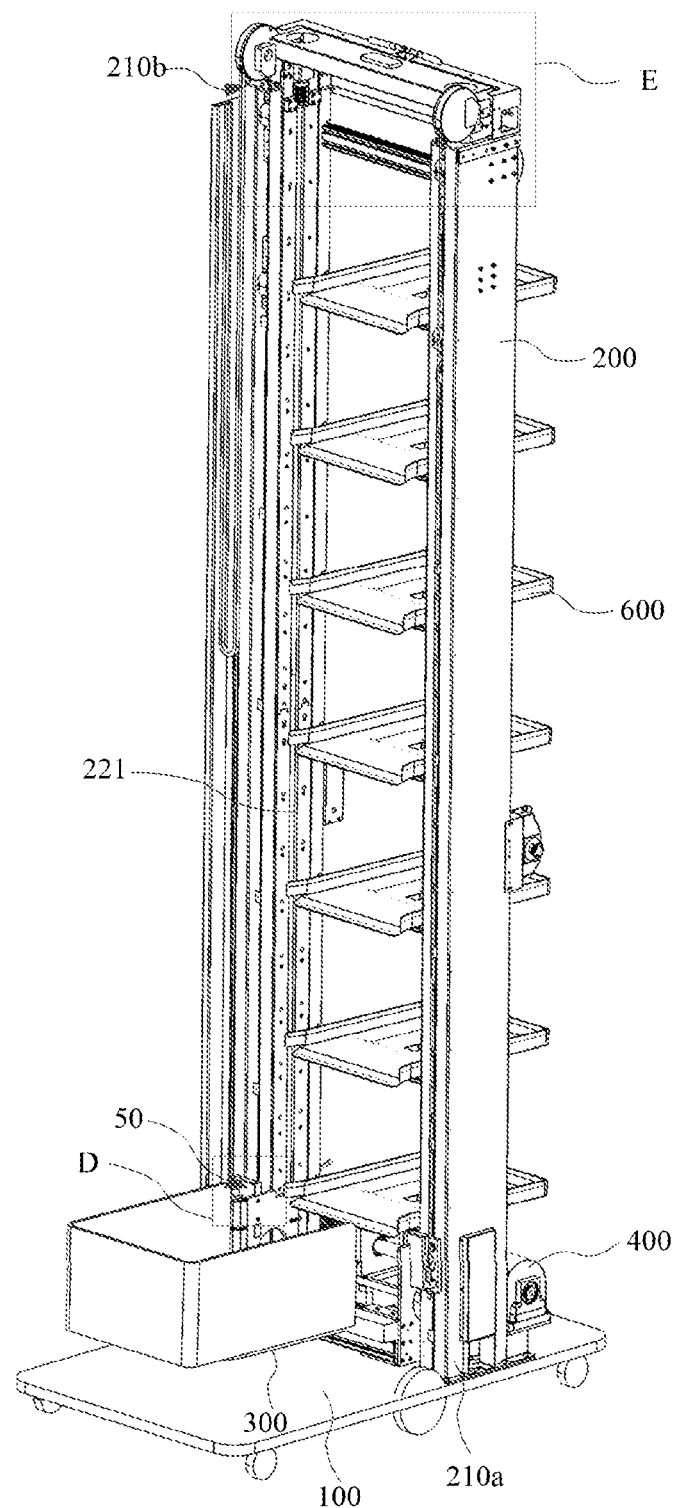
FIG. 31 is a schematic structural diagram of a transport robot according to an embodiment of this application.
Figure 32:
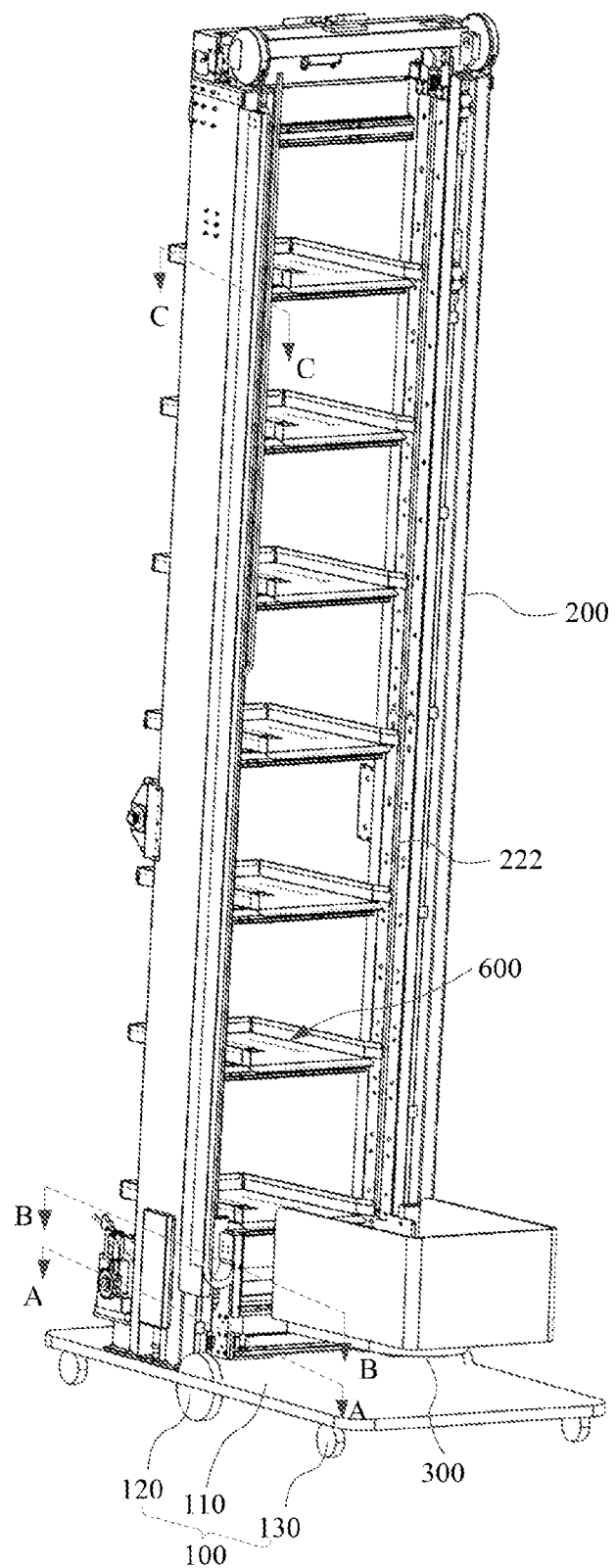
FIG. 32 is a schematic structural diagram of a transport robot viewed from another angle according to an embodiment of this application.
Figure 33:
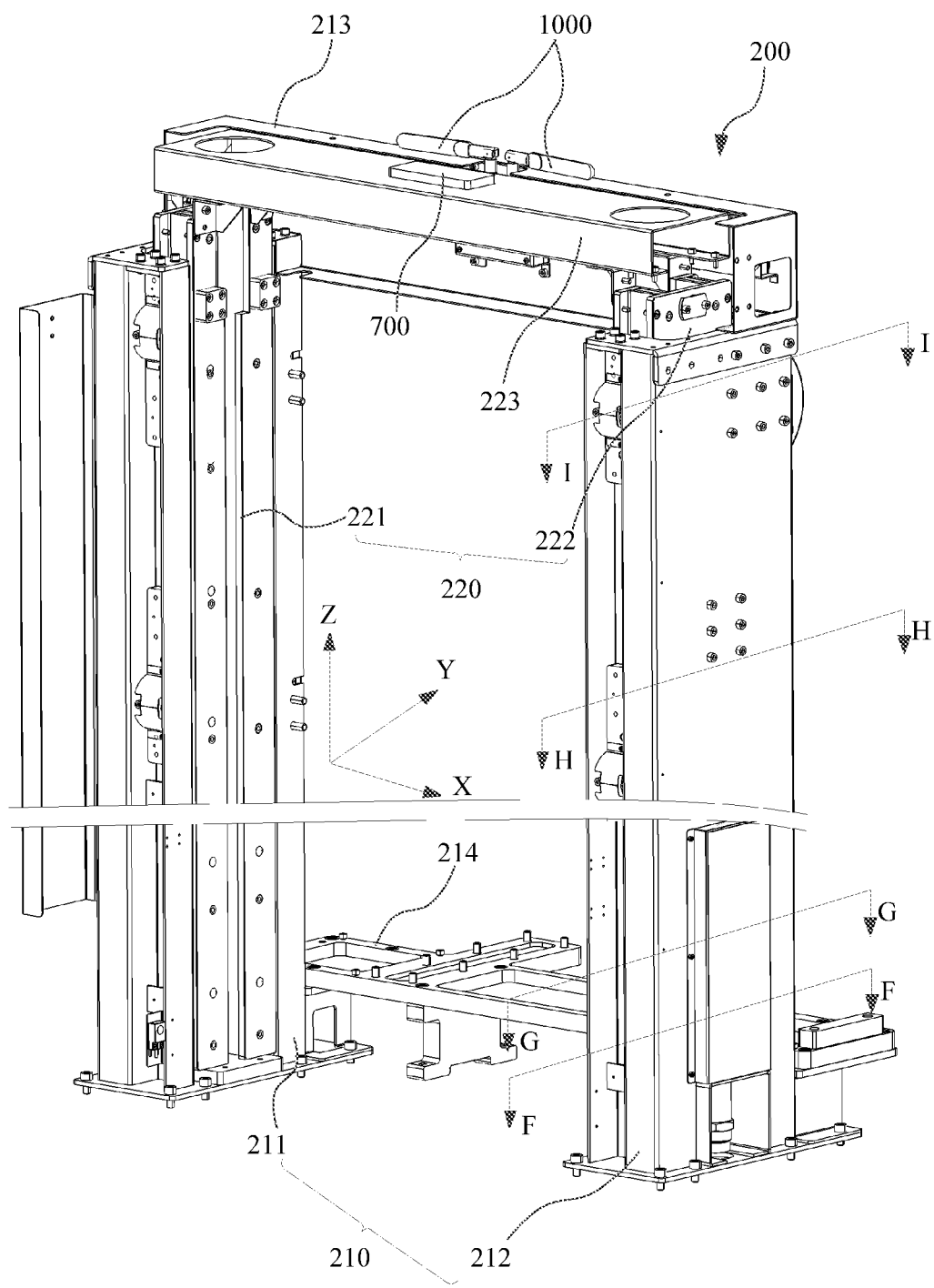
FIG. 33 is a schematic structural diagram of a vertical support of a transport robot according to an embodiment of this application.
Figure 34:
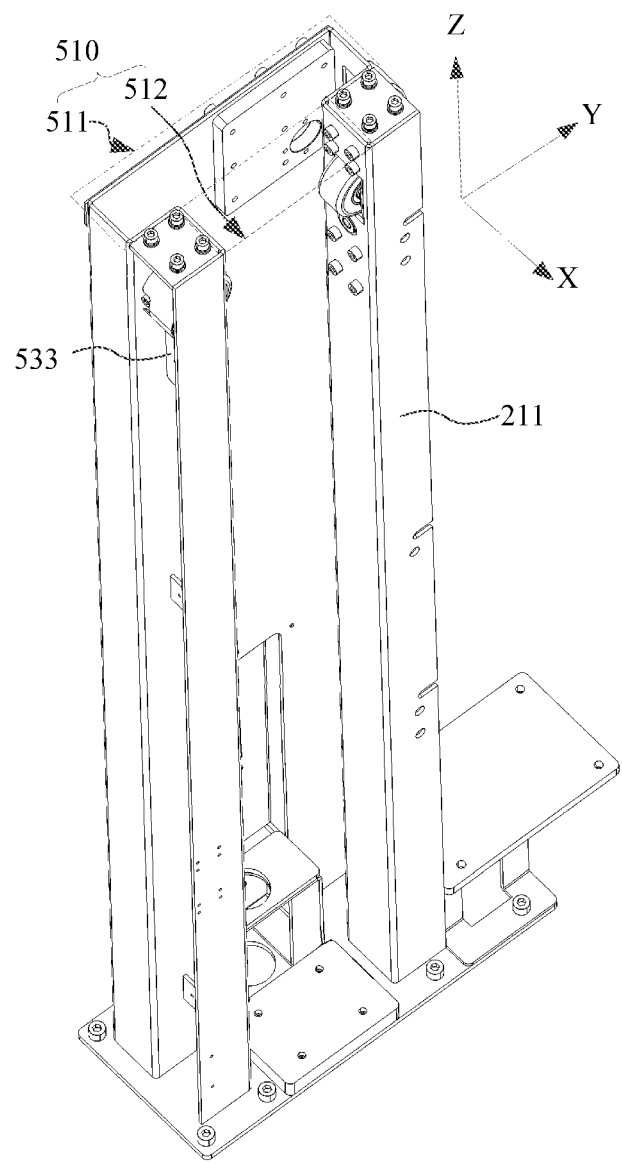
FIG. 34 is a schematic structural diagram of a first fixed column in a transport robot according to an embodiment of this application.
Figure 35:
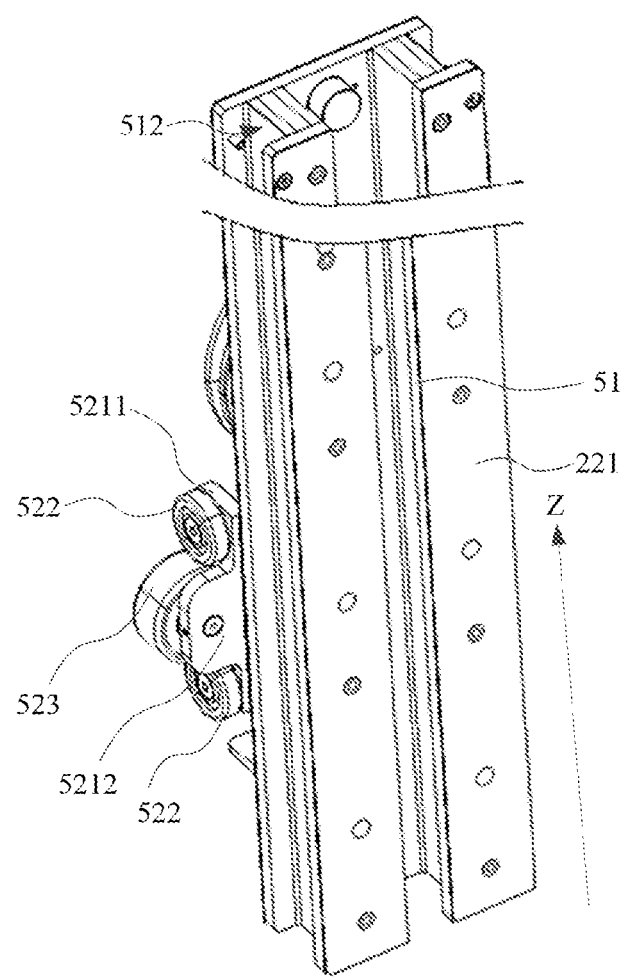
FIG. 35 is a schematic structural diagram of a first movable column in a transport robot according to an embodiment of this application.
Figure 36:
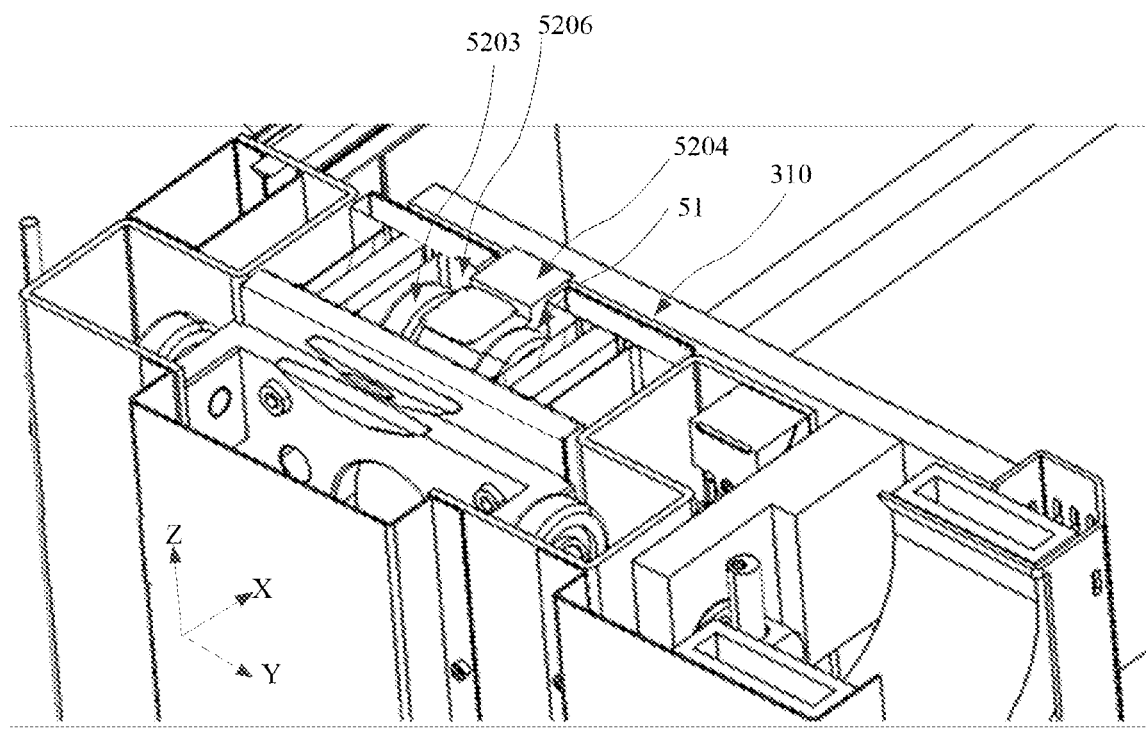
FIG. 36 is a schematic diagram of an internal structure along a Z-axis direction taken along a line A-A in FIG. 32.
Figure 37:
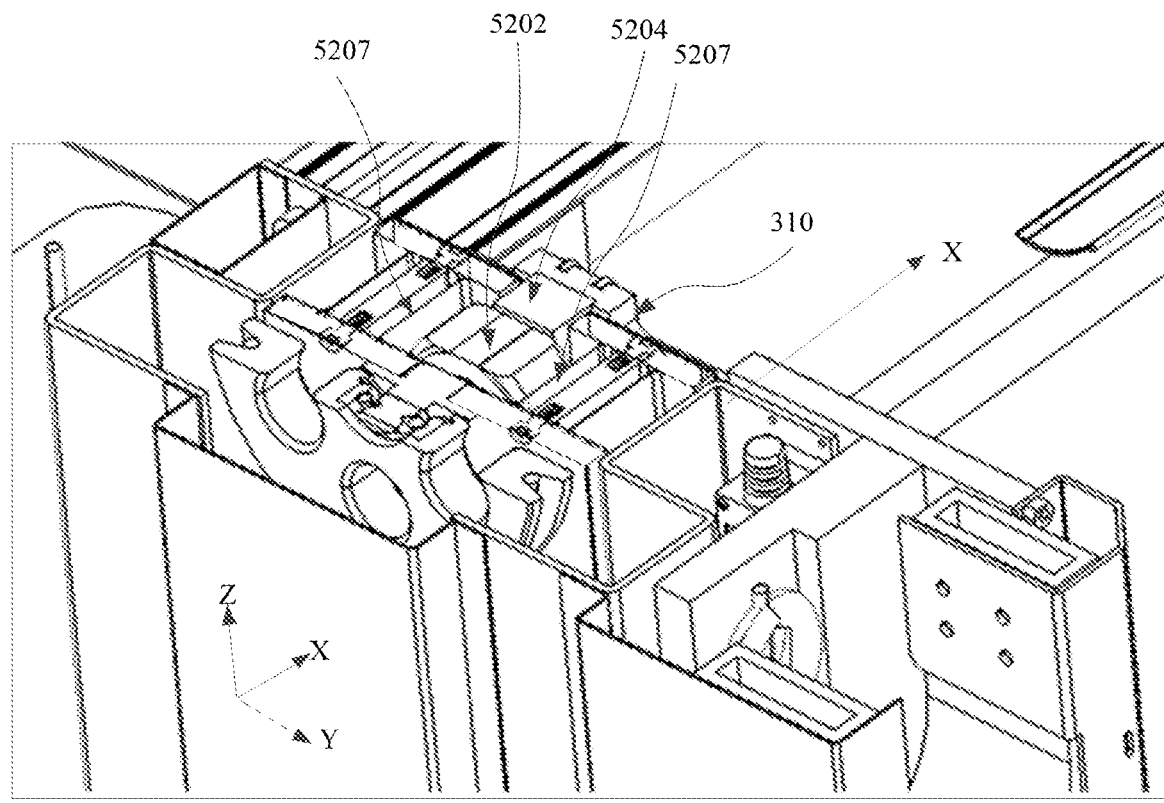
FIG. 37 is a schematic diagram of an internal structure along a Z-axis direction taken along a line B-B in FIG. 32.
Figure 38:
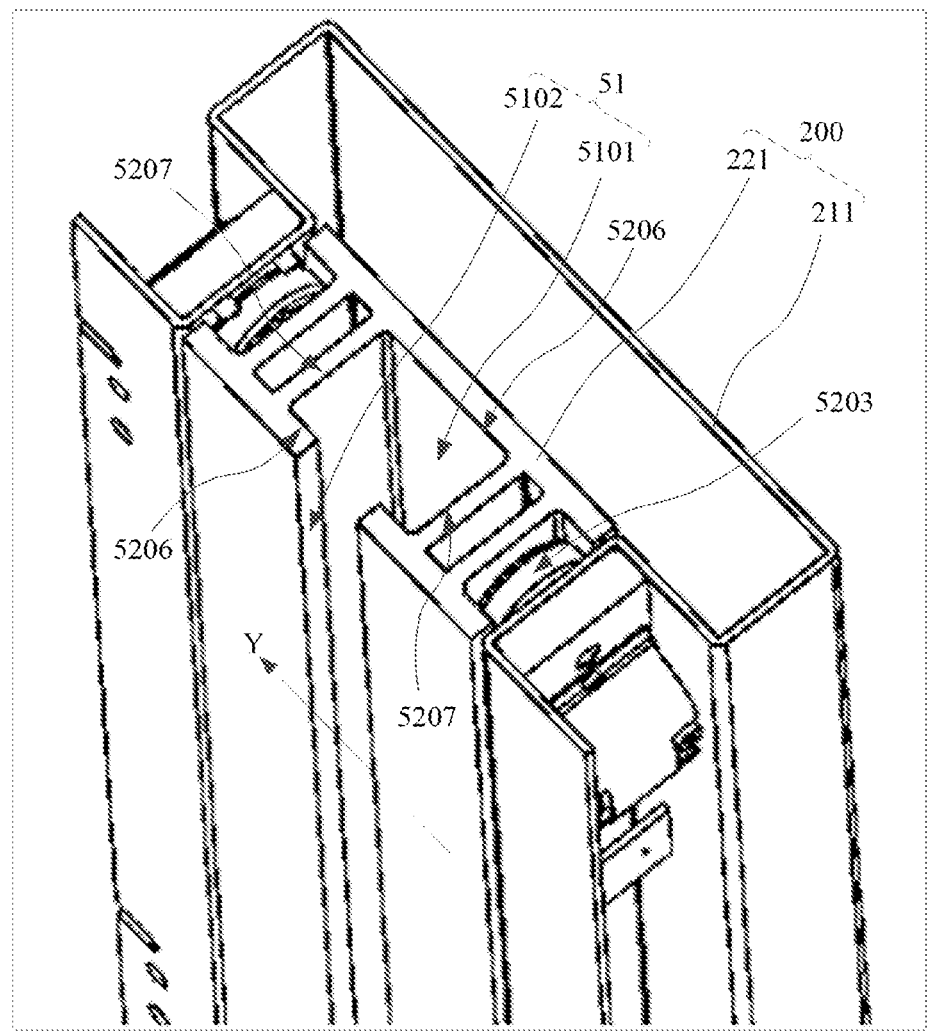
FIG. 38 is a schematic diagram of an internal structure along a Z-axis direction taken along a line C-C in FIG. 32.
Figure 39:
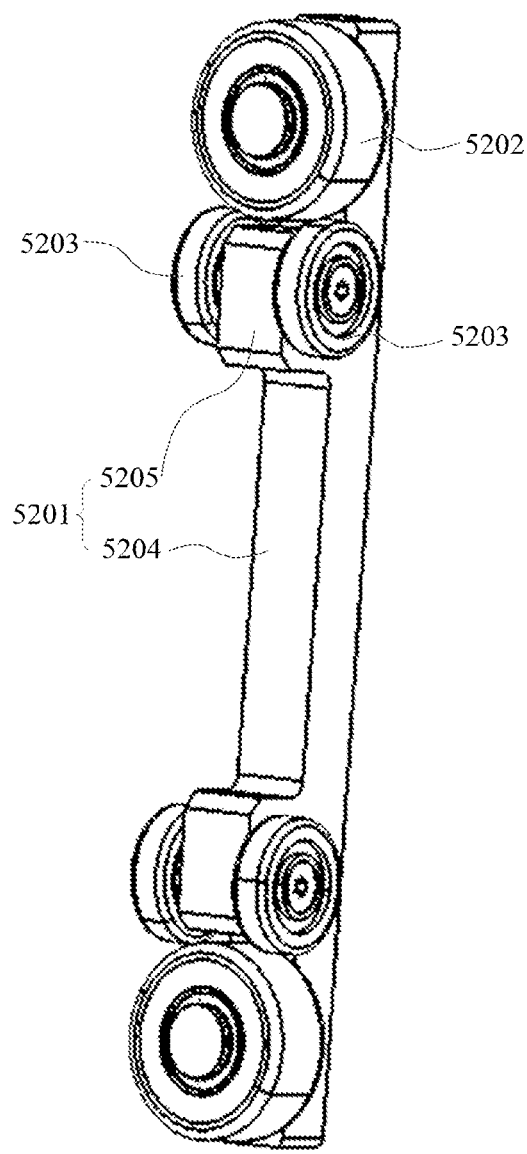
FIG. 39 is a schematic structural diagram of a first guide wheel set in a transport robot according to an embodiment of this application.
Figure 40:
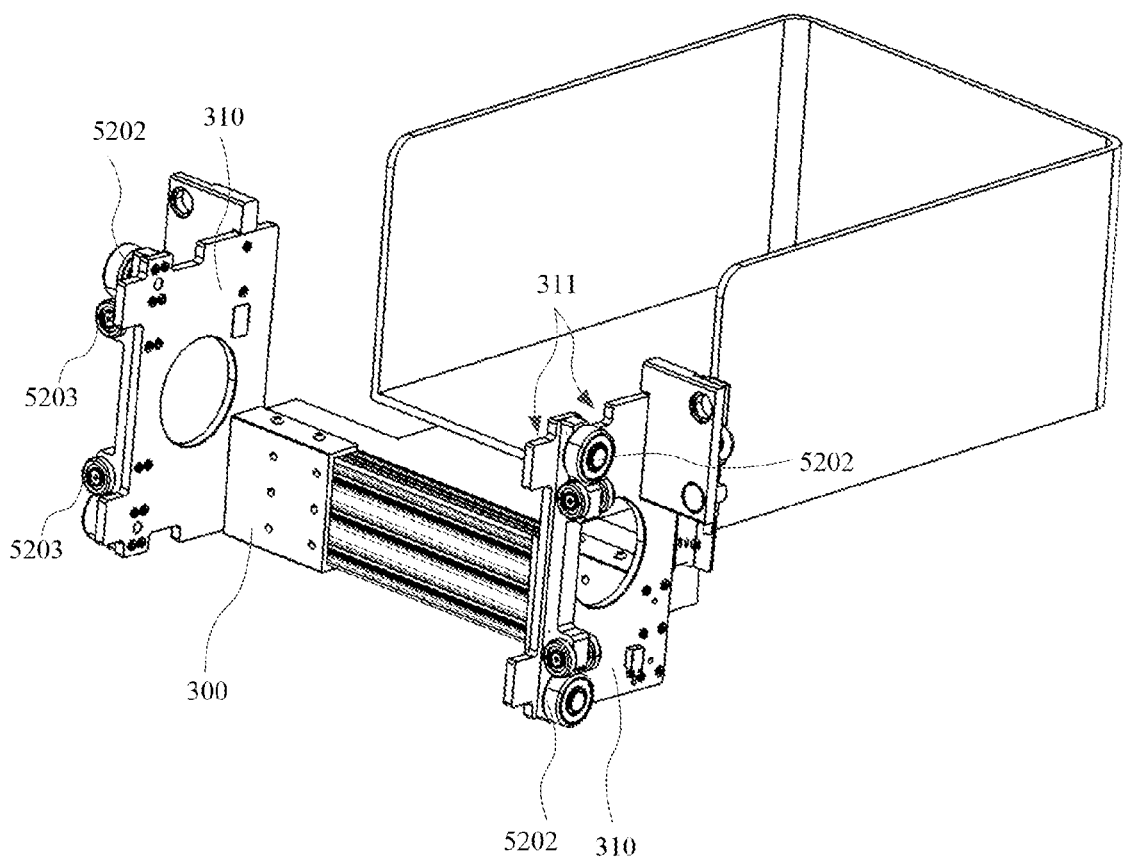
FIG. 40 is a schematic structural diagram of a first guide wheel set and a carrying device in a transport robot according to an embodiment of this application.
Figure 41:
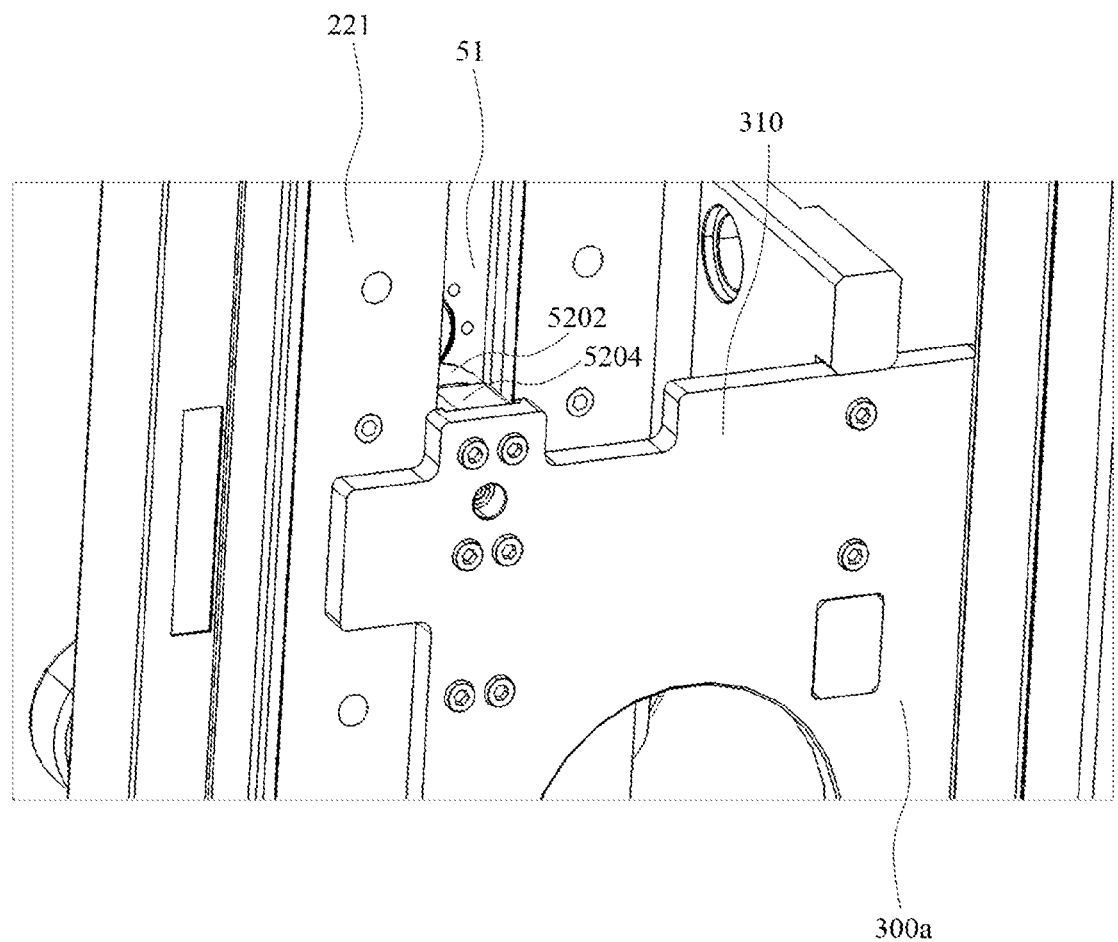
FIG. 41 is a partial schematic diagram at D in FIG. 31.
Figure 42:
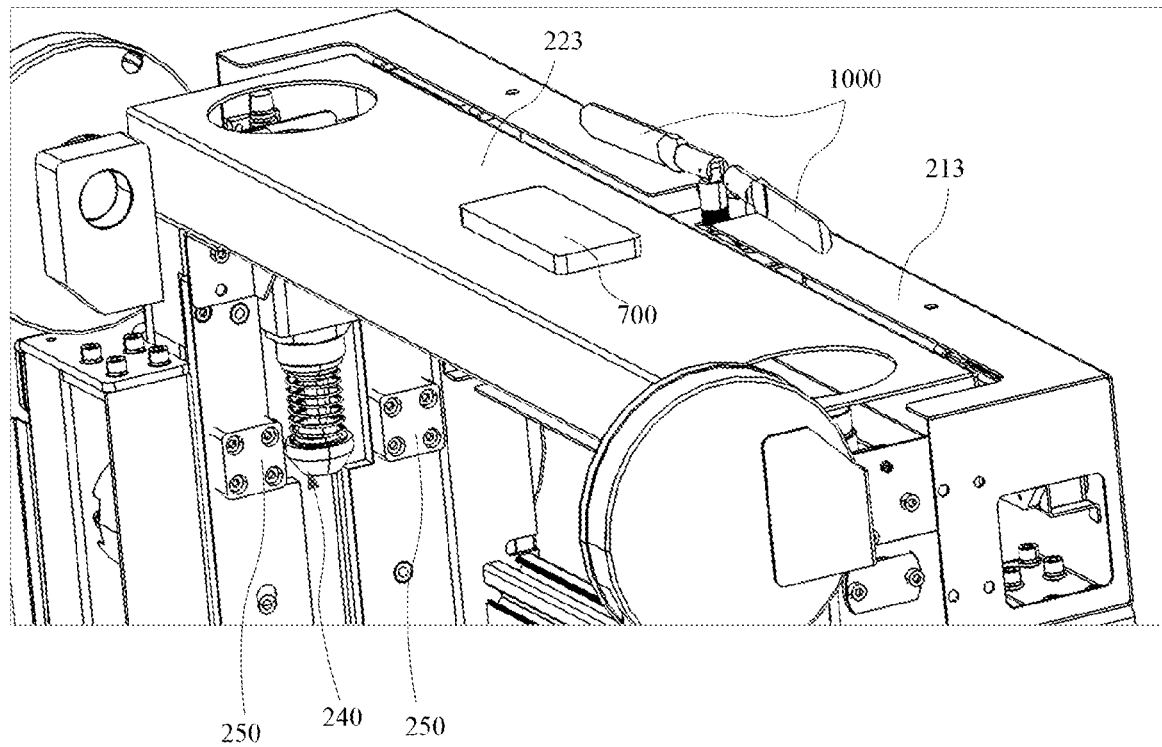
FIG. 42 is a partial schematic diagram 1 at E in FIG. 31.
Figure 43:
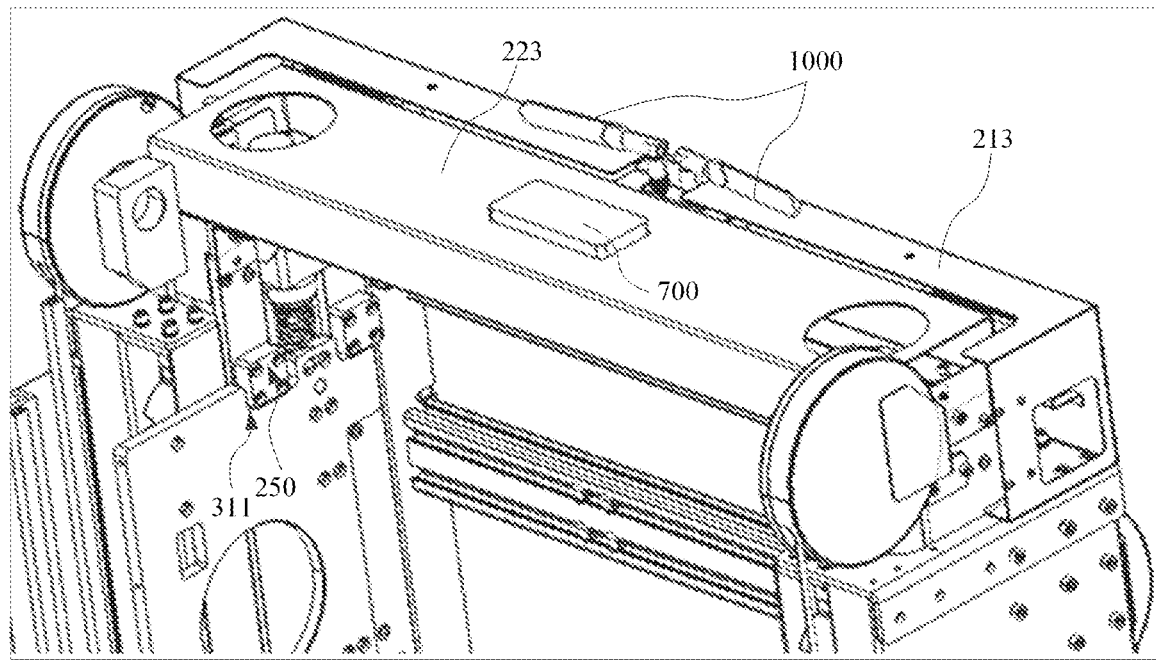
FIG. 43 is a partial schematic diagram 2 at E in FIG. 31.
Figure 44:
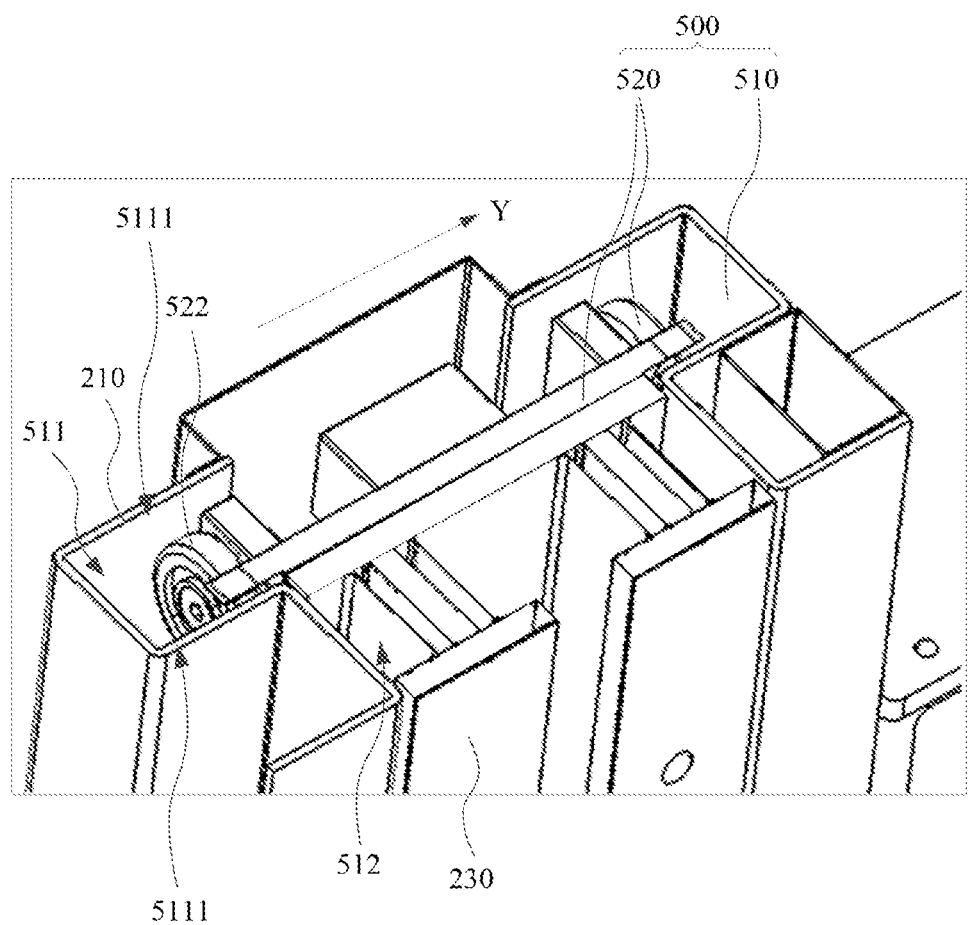
FIG. 44 is a schematic diagram of an internal structure along a Z-axis direction taken along a line F-F in FIG. 33.
Figure 45:
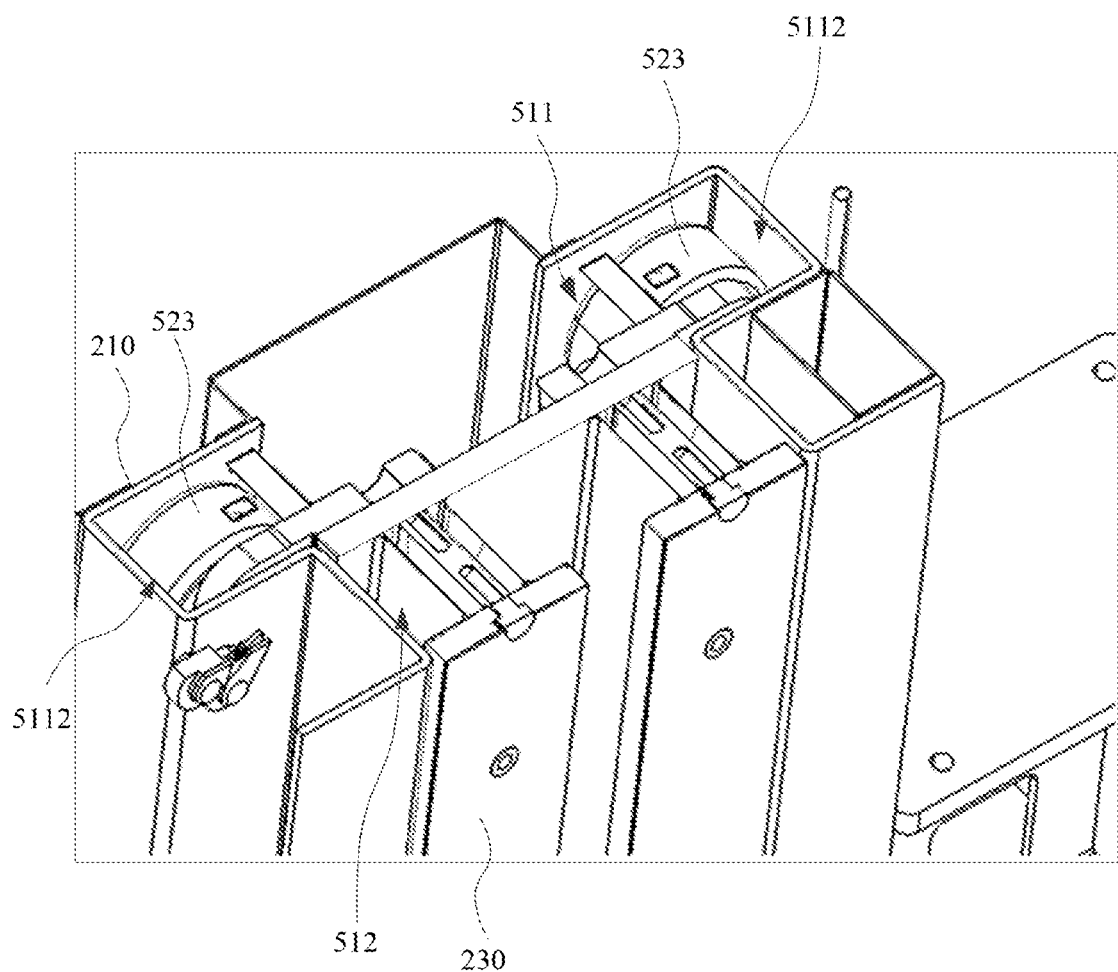
FIG. 45 is a schematic diagram of an internal structure along a Z-axis direction taken along a line G-G in FIG. 33.
Figure 46:
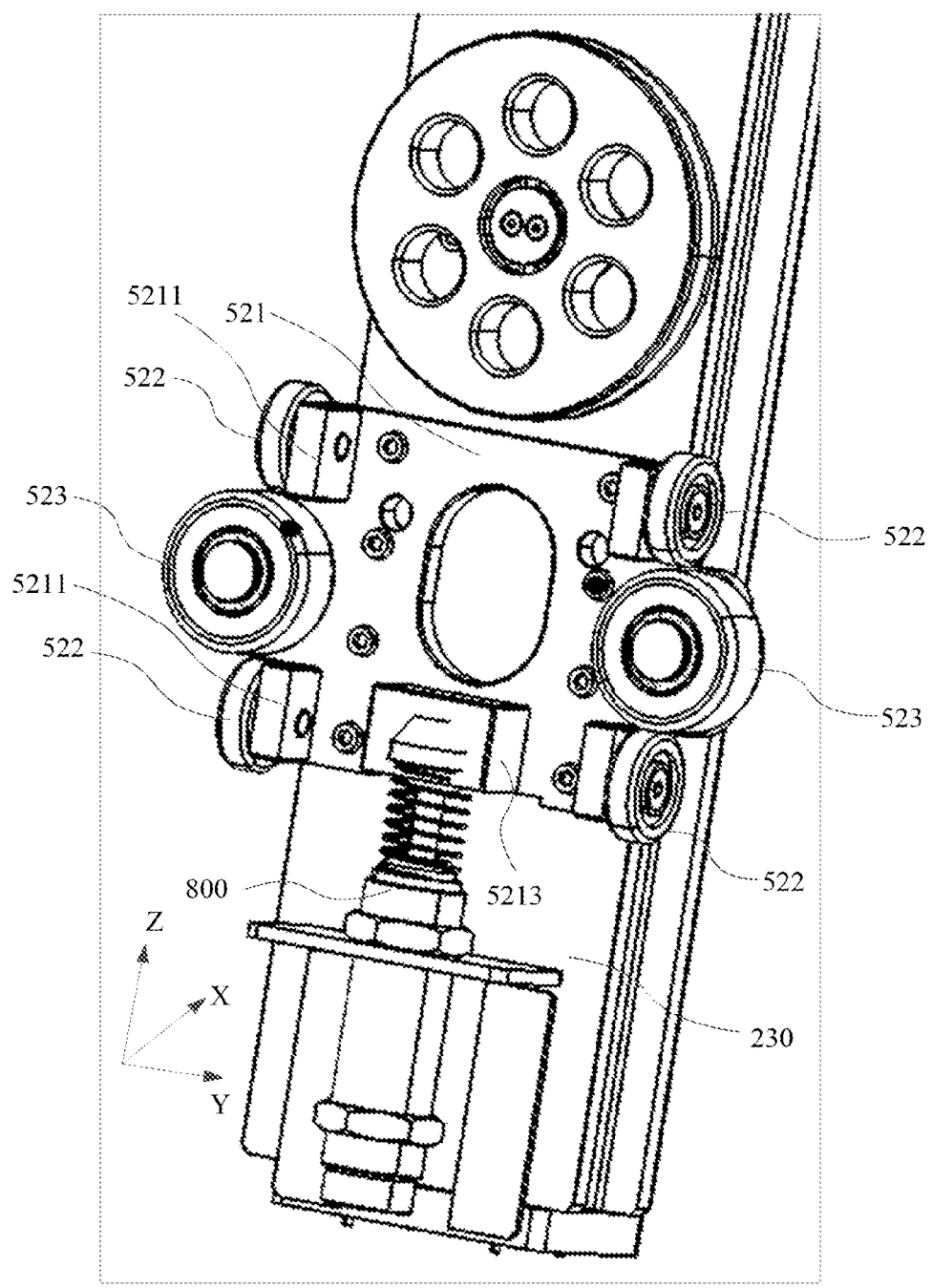
FIG. 46 is a partial schematic diagram of FIG. 35 viewed from another angle.
Figure 47:
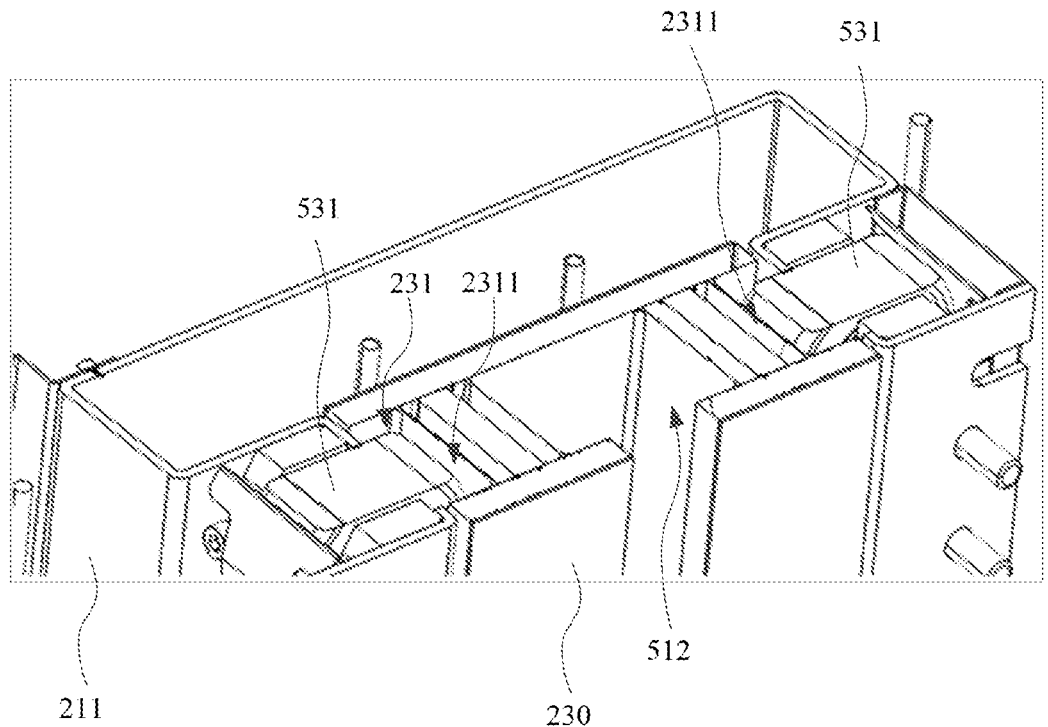
FIG. 47 is a schematic diagram of an internal structure along a Z-axis direction taken along a line H-H in FIG. 33.
Figure 48:
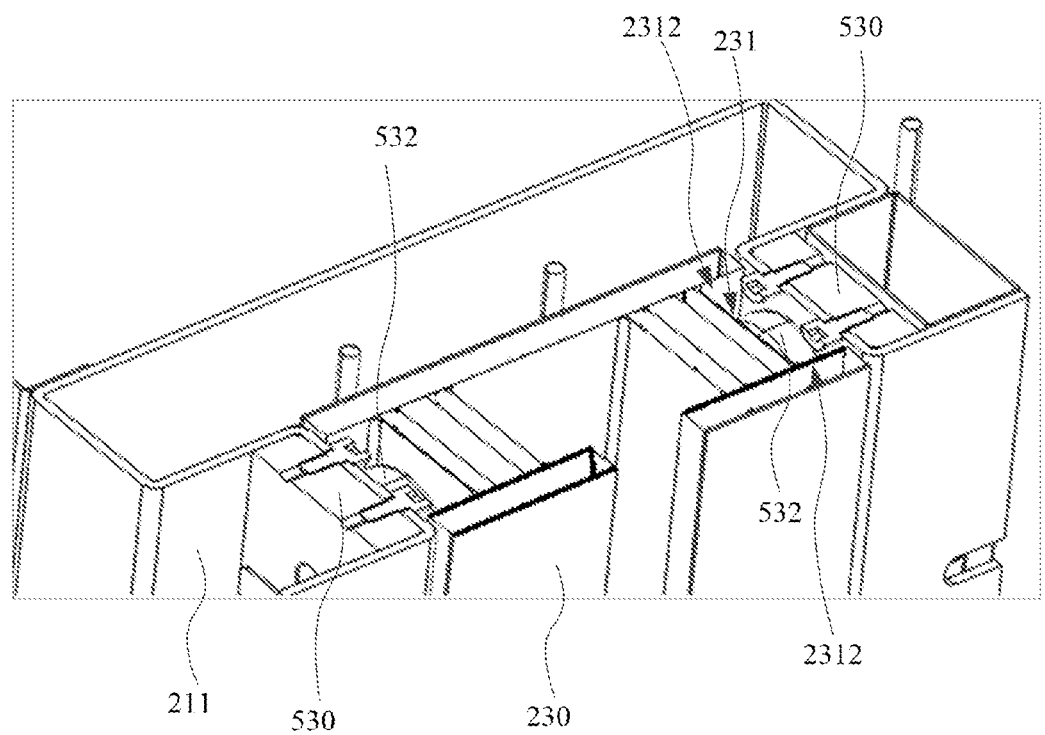
FIG. 48 is a schematic diagram of an internal structure along a Z-axis direction taken along a line I-I in FIG. 33.
Figure 49:
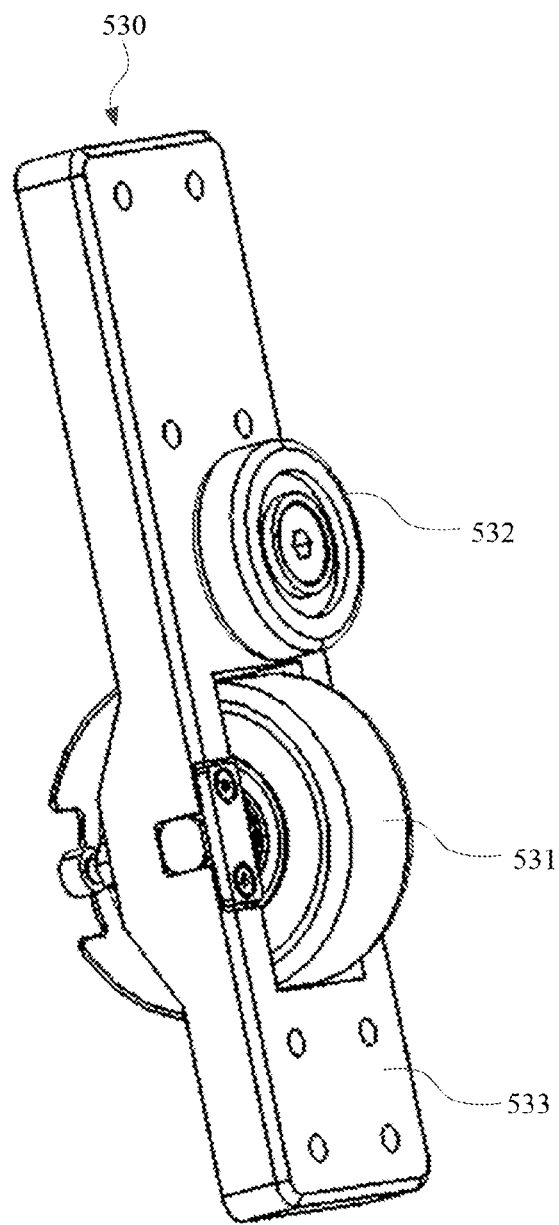
FIG. 49 is a schematic structural diagram of a third guide wheel set in a transport robot according to an embodiment of this application.
Figure 50:
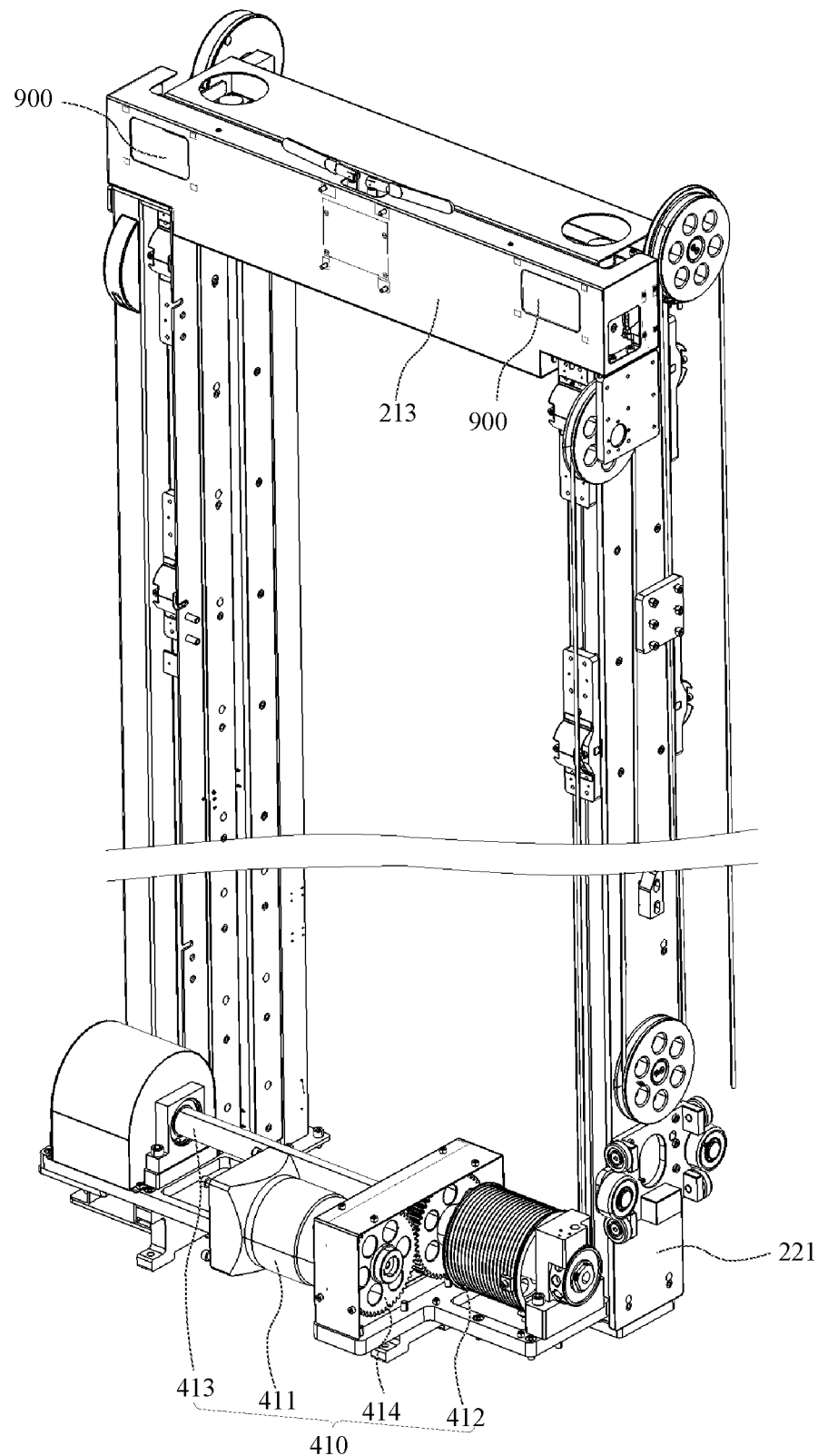
FIG. 50 is a schematic structural diagram of a column assembly and a driving mechanism in a transport robot according to an embodiment of this application.
Figure 51:
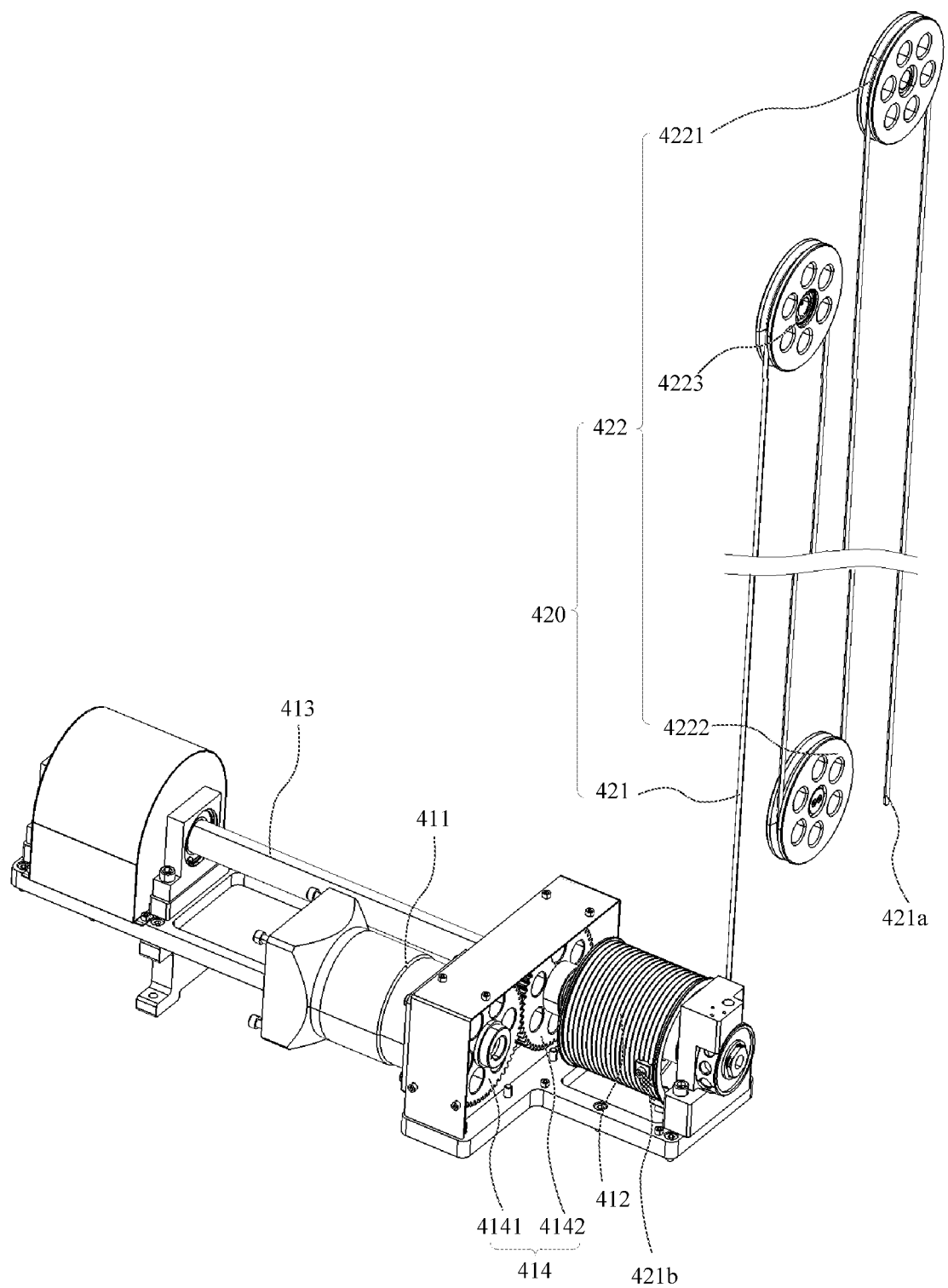
FIG. 51 is a schematic structural diagram of a driving mechanism in a transport robot according to an embodiment of this application.
Figure 52:
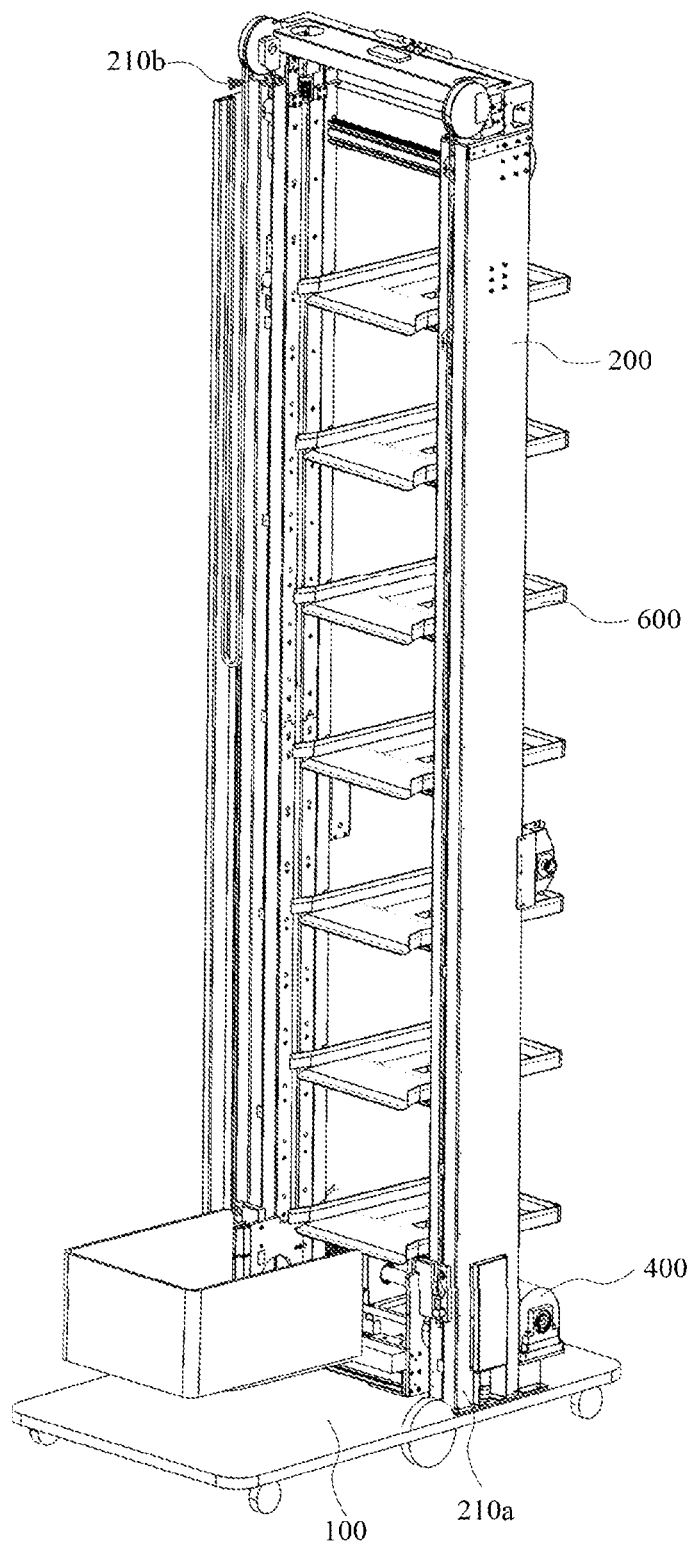
FIG. 52 is a schematic structural diagram of a transport robot according to an embodiment of this application.
Figure 53:
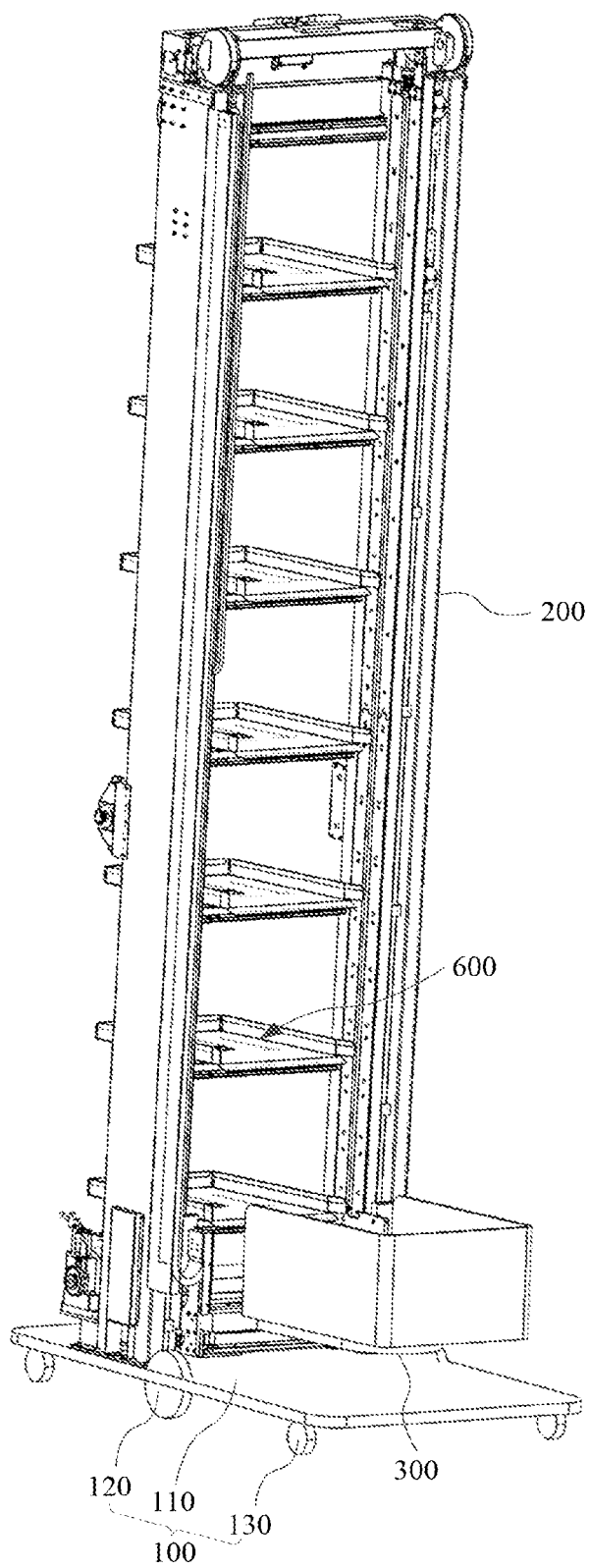
FIG. 53 is a schematic structural diagram of a transport robot viewed from another angle according to an embodiment of this application.
Figure 54:
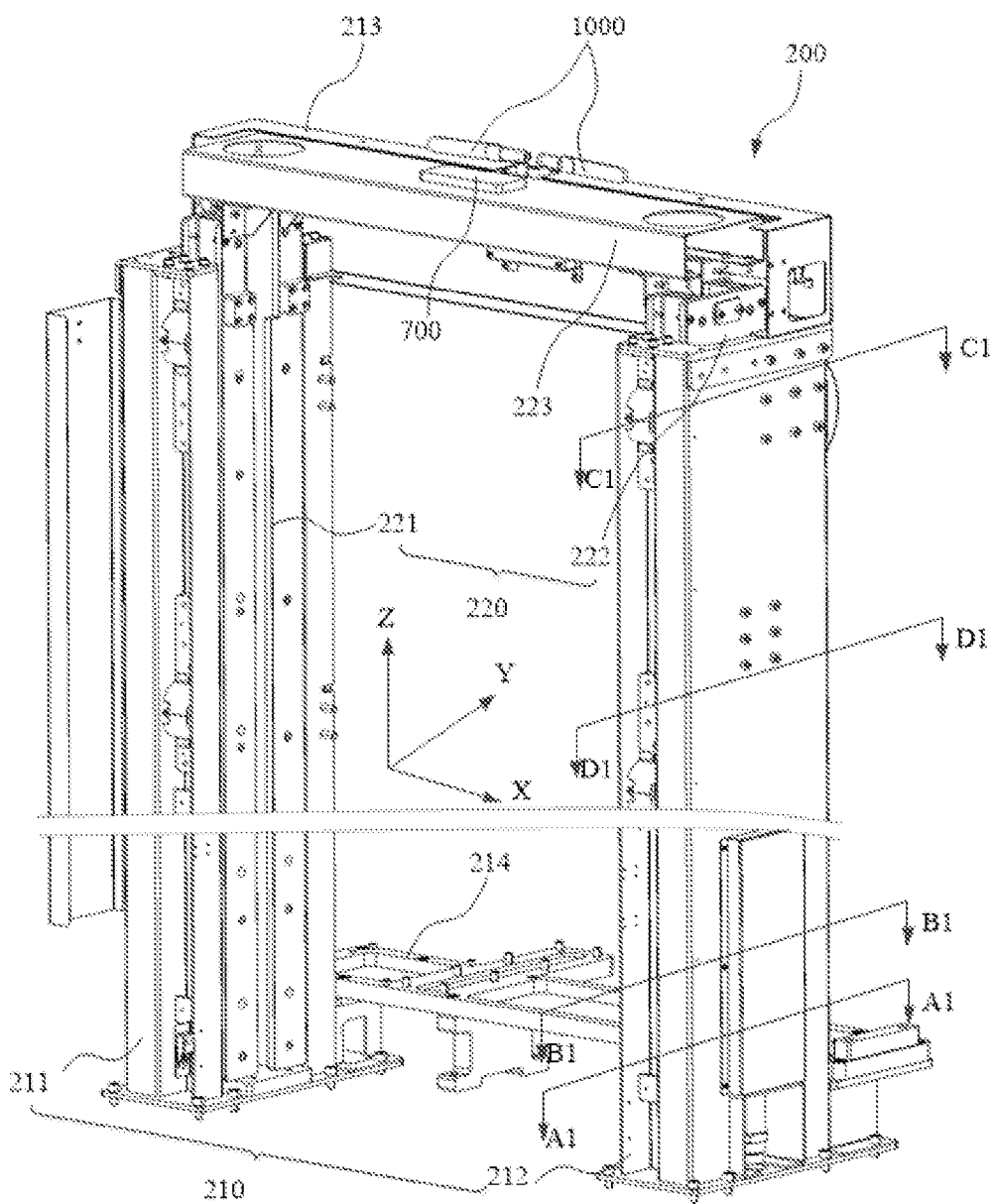
FIG. 54 is a schematic structural diagram of a vertical support in a transport robot according to an embodiment of this application.
Figure 55:
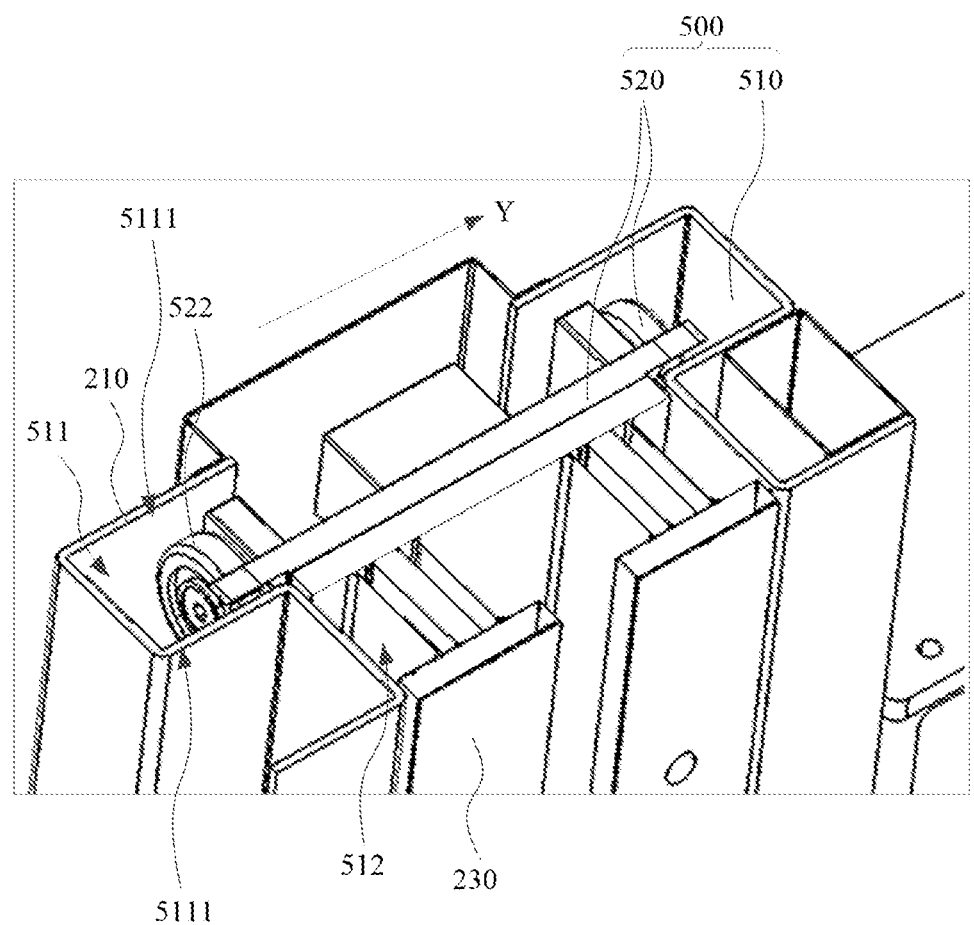
FIG. 55 is a schematic cross-sectional view of an internal structure along a Z-axis direction taken along a line A1-A1 in FIG. 54.
Figure 56:
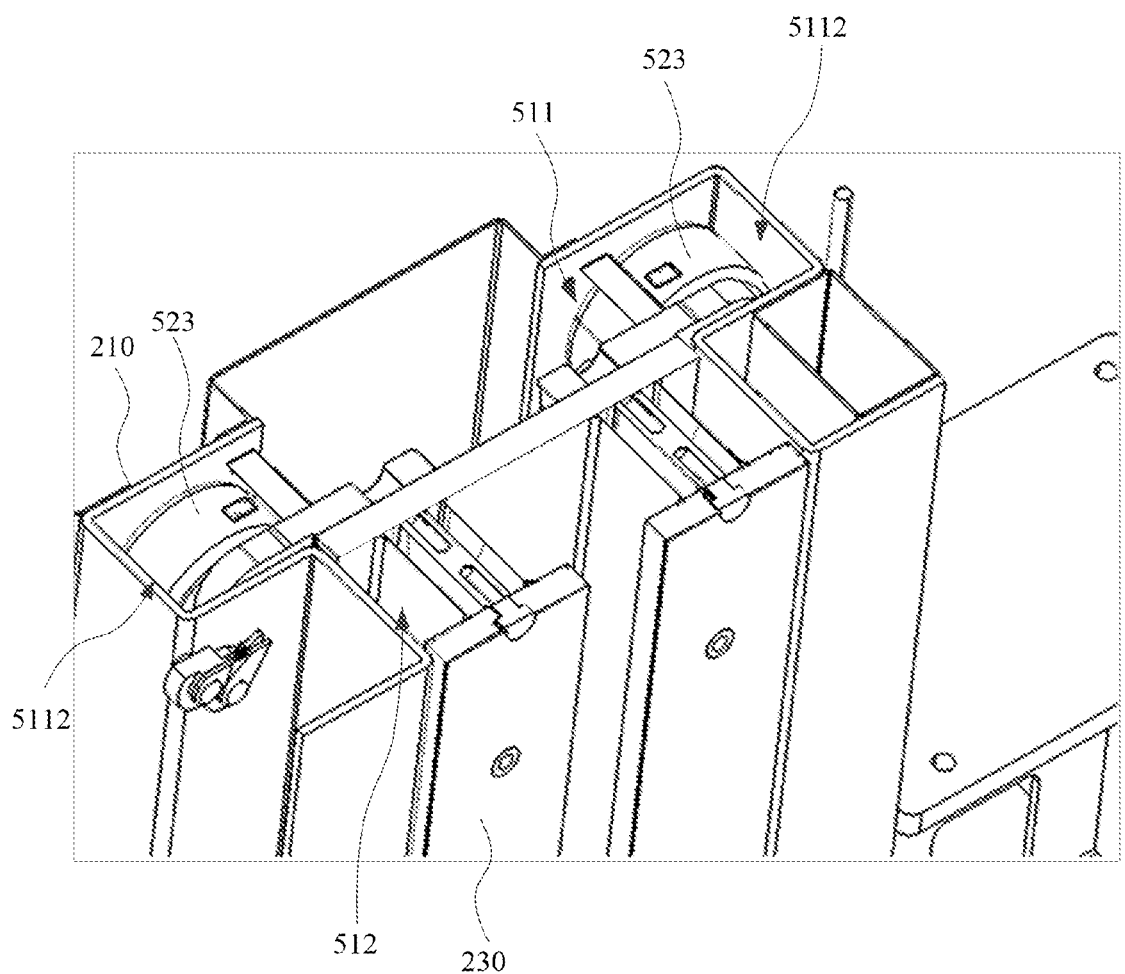
FIG. 56 is a schematic cross-sectional view of an internal structure along a Z-axis direction taken along a line B1-B1 in FIG. 54.
Figure 57:
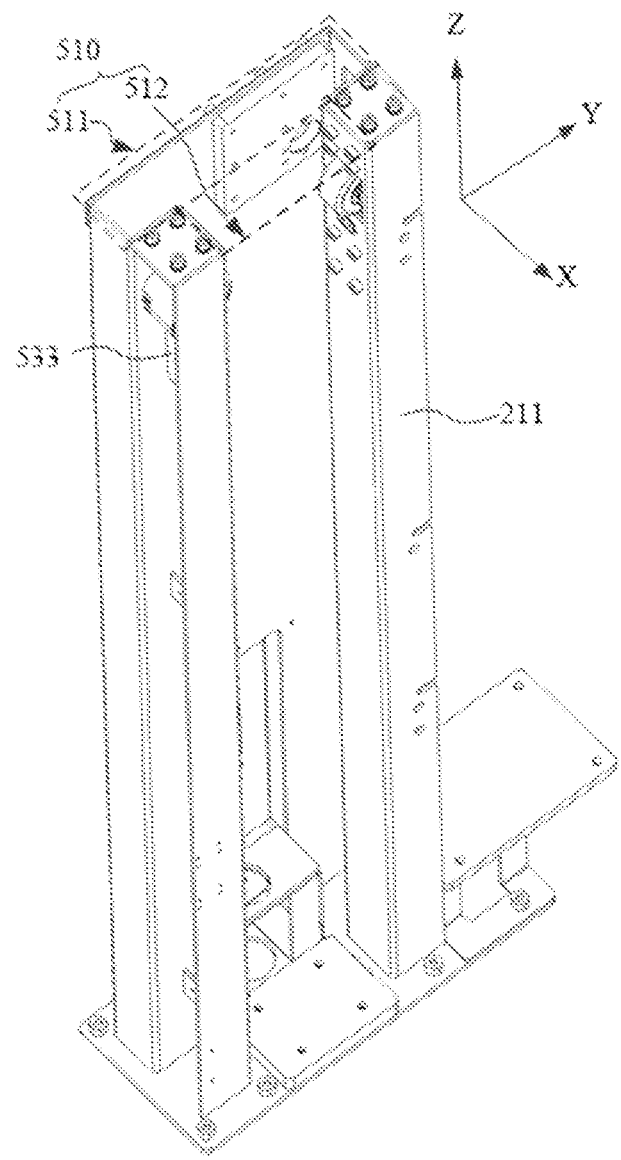
FIG. 57 is a schematic structural diagram of a first fixed column in a transport robot according to an embodiment of this application.
Figure 58:
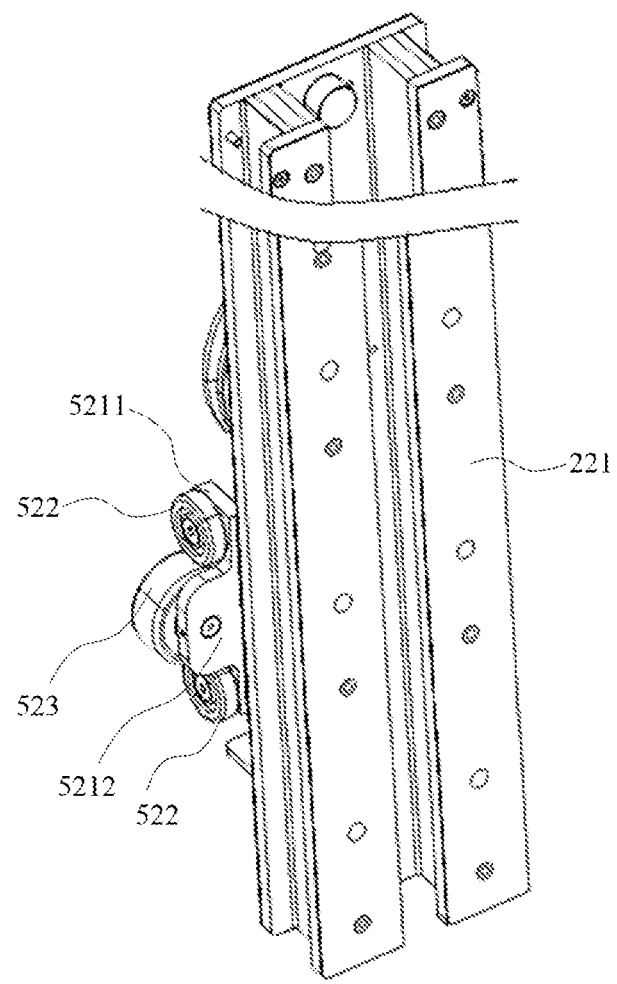
FIG. 58 is a schematic structural diagram of a first movable column in a transport robot according to an embodiment of this application.
Figure 59:
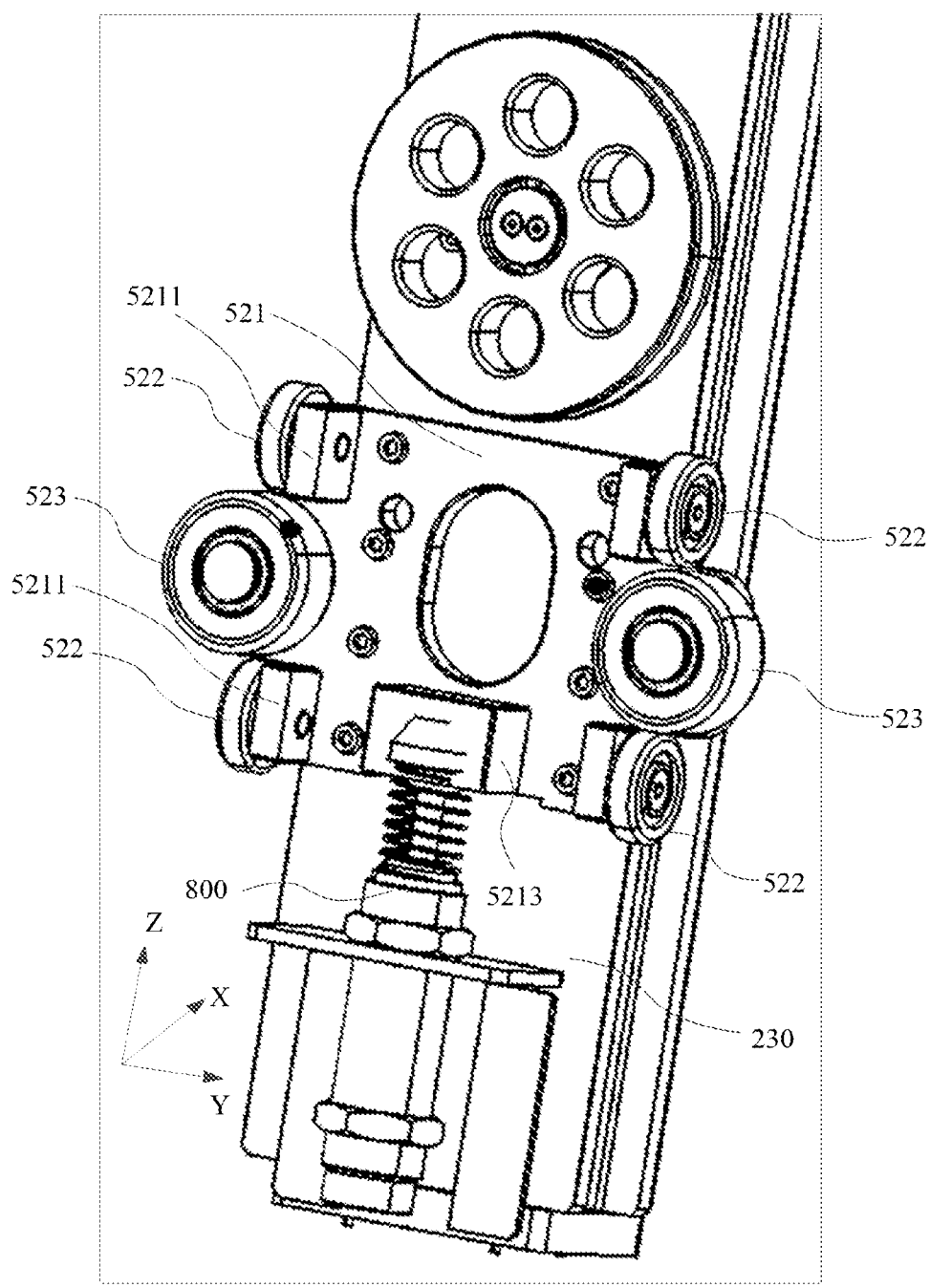
FIG. 59 is a partial schematic diagram of FIG. 58 in another direction.
Figure 60:
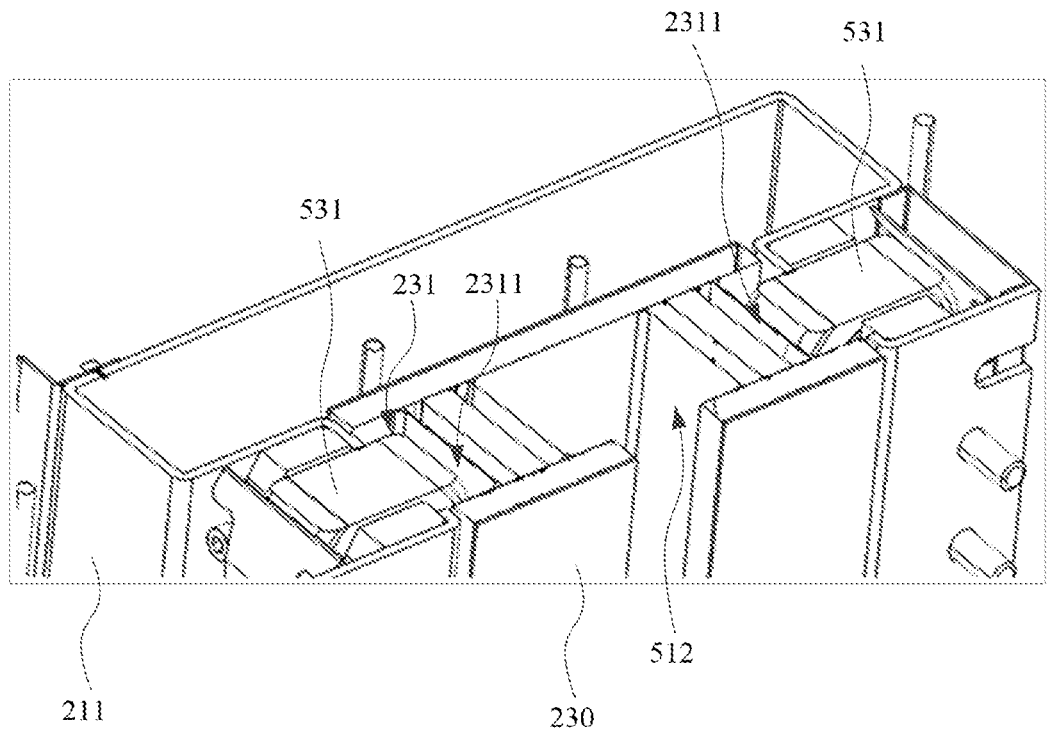
FIG. 60 is a schematic cross-sectional view of an internal structure along a Z-axis direction taken along a line C1-C1 in FIG. 54.
Figure 61:
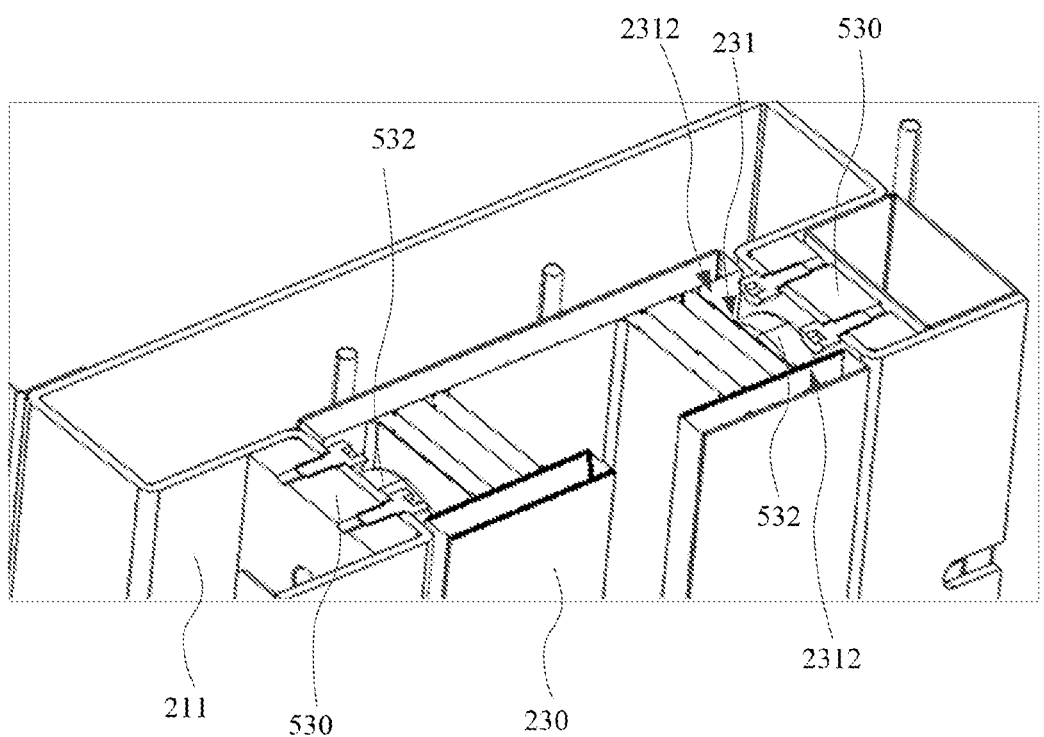
FIG. 61 is a schematic cross-sectional view of an internal structure along a Z-axis direction taken along a line D1-D1 in FIG. 54.
Figure 62:
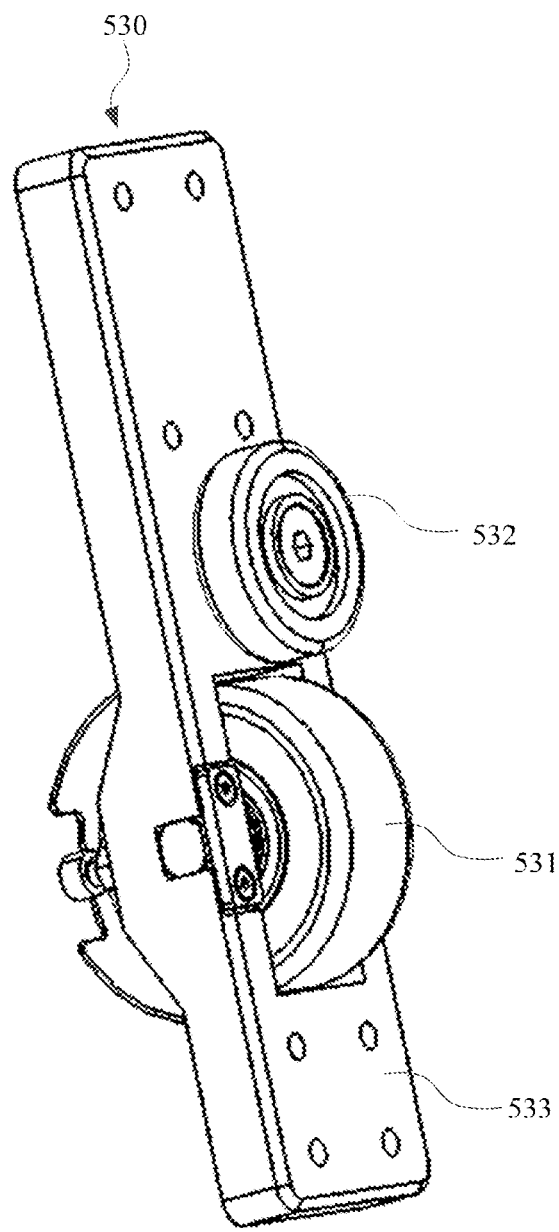
FIG. 62 is a schematic structural diagram of a third guide wheel set in a transport robot according to an embodiment of this application.

Referring to FIG. 28 to FIG. 30, the transport robot 100 includes a movable chassis (not shown), a vertical support, a driving assembly 20, and a first detector 101. The movable chassis is configured to carry the vertical support, the driving assembly 20, and the first detector 101. The movable chassis is used for the transport robot 100 to move on the ground. The vertical support includes a fixed column frame 11 and a second fixed column 12. The fixed column frame 11 is mounted on the movable chassis. The second fixed column 12 is movably mounted on the fixed column frame 11. The second fixed column 12 is movable relative to the fixed column frame 11 along a length direction of the fixed column frame 11. The driving assembly 20 is connected to the second fixed column 12, and configured to drive the second fixed column 12 to move relative to the fixed column frame 11. The first detector 101 is mounted at one end of the second fixed column 12 away from the movable chassis. The first detector 101 is connected to the driving assembly 20, and configured to detect a distance between the second fixed column 12 and a building above the second fixed column. The first detector 101 can move with the second fixed column 12 and detect the distance between the top end of the second fixed column 12 and the building above the second fixed column in real time. When a real-time distance detected by the first detector 101 is less than a preset value, the first detector 101 controls the driving assembly 20 to suspend work, so as to prevent the second fixed column 12 from continuing to move towards the building above the second fixed column and a collision is caused, and avoid that the transport robot causes damage and a safety accident.

The first detector 101 is a ranging sensor, which may be an ultrasonic sensor, a laser ranging sensor, an infrared ranging sensor, or the like.

The movable chassis is used for the transport robot 100 to move on the ground. The movable chassis includes a base plate, a driven wheel assembly, and a driving wheel assembly. The driven wheel assembly and the driving wheel assembly are mounted on the base plate. Specifically, the driven wheel assembly is a universal wheel. The driven wheel assembly includes at least three universal wheels, symmetrically mounted on the base plate. Two driving wheel assemblies are symmetrically mounted on the base plate. The driven wheel assembly and the driving wheel assemblies jointly support the base plate. The transport robot 100 can steer by deflecting the transport robot 100 toward a side of one of the two driving wheel assemblies with a lower rotational speed through a difference in rotational speeds of the two driving wheel assemblies.

Referring to FIG. 29, two fixed column frames 11 are symmetrically mounted on the movable chassis, and the second fixed column 12 includes a movable vertical beam 121, a fixed beam 122, and a movable beam 123. Two movable vertical beams 121 are movably mounted on the two fixed column frames 11, and the movable vertical beam 121 is movable relative to the fixed column frame 11 along a length direction of the fixed column frame 11. Two ends of the fixed beam 122 are fixed to one ends of the two movable vertical beams 121 away from the movable chassis respectively. The fixed beam 122 enables two movable beams 123 to simultaneously move along the length direction of the fixed column frame 11. Two ends of the movable beam 123 are movably mounted on the two movable vertical beams 121 respectively, and the movable beam 123 is movable relative to the movable vertical beam 121 along a length direction of the movable vertical beam 121. The driving assembly 20 is connected to the movable beam 123. The driving assembly 20 can drive the movable beam 123 to move relative to the movable vertical beam 121 along a length direction of the movable vertical beam 121. When the movable beam 123 moves along the length direction of the movable vertical beam 121 to abut against the fixed beam 122, the movable beam 123 can drive the fixed beam 122 to move, so that the movable vertical beam 121 moves relative to the fixed column frame 221 along a length direction of the fixed column frame 221. That is, the driving assembly 20 can drive the movable beam 123 to move relative to the movable vertical beam 121 and/or the movable beam 123, the fixed beam 122, and the movable vertical beam 121 to simultaneously move relative to the fixed column frame 11.

A first sliding groove 1101 is arranged on two opposite side walls of the two fixed column frames 11. The first sliding groove 1101 is arranged along the length direction of the fixed column frame 11. The movable vertical beam 121 is at least partially accommodated in the first sliding groove 1101. The movable vertical beam 121 can move along the first sliding groove 1101. A second sliding groove 1211 is arranged on two opposite side walls of the two movable vertical beams 121. The second sliding groove 1211 is arranged along the length direction of the movable vertical beam 121. Two ends of the movable beam 123 are movably mounted on two second sliding grooves 1211 respectively. The movable beam 123 can slide along the second sliding groove 1211. By using the arrangement above, the entire second fixed column 12 can move relative to the fixed column frame 11 along a preset track. Preferably, the fixed column frame 11 and the movable vertical beam 121 are arranged perpendicular to the base plate, and the fixed beam 122 and the movable beam 123 are arranged perpendicular to the movable vertical beam 121.

The transport robot 100 further includes a main shock absorbing member 40, mounted at one end of the fixed column frame 11 close to the movable chassis, located below the second fixed column 12, and configured to buffer an impact force on the movable chassis when the second fixed column 12 descends. Specifically, a main shock absorbing member 40 is arranged on the two fixed column frames 11 respectively, and the main shock absorbing member 40 is accommodated in the first sliding groove 1101. A first baffle 111 is arranged at one end of the fixed column frame 11 close to the movable chassis. The first baffle 111 is arranged parallel to a bottom surface of the movable vertical beam 121. One end of the main shock absorbing member 40 extends through the first baffle 111 and is arranged opposite to a bottom surface of the second fixed column 12. The part of the main shock absorbing member 40 extending through the first baffle 111 has elastic recovery capability, which can help to directly abut against the bottom surface of the movable vertical beam 121, so as to buffer the second fixed column 12. The first baffle 111 plays a protective role. When the movable vertical beam 121 abuts against one end of the main shock absorbing member 40 to be flush with a surface of the first baffle 111 facing the second fixed column 12, the first baffle 111 directly abuts against the bottom surface of the movable vertical beam 121, so as to prevent the second fixed column 12 from continuing to move toward the movable chassis.

In some other embodiments, the first baffle 111 may be omitted, and a limit compression position of the main shock absorbing member 40 is a limit position to which the second fixed column 12 can move away from the chassis.

Referring to FIG. 30, the main shock absorbing member 40 is a hydraulic shock absorber, which includes a cylinder block 41, a piston rod 42, and a first elastic member 43. The cylinder block 41 is mounted on the fixed column frame 11. An outer side wall of the piston rod 42 is movably sleeved on the cylinder block 41. The piston rod 42 can move relative to the cylinder block 41 along a length direction of the piston rod. One end of the piston rod 42 extends through the first baffle 111 and is arranged opposite to the second fixed column 12. The first elastic member 43 elastically connects the cylinder block 41 and the piston rod 42. The first elastic member 43 is configured to provide elastic potential energy that enables the piston rod 42 to abut against the second fixed column 12. After the second fixed column 12 is disengaged from one end of the piston rod 42, the piston rod 42 can quickly extend from the cylinder block 41 under the elastic recovery action of the first elastic member 43, so as to cope with the frequent ascending or descending of the second fixed column 12 when the transport robot 100 transports. Optimally, a buffer pad 421 is arranged on a surface of the piston rod 42 opposite to the movable vertical beam 121, and the buffer pad 421 plays a further buffering role. In a specific implementation, the buffer pad 421 may be made of a nylon material.

A first fixed plate 112 is also arranged at one end of the fixed column frame 11 close to the movable chassis, and the first fixed plate 112 is configured to fix the main shock absorbing member 40. The main shock absorbing member 40 further includes two fixing nuts 44. An outer side wall of the cylinder block 41 is provided with threads. The cylinder block 41 extends through the first fixed plate 112. The two fixing nuts 44 are connected to the cylinder block 41 at two sides of the first fixed plate 112 in a threaded manner and configured to abut against the first fixed plate 112, so that the main shock absorbing member 40 is fixed on the first fixed plate 112.

Still referring to FIG. 29, the transport robot 100 further includes a secondary shock absorbing member 60, mounted on the fixed beam 122, located between the fixed beam 122 and the movable beam 123, and configured to buffer an impact force generated on the fixed beam 122 when the movable beam 123 ascends. Specifically, a secondary shock absorbing member 60 is arranged at two ends of the fixed beam 122 respectively. A second baffle (not shown) is arranged on a surface of the fixed beam 122 opposite to the movable beam 123. The second baffle is arranged parallel to a top surface of the movable beam 123 and fixedly connected to the fixed beam 122. One end of the secondary shock absorbing member 60 extends through the second baffle and is arranged opposite to the top surface of the movable beam 123. The part of the secondary shock absorbing member 60 extending through the second baffle has elastic recovery capability, which can help to directly abut against the top surface of the movable beam 123, so as to buffer the movable beam 123. The second baffle plays an abutting role. When the movable beam 123 abuts against one end of the secondary shock absorbing member 60 to be flush with a surface of the second baffle facing the movable beam 123, the second baffle plate directly abuts against a top surface of the movable vertical beam 121. Therefore, the movable beam 123 can drive the fixed beam 122 to move, so that the movable vertical beam 121 moves relative to the fixed column frame 11 along the length direction of the fixed column frame 11.

The secondary shock absorbing member 60 is a hydraulic buffer, a second fixed plate (not denoted) is arranged on the fixed beam 122, and the secondary shock absorbing member 60 is fixed to the second fixed plate.

In some other embodiments, the fixed beam 122 may be omitted, and the secondary shock absorbing member 60 is mounted at one end of the movable vertical beam 121 away from the movable chassis and located above the movable beam 122.

The transport robot further includes a second detector (not shown), connected to the driving assembly 20, and configured to detect two limit positions of the second fixed column 12 moving relative to a length direction of the fixed column frame 11, so as to control stop or start of the driving assembly 20. The two limit positions are respectively an upper limit position to which the movable vertical beam 121 can move away from the movable chassis along the length direction of the fixed column frame 11, and a lower limit position to which the movable vertical beam 121 can move toward the movable chassis along the length direction of the fixed column frame 11. In a specific implementation, the second detector may be a ranging sensor. The ranging sensor may be directly mounted at one end of the fixed column frame close to the movable chassis and opposite to a bottom surface of the movable vertical beam 121. Alternatively, the second detector may be a stroke switch set. The stroke switch set includes a first stroke switch and a second stroke switch, the first stroke switch is mounted at one end of the fixed column frame 22 close to the movable chassis, the second stroke switch is mounted at one end of the fixed column frame 22 away from the movable chassis, and one end of the movable vertical beam 121 corresponding to the first stroke switch is provided with a bump. When the movable vertical beam 121 moves to the lower limit position, the bump triggers the first stroke switch, and when the movable vertical beam 121 moves to the upper limit position, the bump triggers the second stroke switch.

Referring to FIG. 29, FIG. 14, and FIG. 15, the transport robot 100 further includes a braking device 90, configured to brake the second fixed column 12, so that the second fixed column 12 stops moving. By arranging the braking device 90, on the one hand, emergency braking can be implemented during the transport work of the transport robot 100, and on the other hand, the driving assembly 20 of the transport robot 100 can be prevented from being activated by mistake.

The driving assembly 20 includes a motor 21 and a transmission mechanism 22. The transmission mechanism 22 connects an output shaft of the motor 21 and the second fixed column 12. The motor 21 can drive the second fixed column 12 to move relative to the fixed column frame 11 through the transmission mechanism 22. The braking device 90 is connected to the transmission mechanism 22, and can brake the transmission mechanism 22, so as to implement the braking of the second fixed column 12. The first detector 101 described above is connected to the motor 21 of the driving assembly 20.

The transmission mechanism 22 includes a spool 221, a pulley block 222, and a rope 223. The spool 221 is connected to the output shaft of the motor 21. The pulley block 222 is rotatably connected to the fixed column frame 11 and the second fixed column 12. One end of the rope 223 is fixed to the spool 221, and an other end of the rope 223 winds around the pulley block 222 and is connected to the second fixed column 12. The braking device 90 is connected to the spool 221, and can brake the spool 221, so as to implement the braking of the second fixed column 12. Specifically, an other end of the rope 223 winds around the pulley block 222 and is fixed to the movable beam 123.

A gear set may also be arranged between the spool 221 and the motor 21, and the gear set is configured to connect the output shaft of the motor 21 and the spool 221. For example, the gear set includes a first gear and a second gear. The first gear is connected to the output shaft of the motor 21. The second gear meshes with the first gear. The spool 221 is connected to the second gear and coaxially arranged with the second gear.

The pulley block 222 includes a top pulley 2221, a bottom pulley 2222, and a main pulley 2223. The top pulley 2221 is rotatably mounted at one end of the second fixed column 12 away from the movable chassis. The bottom pulley 2222 is rotatably mounted at one end of the second fixed column 12 close to the movable chassis. The main pulley 2223 is rotatably mounted at one end of the fixed column frame 11 away from the movable chassis. Specifically, the top pulley 2221 is mounted on the fixed beam 122, the bottom pulley 2222 is mounted at one end of the movable vertical beam 121 close to the movable chassis, one end of the rope 223 is tied to the movable beam 123, and an other end of the rope 223 is tied to the spool 221 after winding around the top pulley 2221, the bottom pulley 2222, and the main pulley 2223. In this way, when the rope 223 is retracted by the spool 221, the rope 223 can directly pull the movable beam 123 to ascend or descend.

The braking device 90 includes a brake disc 91, a guide base 92, and a stopper 93. The structure of the braking device 90 may be the same as the structure of the braking device 90 in the foregoing embodiment. For details, reference is made to the description of the braking device 90 in Embodiment 1, which are not described again in this embodiment.

The brake disc 91 is connected to the spool 221 and arranged coaxially with the spool 221, and can rotate together with the spool 221. The brake disc 91 is provided with at least one pin hole 9101.

The guide base 92 is mounted on the fixed column frame 11, the guide base 92 is provided with a slot 9201, and the slot 9201 runs through the guide base 92 along a length direction of the guide base 92.

Still referring to FIG. 27, the transport robot 100 further includes a goods storage device 6 and a carrying device. The goods storage device 6 is mounted on the fixed column frame 11. The carrying device is mounted on the second fixed column 12. The goods storage device 6 is configured to store goods. The carrying device is configured to store or retrieve the goods in the goods storage device 6.

The goods storage device 6 includes a plurality of trays 61 distributed at different heights, and beams 62 configured to support the trays 61. The plurality of trays 61 are arranged at intervals along the length direction of the fixed column frame 11, and one tray 61 corresponds to one beam 62.

Two ends of the beam 62 are mounted on two fixed column frames 11 respectively. The tray 61 has two ends distributed along a horizontal direction. One end of the tray 61 is fixed to the beam 62, and an other end of the tray 61 is suspended and away from the beam 62. The tray 61 is used for placing goods.

The carrying device includes a fork bracket, a fork, and a rotation driving assembly (not shown). The fork and the rotation driving assembly are mounted on the fork bracket.

The fork bracket is mounted on the second fixed column 12. The driving assembly 20 can drive the second fixed column 12 to reciprocate relative to the fixed column frame 22 along the length direction of the fixed column frame 11, so that the carrying device ascends or descends relative to the goods storage device 6. The fork is movably mounted on the fork bracket. The fork can be telescopically folded relative to the fork bracket. The rotation driving assembly is mounted between the fork and the fork bracket. The fork is configured to pick and place goods. The rotation driving assembly is configured to drive the fork to rotate, so that the fork faces a preset direction for picking or placing goods. Specifically, the fork bracket is mounted on the movable beam 123 of the second fixed column 12.

Embodiment 8

Referring to FIG. 31 to FIG. 41, the transport robot provided in this application includes a movable chassis 100, a driving assembly 400, a column assembly 200, a carrying device 300, and at least one guide structure.

The column assembly 200 extends along a vertical direction, the column assembly 200 and the movable chassis 100 are connected by a guide structure in a rolling manner, the movable chassis 100 is connected to the driving assembly 400, and the driving assembly 400 is configured to drive the carrying device 300 to ascend or descend along the vertical direction; and/or the column assembly 200 includes a fixed column frame 210 and a movable column frame 220 that are connected by a guide structure in a rolling manner, and the driving assembly 400 is configured to drive the movable column frame 220 to ascend or descend relative to the fixed column frame 210 along the vertical direction.

In a specific implementation, the movable chassis 100 may include a base plate 110, a driving wheel assembly 120, and a driven wheel assembly 130. Both the column assembly 200 and the driving assembly 400 may be connected to the base plate 110, or the driving assembly 400 and the carrying device 300 are connected to the column assembly 200. The column assembly 200 is connected to the base plate 110. The column assembly 200 extends upward from the base plate 110 along the vertical direction. An extending direction of the column assembly 200, that is the vertical direction, may also be referred to as a height direction of the transport robot (that is, a Z direction in FIG. 3). The column assembly 200, the carrying device 300, and the driving assembly 400 are supported by the base plate 110, and the base plate 110 is driven to move by the driving wheel assembly 120, so that the transport robot moves on the ground.

The transport robot may further include a plurality of storage racks 600, located on the column assembly 200, and arranged at intervals along a height direction of the column assembly 200. Distances between adjacent storage racks 600 may be the same or different, and positions of the storage racks 600 may be set according to requirements, which are not limited in this embodiment.

The storage racks 600 are configured to store goods, and the carrying device 300 can place or pick goods on the storage racks 600 or other shelves on which goods are placed. The carrying device 300 may be a device for placing or picking goods that is well known to a person skilled in the art, such as a mechanical arm, a gripping fork, or a gripper. For example, the carrying device 300 may include a fork bracket (not shown), a fork (not shown), and a rotation driving device (not shown). The fork and the rotation driving device are mounted on the fork bracket.

In this application, the driving assembly 400 is connected to the carrying device 300, and the carrying device 300 is driven by the driving assembly 400 to ascend or descend relative to the column assembly 200 along the vertical direction, or the driving assembly 400 drives the movable column frame 220 to ascend or descend relative to the fixed column frame 210 along the vertical direction. However, when the carrying device 300 or the movable column frame 220 moves, the stability is poor, and shaking is likely to occur. Therefore, in this application, the column assembly 200 and the carrying device 300 are connected in a rolling manner by a guide structure, and/or the movable column frame 220 and the fixed column frame 210 are connected in a rolling manner by a guide structure. Therefore, to reduce the shaking generated when the carrying device 300 and/or the movable column frame 220 ascend or descend, the stability of the carrying device 300 and/or the movable column frame 220 during the movement is improved, thereby improving the stability of the transport robot and reducing the abnormal noise generated during the use of the transport robot.

An example in which the column assembly 200 and the movable chassis 100 are connected in a rolling manner by a guide structure is described with reference to the accompanying drawings below.

Still referring to FIG. 32, FIG. 33, and FIG. 35 to FIG. 41, in this application, the guide structure includes a first guide assembly 50. The first guide assembly 50 includes a first sliding groove 51 and a first guide wheel set 52 inserted in the first sliding groove 51. The first sliding groove 51 is located on the column assembly 200, and extends along the vertical direction. The first guide wheel set 52 is connected to the carrying device 300, and configured to roll along an extending direction of the first sliding groove 51.

Specifically, the guide wheel set 52 includes a guide rod 5201 and at least one first guide wheel 5202. The guide wheel set 52 may further include at least one pair of second guide wheels 5203. The guide rod 5201 is connected to the carrying device 300. The at least one first guide wheel 5202 and the at least one pair of second guide wheels 5203 are connected to the guide rod 5201, and the at least one first guide wheel 5202 and the at least one pair of second guide wheels 5203 are configured to rotate relative to the guide rod 5201. The at least one first guide wheel 5202 and the at least one pair of second guide wheels 5203 are located in the first sliding groove 51. The at least one first guide wheel 5202 and/or the at least one pair of second guide wheels 5203 are configured to abut against inner walls of the first sliding groove 51. Each of the at least one first guide wheel 5202 may abut against a same inner wall or different inner walls of the first sliding groove 51. The at least one pair of second guide wheels 5203 may also abut against a same inner wall or different inner walls of the first sliding groove 51. The at least one first guide wheel 5202 and the at least one pair of second guide wheels 5203 are configured to abut against different inner walls of the first sliding groove 51 respectively.

The guide rod 5201 is configured to support the at least one first guide wheel 5202 and the at least one pair of second guide wheels 5203. A wheel surface of the at least one first guide wheel 5202 and/or wheel surfaces of the at least one pair of second guide wheel 5203 are configured to abut against different inner walls of the first sliding groove 51 respectively, so as to reduce the shaking during the movement of the carrying device 300.

In this application, there is an included angle between an axis of the at least one first guide wheel 5202 and an axis of each of the at least one pair of second guide wheels 5203. There is an included angle between the axis of the at least one first guide wheel 5202 and the extending direction of the first sliding groove 51, and between the axis of the at least one pair of second guide wheels 5203 and the extending direction of the first sliding groove, respectively. In this way, it is ensured that a wheel surface of each first guide wheel 5202 and a wheel surface of each second guide wheel 5203 are configured to abut against different inner walls of the first sliding groove 51 respectively.

Optionally, the axis of the at least one first guide wheel 5202 and the axis of each of the at least one pair of second guide wheels 5203 may be perpendicular to each other, and the axis of the at least one first guide wheel 5202 and the axis of each of the at least one pair of second guide wheels 5203 are perpendicular to the extending direction of the first sliding groove 51. In this way, wheel surfaces of the at least one first guide wheels 5202 and the at least one pair of second guide wheels 5203 do not affect each other. The axis of the at least one first guide wheel 5202 is along an X direction in FIG. 37, the axis of each of the at least one pair of second guide wheels 5203 is along a Y direction in FIG. 38, and the extending direction of the first sliding groove 51 is along a Z direction in FIG. 36.

The carrying device 300 includes at least one connection member 310, arranged in a one-to-one correspondence with the first guide assembly. The guide rod 5201 includes a guide rod body 5204 and at least one first extension portion 5205 arranged on the guide rod body 5204. The at least one pair of second guide wheels 5203 are rotatably connected to the first extension portion 5205. The at least one first guide wheel 5202 is rotatably connected to the guide rod body 5204. The guide rod body 5204 is connected to the connection member 310.

Specifically, the guide rod body 5204 extends along the vertical direction, the first extension portion 5205 is perpendicular to the guide rod body 5204, and two opposite sides of the first extension portion 5205 are connected to the at least one pair of second guide wheels 5203.

Positions of the at least one first guide wheel 5202 and the at least one pair of second guide wheels 5203 in the first guide wheel set 52 are described below with reference to the column assembly 200.

Still referring to FIG. 31 to FIG. 41, the column assembly 200 includes a fixed column frame 210 and a movable column frame 220. The first sliding groove 51 is located on the movable column frame 220. A first end 210a of the fixed column frame is fixedly connected to the movable chassis 100, and the fixed column frame 210 extends toward the vertical direction. The movable column frame 220 is connected to the fixed column frame 210. The carrying device 300 is connected to the movable column frame 220 and configured to move relative to the movable column frame 220 along the vertical direction.

Optionally, the movable column frame 220 is configured to move relative to the fixed column frame 210 along the vertical direction. In this way, the column assembly 200 can extend or retract, which facilitates the carrying device 300 to carry goods at a relatively high position or store goods at a relatively high position.

In some embodiments, the driving assembly 400 may be connected to the movable column frame 220, and is configured to drive the movable column frame 220 to move along the extending direction of the fixed column frame 210. That is, the movable column frame 220 can move upward or downward relative to the fixed column frame 210 along the vertical direction, so that the column assembly 200 can extend or retract. In some other embodiments, the driving assembly 400 is configured to drive the carrying device 300 to move relative to the movable column frame 220. When the carrying device 300 moves to a top end of the movable column frame 220, the driving assembly 400 drives the movable column frame 220 to move along the extending direction of the fixed column frame 210 through the carrying device 300.

In this application, the fixed column frame 210 includes a first fixed column 211 and a second fixed column 212 that are fixedly connected to the movable chassis 100.

The movable column frame 220 includes a first movable column 221 and a second movable column 222. The first movable column 221 is connected to the first fixed column 211. The second movable column 222 is connected to the second fixed column 212. The first movable column 221 and the second movable column 222 are provided with a first sliding groove 51 respectively.

The first movable column 221 may be slidably connected to the first fixed column 211 through the first sliding grooves and a slider. The first movable column 221 may also be connected to the first fixed column 211 in a rolling manner by the first guide wheel set 52. The second movable column 222 may be slidably connected to the second fixed column 212 through the first sliding grooves and a slider. The second movable column 222 may also be connected to the second fixed column 212 in a rolling manner by the first guide wheel set 52. This is not limited in this embodiment.

In this embodiment, the carrying device 300 is located between the first movable column 221 and the second movable column 222, and two opposite sides of the carrying device 300 are connected to the first movable column 221 and the second movable column 222 in a rolling manner by different first guide assemblies 50 respectively.

Specifically, at least one connection member 310 is arranged at the two opposite sides of the carrying device 300 respectively. The connection member 310 at a first side 300a of the carrying device is connected to the guide rod body 5204 in the first guide wheel set 52 in the first sliding groove 51 of the first movable column 221. Correspondingly, the connection member 310 at a second side of the carrying device is connected to the guide rod body 5204 in the first guide wheel set 52 in the first sliding groove 51 of the second movable column 222. In this way, the carrying device 300 is firmly connected, and the stability of the carrying device 300 when moving relative to the movable column frame 220 is maintained.

The structure of a rolling connection between the carrying device 300 and the first movable column 221 is the same as that of a rolling connection between the carrying device 300 and the second movable column 222. For the convenience of description, an example in which the connection member 310 at the first side 300a of the carrying device is connected to the guide rod body 5204 in the first guide wheel set 52 in the first sliding groove 51 of the first movable column 221 is used for description in this embodiment and the accompanying drawings.

In this application, the first sliding groove 51 may include a first accommodating section 5101 and a second accommodating section 5102 that extend along the extending direction of the first sliding groove 51. The first accommodating section 5101 is in communication with the second accommodating section 5102, and a width of the second accommodating section 5102 (that is, a length in the Y direction in FIG. 38) is less than a width of the first accommodating section 5101. That is, a cross section of the first sliding groove 51 perpendicular to the extending direction of the first sliding groove 51 is in a convex shape. The at least one first guide wheel 5202 and the at least one pair of second guide wheels 5203 are located in the first accommodating section 5101. The guide rod body 5204 is located in the second accommodating section 5102. The first extension portion 5205 extends into the first accommodating section 5101. In this way, the at least one first guide wheel 5202 and the at least one pair of second guide wheels 5203 are limited to be within the first accommodating section 5101.

The wheel surface of the at least one first guide wheel 5202 is configured to abut against two opposite first side surfaces 5206 of the first accommodating section 5101; and/or the wheel surfaces of the at least one pair of second guide wheel 5203 are configured to abut against two opposite second side surfaces 5207 of the first accommodating section 5101.

Referring to FIG. 31 to FIG. 43, in some embodiments, at least one limiting member 250 is arranged at an upper part of the column assembly 200. The connection member 310 is provided with at least one notch 311, arranged in a one-to-one correspondence with the limiting member 250. When the carrying device 300 moves to a second end of the column assembly 200, the notch 311 abuts against the limiting member 250.

In a specific implementation, the notch 311 may be in fit with the limiting member 250. For example, when the limiting member 250 is a rectangle, the notch 311 is a rectangular notch in fit with the limiting member 250. When the carrying device 300 moves to the upper part of the column assembly 200, the notch 311 abuts against the limiting member 250, so as to prevent the carrying device 300 from moving out of the column assembly 200. The limiting member 250 may also be one of a spring, a silicon piece, or a rubber piece.

In order to avoid the impact of the carrying device 300 on the column assembly 200, in some embodiments, at least one first shock absorbing member 240 is arranged on the column assembly 200. When the notch 311 abuts against the limiting member 250, the connection member 310 abuts against the first shock absorbing member 240, and the first shock absorbing member 240 buffers the impact of the carrying device 300 on the column assembly 200.

In a specific implementation, the first shock absorbing member 240 may be located at a second end of an upper part of the column assembly 200, or the first shock absorbing member 240 may be located at a second end of the column assembly 200. The first shock absorbing member 240 is a shock absorber. It can be understood that, the first shock absorbing member 240 may alternatively be one of a spring, a silicon piece, or a rubber piece, which is not limited in this embodiment.

In some embodiments, the first shock absorbing member 240 is located in the first sliding groove 51, and the limiting member 250 is located on two opposite sides of the first sliding groove 51 respectively. In this way, the carrying device 300 is brought into contact with the limiting member 250 smoothly and stably, so as to avoid the impact on the goods on the carrying device 300.

In this application, a first shock absorbing member 240 is arranged in the first sliding groove 51 of the first movable column 221 and in the first sliding groove 51 of the second movable column 222 respectively. In this way, the impact of the carrying device 300 on the column assembly 200 is balanced.

The fixed column frame 210 may include a fixed beam 213. A first end of the first fixed column 211 and a first end of the second fixed column 212 are fixedly connected to the movable chassis 100. The first fixed column 211 and the second fixed column 212 are also connected by the fixed beam 213. A second end of the first fixed column 211 and a second end of the second fixed column 212 (that is, a second end 210b of the fixed column frame) may be connected by the fixed beam 213, or the fixed beam 213 is connected to a position close to the second end of the first fixed column 211 and the second end of the second fixed column 212. The first fixed column 211 and the second fixed column 212 are perpendicular to the movable chassis 100, the fixed beam 213 is perpendicular to the first fixed column 211, and the fixed beam 213 is perpendicular to the second fixed column 212. A support base 214 is arranged on the fixed column frame 210, and the driving mechanism 400 is connected to the support base 214.

An example in which the movable column frame 220 is connected to the fixed column frame 210 in a rolling manner by a guide structure is described below with reference to the accompanying drawings.

Referring to FIG. 31 to FIG. 35 and FIG. 44 to FIG. 49, in this application, the guide structure further includes a second guide assembly 500. The fixed column frame 210 is connected to the movable column frame 220 in a rolling manner by the second guide assembly 500. The driving assembly 400 is configured to drive the movable column frame 220 to move relative to the fixed column frame 210 along the vertical direction. The second guide assembly 500 is configured to guide the movable column frame 220 during the movement.

Specifically, the second guide assembly 500 includes a second sliding groove 510 and a second guide wheel set 520. The second sliding groove 510 extends along the vertical direction. The second guide wheel set 520 is located in the second sliding groove 510 and configured to move along the extending direction of the second sliding groove 510. The second sliding groove 510 is located on one of the fixed column frame 210 or the movable column frame 220. The second guide wheel set 520 is located on the other of the fixed column frame 210 or the movable column frame 220.

For ease of description, in this application, an example in which the second sliding groove 510 is located on the fixed column frame 210, and the second guide wheel set 520 is located on the movable column frame 220 is used for description. It can be understood that positions of the second sliding groove 510 and the second guide wheel set 520 may be interchangeable, that is the second sliding groove 510 is located on the movable column frame 220, and the second guide wheel set 520 is located on the fixed column frame 210.

Specifically, a second sliding groove 510 may be opened on the fixed column frame 210, the second guide wheel set 520 may be connected to the movable column frame 220, and the second guide wheel set 520 may be configured to abut against inner walls of the second sliding groove 510. When the movable column frame 220 moves, the second guide wheel set 520 rolls along the inner walls of the second sliding groove 510. Therefore, the shaking generated by the movable column frame 220 is reduced, the stability of the column assembly 220 is improved, and the abnormal noise generated during the use of the transport robot is reduced.

In this application, when the second sliding groove 510 is located on the fixed column frame 210, the movable column frame 220 is inserted in the second sliding groove 510, that is, the movable column frame 220 is sleeved in the fixed column frame 210. When the second sliding groove 510 is located on the movable column frame 220, the fixed column frame 210 is inserted in the second sliding groove 510, that is, the fixed column frame 210 is sleeved in the movable column frame 220. In this way, the space occupied by the column assembly 200 is reduced.

The fixed column frame 210 includes a first fixed column 211 and a second fixed column 212 that are fixedly connected to the movable chassis 100 and provided with a second sliding groove 510 respectively. The movable column frame 220 includes a first movable column 221 and a second movable column 220, and a second guide wheel set 520 is arranged on the first fixed column 221 and the second fixed column 220 respectively.

It should be noted that, the structures of the first fixed column 211 and the second fixed column 212 are the same, and the structures of the first movable column 221 and the second movable column 220 are the same. In this embodiment, a connection manner between the column assembly 200 and the second guide assembly 500 is described by using the accompanying drawings of the first fixed column 211 and the first movable column 221 as an example.

In a specific implementation, the second guide wheel set 520 may include a guide base frame 521 and at least one pair of third guide wheels 522, and the second guide wheel set 520 may further include at least one pair of fourth guide wheels 523. The at least one pair of third guide wheels 522 and the at least one pair of fourth guide wheels 523 are rotatably arranged on the guide base frame 521. At least one third guide wheel 522 and/or at least one fourth guide wheel 523 are configured to abut against inner walls of the second sliding groove 510. The at least one pair of third guide wheels 522 may be configured to abut against the same inner walls or different inner walls of the second sliding groove 510. The at least one pair of fourth guide wheels 523 may also be configured to abut against the same inner walls or different inner walls of the second sliding groove 510. The at least one pair of third guide wheels 522 and the at least one pair of fourth guide wheels 523 are configured to abut against different inner walls of the second sliding groove 510 respectively.

The guide base frame 521 is connected to the fixed column frame 210 or the movable column frame 220, and configured to support the at least one pair of third guide wheels 522 and the at least one pair of fourth guide wheels 523. The wheel surfaces of the at least one pair of third guide wheels 522 and/or the wheel surfaces of the at least one pair of fourth guide wheels 523 are configured to abut against different inner walls of the second sliding groove 510 respectively, so as to reduce the shaking generated by the movable column frame 220.

In this application, there is an included angle between an axis of each of the at least one pair of third guide wheels 522 and an axis of each of the at least one pair of fourth guide wheel 523. There is an included angle between the axis of each of the at least one pair of third guide wheels 522 and the extending direction of the second sliding groove 510, and between the axis of each of the at least one pair of fourth guide wheels 523 and the extending direction of the second sliding groove respectively. In this way, it is ensured that wheel surfaces of the third guide wheels 522 and wheel surfaces of the fourth guide wheels 523 are configured to abut against different inner walls of the second sliding groove 510 respectively.

Optionally, the axis of each of the at least one pair of the third guide wheels 522 and the axis of each of the at least one pair of fourth guide wheels 523 may be perpendicular to each other, and the axis of each of the at least one pair of third guide wheels 522 and the axis of each of the at least one pair of the fourth guide wheels 523 are perpendicular to the extending direction of the second sliding groove 510. In this way, the wheel surfaces of the third guide wheels 522 and the fourth guide wheels 523 do not affect each other. The axis of each of the at least one pair of third guide wheels 522 is along a Y direction in FIG. 46, the axis of each of the at least one pair of fourth guide wheel 523 is along an X direction in FIG. 46, and the extending direction of the second sliding groove 510 is along a Z direction in FIG. 4.

In some embodiments, at least one support portion 5211 is arranged at opposite edges of the guide base frame 521 respectively. The at least one support portion 5211 is perpendicular to the guide base frame 521. The at least one pair of third guide wheels 522 are arranged in a one-to-one correspondence with the support portion 5211. Each of the at least one pair of third guide wheels 522 is arranged at an outer side of the at least one support portion 5211. The at least one support portion 5211 is arranged at opposite edges of the guide base frame 521 (that is, at opposite sides of the guide base frame 521) respectively, and the third guide wheel 522 may be connected to the outer side of the support portion 5211 by a connecting shaft, thereby facilitating mounting the third guide wheel 522. A plane on which the third guide wheel 522 is located is perpendicular to a plane on which the guide base frame 521 is located. That is, the plane on which the third guide wheel 522 is located is an XZ plane in the figure, and the plane on which the guide base frame 521 is located is a YZ plane in FIG. 46.

In some other embodiments, the guide base frame 521 includes at least two second extension portions 5212 extending toward opposite outer sides of the guide base frame 521 respectively. The at least one pair of fourth guide wheels 523 are arranged on the second extension portion 5212. The at least one pair of fourth guide wheels 523 are arranged in a one-to-one correspondence with the second extension portion 5212. The fourth guide wheel 523 may be connected to the second extension portion 5212 by a connecting shaft, thereby facilitating mounting the at least one pair of fourth guide wheels 523. A plane on which the fourth guide wheel 523 is located is parallel to the plane on which the guide base frame 521 is located. That is, the plane on which the at least one pair of fourth guide wheels 523 are located and the plane on which the guide base frame 521 is located are the XZ plane in FIG. 46.

In the transport robot provided in this application, the second extension portion 5212 and the support portion 5211 are located at the same two opposite sides of the guide base frame 521. The second extension portion 5212 is located between support portions 5211 at the same side of the guide base frame 521. In this way, the at least one pair of third guide wheels 522 and the at least one pair of fourth guide wheels 523 are separately arranged, thereby improving the stability of the column assembly 220. In the accompanying drawings of this embodiment, an example in which there are two pairs of third guide wheels 522 and there is one pair of fourth guide wheels 523 is used for description.

The structure of the second guide wheel set 520 is described in the foregoing embodiment, and the structure of the second sliding groove 510 is described below with reference to the structure of the second guide wheel set 520.

In this application, the second sliding groove 510 includes a third accommodating section 511 extending along the extending direction of the second sliding groove 510, and the third accommodating section 511 includes two opposite first sliding groove side walls 5111 and two opposite second sliding groove side walls 5112.

The second guide wheel set 520 is located in the third accommodating section 511, the third guide wheels 522 are located between the two second sliding groove side walls 5111, and wheel surfaces of the at least one pair of fourth guide wheels 523 are configured to abut against the two second sliding groove side walls 5112 respectively. In this way, the at least one pair of fourth guide wheels 523 are main guide wheels, and the at least one pair of third guide wheels 522 are auxiliary guide wheels. When the movable column frame 220 shakes, the wheel surfaces of the at least one pair of third guide wheels 522 can abut against the second sliding groove side walls 5111, so as to reduce the shaking of the movable column frame 220.

In some embodiments, the second sliding groove 510 further includes a fourth accommodating section 512 extending along the extending direction of the second sliding groove 510. A width of the fourth accommodating section 512 (that is, a length in a Y direction in FIG. 44) is less than a width of the third accommodating section 511 (that is, a length in the Y direction in FIG. 44). The fourth accommodating section 512 is in communication with the third accommodating section 511. The first movable column 221 and the second movable column 220 include a body 230, located in the fourth accommodating section 512. A part of the body 230 extends into the third accommodating section 511 and is connected to the guide base frame 521. During mounting, the first movable column 221 is inserted into the second sliding groove 510 of the first fixed column 211 from the top of the first fixed column 211, and the second movable column 220 is inserted into the second sliding groove 510 of the second fixed column 212 from the top of the second fixed column 212. By arranging the width of the fourth accommodating section 512 to be less than the width of the third accommodating section 511, the second guide wheel set 520 is thereby limited to be within the third accommodating section 511.

In this application, the second guide assembly 500 further includes at least one third guide wheel set 530, configured to abut against different side walls of the movable column frame 220. The second guide wheel set 520 and the third guide wheel set 530 are located on different side walls of the movable column frame 220 respectively.

The third guide wheel set 530 includes at least one fifth guide wheel 531. The third guide wheel set 530 may further include at least one sixth guide wheel 532. Fifth guide wheels 531 are rotatably arranged at two opposite sides of the fixed column frame 210 respectively, sixth guide wheels 532 are rotatably arranged at the two opposite sides of the fixed column frame 210 respectively, and the fifth guide wheels 531 and the sixth guide wheels 532 are located at the same two opposite sides of the fixed column frame 210. A part of the at least one fifth guide wheel 531 extends into the fourth accommodating section 512, and a wheel surface of at least one fifth guide wheel 531 is configured to abut against two opposite sides of the body 230 respectively, and/or a part of the at least one sixth guide wheel 532 extends into the fourth accommodating section 512, and a wheel surface of at least one sixth guide wheel 532 is configured to abut against the two opposite sides of the body 230 respectively.

In some embodiments, the at least one fifth guide wheel 531 and the at least one sixth guide wheel 532 may be arranged in the same manner as the third guide wheel 522 and the second guide wheel 523. The wheel surface of the at least one fifth guide wheel 531 and the wheel surface of the at least one sixth guide wheel 532 may be configured to abut against different sides of the body 230 respectively, that is, an axis of the fifth guide wheel 531 may be perpendicular to an axis of the sixth guide wheel 532.

In a specific implementation, the third guide wheel set 530 is arranged on the first fixed column 211 and the second fixed column 212 respectively, and third guide wheel sets 530 on the first fixed column 211 and the second fixed column 212 are symmetrical. Similarly, the second guide wheel set 520 is arranged on the first fixed column 211 and the second fixed column 212 respectively, and the second guide wheel sets 520 on the first fixed column 211 and the second fixed column 212 are symmetrical.

In some embodiments, the body 230 includes a guide groove 231 extending along the vertical direction. The at least one sixth guide wheel 532 is located in the guide groove 231. The at least one sixth guide wheel 532 is configured to abut against opposite inner side walls 2311 of the guide groove 231, and/or the at least one fifth guide wheel 531 is configured to abut against a bottom wall 2312 of the guide groove 231.

In the accompanying drawings of this embodiment, the at least one sixth guide wheel 532 is located in the guide groove 231, and the at least one fifth guide wheel 531 is configured to abut against the bottom wall 2312 of the guide groove 231. In this way, the at least one fifth guide wheel 531 is a main guide wheel, and the at least one sixth guide wheel 532 is an auxiliary guide wheel. When the movable column frame 220 shakes, the wheel surface of the at least one sixth guide wheel 532 can abut against side walls of the guide groove 231, so as to reduce the shaking of the movable column frame 220.

In order to facilitate fixing the at least one fifth guide wheel 531 and the at least one sixth guide wheel 532, the third guide wheel set 530 further includes at least two fixed plates 533. The fifth guide wheel 531 and the sixth guide wheel 532 are connected to the fixed plates 533. The fixed plates 533 are fixedly connected to the fixed column frame 210.

In this application, the third guide wheel sets 530 are located at an upper part of the fixed column frame 210, and/or the guide base frame 521 is located at a lower part of the movable column frame 220. In this way, when the second guide wheel set 520 rolls along the inner walls of the second sliding groove 510, the movable column frame 220 is evenly guided by the second guide wheel set 520 and the third guide wheel set 530.

In some embodiments, in order to reduce the impact of the movable column frame 220 on the movable chassis 100, the vertical support further includes a second shock absorbing member 800, fixedly connected to the fixed column frame 210 or the movable chassis 100. A shock absorbing surface of the second shock absorbing member 800 faces the second guide wheel set 520. When the body 230 moves toward the movable chassis 100, the second guide wheel set 520 abuts against the second shock absorbing member 800.

In a specific implementation, an abutting portion 5213 is arranged on the guide base frame 521, and the second shock absorbing member 800 is located in the third accommodating section 511. When the body 230 moves toward the movable chassis 100, the abutting portion 5213 abuts against the second shock absorbing member 800.

The second shock absorbing member 800 is a shock absorber. It can be understood that, the second shock absorbing member 800 may alternatively be one of a spring, a silicon piece, or a rubber piece, which is not limited in this embodiment.

In this application, an indicator light 900 and/or a wireless module 1000 are further included. The indicator light 900 is configured to indicate a working state of the transport robot, and the wireless module 1000 is used for communication.

Specifically, the wireless module 1000 and the indicator light 900 are located on the fixed column frame 210, and the wireless module 1000 is located on a surface of the fixed column frame 220 away from the movable chassis 100. The wireless module 1000 and the indicator light 900 may be located on the fixed beam 213, the wireless module 1000 may be located on a top surface of the fixed beam 213, and the indicator light 900 may be located on a side surface of the fixed beam 213.

In this application, the movable column frame 220 may further include a movable beam 223, and a second end of the first movable column 221 and a second end of the second movable column 222 are connected by the movable beam 223. In this way, the first movable column 221 and the second movable column 222 can be maintained moving synchronously.

In some embodiments, the vertical support further includes a detection module 700 and a control module (not shown). The detection module 700 is located on the movable beam 223. The driving mechanism 400 and the detection module 700 are electrically connected to the control module. The detection module 700 is configured to detect a distance between the movable column frame 230 and an object above the movable column frame. The control module is configured to control, when the distance is less than a preset value, the movable column frame 220 to stop moving through the driving mechanism 400. In this way, the movable column frame 220 can be prevented from continuing to move toward the building above the movable column frame and a collision is caused, thereby avoiding damage and an accident caused by the vertical support. The object above the movable column frame 220 may be a beam, a longitudinal beam, or a top of a warehouse.

In a specific implementation, the detection module 700 may be located on a surface of the movable beam 223 away from the movable chassis 100, so that the detection module 700 can detect the distance between the movable column frame 220 and the object above the movable column frame.

Optionally, the detection module 700 may be a ranging sensor. Specifically, the detection module 700 may be a ranging sensor such as an ultrasonic sensor, a laser ranging sensor, an infrared ranging sensor that is well known to a person skilled in the art, which is not limited in this embodiment.

Referring to FIG. 31 to FIG. 51, in the transport robot provided in this application, the driving mechanism 400 includes a retractable assembly 410 and at least one set of traction assembly 420. The traction assembly 420 includes a traction rope 421 and a guide wheel set 422. The traction rope 421 is wound around the guide wheel set 422. A first end 421*a* of the traction rope 421 is connected to the carrying device 300. A second end 421*b* of the traction rope is connected to the retractable assembly 410. The retractable assembly 410 retracts or releases the traction rope 421, so that the carrying device 300 moves relative to the movable column frame 240.

In order to enable the carrying device 300 to move relative to the movable column frame 220, there may be two or more sets of traction assemblies 420, and the traction assemblies 420 are connected to two opposite sides of the column assembly 200 respectively.

The traction rope 421 may be a steel wire rope made of steel wire or a nylon rope. The traction rope 421 is a steel wire rope, so that when the carrying device 300 ascends or descends relative to the movable column frame 220, the traction rope 421 does not break due to excessive weight of goods carried by the carrying device 300.

In a specific implementation, the guide wheel set 422 may include a top pulley 4221, a bottom pulley 4222, and a main pulley 4223. The top pulley 4221 is detachably mounted on side surface of a second end of the movable column frame 220. The bottom pulley 4222 is detachably mounted on a side surface of a first end of the movable column frame 220 facing the fixed column frame 210. The main pulley 4223 is mounted at a second end of the fixed column frame 210. The traction rope 421 is tied to the retractable assembly 410 after winding around the top pulley 4221, the bottom pulley 4222, and the main pulley 4223. In this way, the entire structure of the transport robot is simplified and compact, and the utilization of the column assembly 200 is improved.

The retractable assembly 410 may include a motor 411 and a spool 412. The second end 421b of the traction rope is connected to the spool 412, and the traction rope 421 is wound around the spool 412. The motor 411 is configured to drive the spool 412 to rotate, so that the spool 412 retracts or releases the traction rope 421.

In some embodiments, the retractable assembly 410 may include a motor 411, a spool 412, a transmission shaft 413, and a transmission wheel set 414. The second end 421b of the traction rope is connected to the spool 412, and the traction rope 421 is wound around the spool 412. The transmission wheel set 414 includes a driving wheel 4141 and a driven wheel 4142 meshed with the driving wheel 4141. An output shaft of the motor 411 is connected to the driving wheel 4141. The driven wheel 4142 is sleeved on the transmission shaft 413. There is at least one spool 412, arranged in a one-to-one correspondence with the traction rope 421, and sleeved on the transmission shaft 413. During use, the motor 411 drives the transmission shaft 413 to rotate through the transmission wheel set 414, and the transmission shaft 413 drives the spool 412 to rotate clockwise or counterclockwise, so as to release or retract the traction rope 421. In this way, the carrying device 300 is controlled to ascend or descend relative to the movable column frame 220, and the movable column frame 220 ascends or descends relative to the fixed column frame 210.

Embodiment 9

Referring to FIG. 52 to FIG. 56, the transport robot provided in this application includes a movable chassis 100, a vertical support, and a carrying device 300. The vertical support includes a column assembly 200, a driving assembly 400, and a second guide assembly 500.

Specifically, the movable chassis 100 may include a base plate 110, a driving wheel assembly 120, and a driven wheel assembly 130. Both the column assembly 200 and the driving assembly 400 may be connected to the base plate 110, or the driving assembly 400 and the carrying device 300 are connected to the column assembly 200. The column assembly 200 is connected to the base plate 110. The column assembly 200 extends upward from the base plate 110 along a vertical direction. An extending direction of the column assembly 200 may also be referred to as a height direction of the transport robot (that is, a Z direction in FIG. 54, or may be referred to as the vertical direction). The column assembly 200, the carrying device 300, and the driving assembly 400 are supported by the base plate 110, and the base plate 110 is driven to move by the driving wheel assembly 120, so that the transport robot moves on the ground.

The transport robot may further include a plurality of storage racks 600, and the structures of the storage racks 600 are the same as those of the foregoing embodiment. Details are not described herein again.

In order to facilitate the carrying device 300 to carry goods at a relatively high position, or store goods at a relatively high position, the column assembly 200 can extend or retract. Specifically, the column assembly 200 may include a fixed column frame 210 and a movable column frame 220. The fixed column frame 210 extends upward from the movable chassis 100 along the vertical direction. A first end 210a of the fixed column frame is connected to the movable chassis 100. The carrying device 300 is connected to the movable column frame 220. The driving assembly 400 is configured to drive the movable column frame 220 to move along an extending direction of the fixed column frame 210. That is, the movable column frame 220 can move upward or downward relative to the fixed column frame 210 along the vertical direction, so that the column assembly 200 can extend or retract.

However, when the movable column frame 220 moves upward or downward (or may be referred to as ascending or descending) along the fixed column frame 210, the movable column frame 220 is likely to shake, resulting in poor stability of the column assembly 220 and abnormal noise in the transport robot. In view of this, in this application, a second guide assembly 500 is further included. The fixed column frame 210 is connected to the movable column frame 220 by the second guide assembly 500. The driving assembly 400 is configured to drive the movable column frame 220 to move along the extending direction of the fixed column frame 210. The second guide assembly 500 is configured to guide the movable column frame 220 during the movement.

Specifically, the second guide assembly 500 includes a sliding groove 510 and a third guide wheel set 520. The sliding groove 510 extends along the vertical direction. The third guide wheel set 520 is located in the sliding groove 510 and configured to move along an extending direction of the sliding groove 510. The sliding groove 510 is located on one of the fixed column frame 210 or the movable column frame 220. The third guide wheel set 520 is located on the other of the fixed column frame 210 or the movable column frame 220.

For ease of description, in this application, an example in which the sliding groove 510 is located on the fixed column frame 210, and the third guide wheel set 520 is located on the movable column frame 220 is used for description. It can be understood that positions of the sliding groove 510 and the third guide wheel set 520 may be interchangeable, that is, the sliding groove 510 is located on the movable column frame 220, and the third guide wheel set 520 is located on the fixed column frame 210.

Specifically, a sliding groove 510 may be opened on the fixed column frame 210, the third guide wheel set 520 may be connected to the movable column frame 220, and the third guide wheel set 520 may be configured to abut against inner walls of the sliding groove 510. When the movable column frame 220 moves, the third guide wheel set 520 rolls along the inner walls of the sliding groove 510. Therefore, the shaking generated by the movable column frame 220 is reduced, the stability of the column assembly 220 is improved, and the abnormal noise generated during the use of the transport robot is reduced.

In this application, when the sliding groove 510 is located on the fixed column frame 210, the movable column frame 220 is inserted in the sliding groove 510. When the sliding groove 510 is located on the movable column frame 220, the fixed column frame 210 is inserted in the sliding groove 510. In this way, the space occupied by the column assembly 200 is reduced.

Referring to FIG. 52 to FIG. 59, the fixed column frame 210 includes a first fixed column 211 and a second fixed column 212 that are connected to the movable chassis 100, and the first fixed column 211 and the second fixed column 212 are provided with a sliding groove 510 respectively. The movable column frame 220 includes a first movable column 221 and a second movable column 222, and a third guide wheel set 520 is arranged on the first movable column 221 and the second movable column 222 respectively.

It should be noted that, the structures of the first fixed column 211 and the second fixed column 212 are the same, and the structures of the first movable column 221 and the second movable column 222 are the same. In this embodiment, a connection manner between the column assembly 200 and the second guide assembly 500 is described by using the accompanying drawings of the first fixed column 211 and the first movable column 221 as an example.

In a specific implementation, the third guide wheel set 520 may include a guide base frame 521 and at least one pair of third guide wheels 522, and the third guide wheel set 520 may further include at least one pair of fourth guide wheels 523. Third guide wheels 522 and fourth guide wheels 523 are rotatably arranged on the guide base frame 521. At least one third guide wheel 522 and/or at least one fourth guide wheel 523 are configured to abut against inner walls of the sliding groove 510. The at least one pair of third guide wheels 522 may be configured to abut against the same inner walls or different inner walls of the sliding groove 510. The at least one pair of fourth guide wheels 523 may also be configured to abut against the same inner walls or different inner walls of the sliding groove 510. The at least one pair of third guide wheels 522 and the at least one pair of fourth guide wheels 523 are configured to abut against different inner walls of the sliding groove 510 respectively.

The guide base frame 521 is connected to the fixed column frame 210 or the movable column frame 220, and configured to support the at least one pair of third guide wheels 522 and the at least one pair of fourth guide wheels 523. Wheel surfaces of the at least one pair of third guide wheels 522 and/or wheel surfaces of the at least one pair of fourth guide wheels 523 are configured to abut against different inner walls of the sliding groove 510 respectively, so as to reduce the shaking generated by the movable column frame 220.

In this application, there is an included angle between an axis of each of the at least one pair of third guide wheels 522 and an axis of each of the at least one pair of fourth guide wheels 523, and there is an included angle between the axis of each of the at least one pair of third guide wheels 522 and the extending direction of the sliding groove 510 and between the axis of each of the at least one pair of fourth guide wheels 523 and the extending direction of the sliding groove respectively. In this way, it is ensured that wheel surfaces of the at least one pair of third guide wheels 522 and wheel surfaces of the each of the at least one pair of fourth guide wheels 523 are configured to abut against different inner walls of the sliding groove 510 respectively.

Optionally, the axis of each of the at least one pair of third guide wheels 522 and the axis of each of the at least one pair of fourth guide wheels 523 may be perpendicular to each other, and both the axis of each of the at least one pair of third guide wheels 522 and the axis of each of the at least one pair of fourth guide wheels 523 are perpendicular to the extending direction of the sliding groove 510. In this way, wheel surfaces of the third guide wheels 522 and the fourth guide wheels 523 do not affect each other. The axis of each of the at least one pair of third guide wheels 522 is along a Y direction in FIG. 59, the axis of each of the at least one pair of fourth guide wheels 523 is along an X direction in FIG. 59, and the extending direction of the sliding groove 510 is along a Z direction in FIG. 57.

In some embodiments, at least one support portion 5211 is arranged at opposite edges of the guide base frame 521 respectively. The at least one support portion 5211 is perpendicular to the guide base frame 521. The at least one pair of third guide wheels 522 are arranged in a one-to-one correspondence with the support portion 5211. The third guide wheel 522 is arranged at an outer side of the support portion 5211. The at least one support portion 5211 is arranged at opposite edges of the guide base frame 521 (that is, at opposite sides of the guide base frame 521) respectively, and the third guide wheel 522 may be connected to the outer side of the support portion 5211 by a connecting shaft, thereby facilitating mounting the third guide wheel 522. A plane on which the third guide wheel 522 is located is perpendicular to a plane on which the guide base frame 521 is located. That is, the plane on which the third guide wheel 522 is located is an XZ plane in the figures, and the plane on which the guide base frame 521 is located is a YZ plane in the figures.

In some other embodiments, the guide base frame 521 includes at least two extension portions 5212 extending toward opposite outer sides of the guide base frame 521 respectively. The fourth guide wheel 523 is arranged on the extension portion 5212. The at least one pair of fourth guide wheel 523 are arranged in a one-to-one correspondence with the extension portion 5212. The at least one pair of fourth guide wheels 523 may be connected to the extension portion 5212 by a connecting shaft, thereby facilitating mounting the at least one pair of fourth guide wheels 523. A plane on which the at least one pair of fourth guide wheels 523 are located is parallel to the plane on which the guide base frame 521 is located. That is, the plane on which the at least one pair of fourth guide wheels 523 are located and the plane on which the guide base frame 521 is located are the XZ plane in the figures.

In the vertical support provided in this application, the extension portion 5212 and the support portion 5211 are located at the same two opposite sides of the guide base frame 521. The extension portion 5212 is located between support portions 5211 at the same side of the guide base frame 521. In this way, the at least one pair of third guide wheels 522 and the at least one pair of fourth guide wheels 523 are separately arranged, thereby improving the stability of the column assembly 220. In the accompanying drawings of this embodiment, an example in which there are two pairs of third guide wheels 522 and there is one pair of fourth guide wheels 523 is used for description.

The structure of the third guide wheel set 520 is described in the foregoing embodiment, and the structure of the sliding groove 510 is described below with reference to the structure of the third guide wheel set 520.

In this application, the sliding groove 510 includes a third accommodating section 511 extending along the extending direction of the sliding groove 510, and the third accommodating section 511 includes two opposite first sliding groove side walls 5111 and two opposite second sliding groove side walls 5112.

The third guide wheel set 520 is located in the third accommodating section 511, the third guide wheels 522 are located between the two first sliding groove side walls 5111, and wheel surfaces of the at least one pair of fourth guide wheels 523 are configured to abut against the two second sliding groove side walls 5112 respectively. In this way, the at least one pair of fourth guide wheels 523 are main guide wheels, and the at least one pair of third guide wheels 522 are auxiliary guide wheels. When the movable column frame 220 shakes, the wheel surfaces of the at least one pair of third guide wheels 522 can abut against the first sliding groove side walls 5111, so as to reduce the shaking of the movable column frame 220.

In some embodiments, the sliding groove 510 further includes a fourth accommodating section 512 extending along the extending direction of the sliding groove 510. A width of the fourth accommodating section 512 (that is, a length in a Y direction in FIG. 55) is less than a width of the third accommodating section 511 (that is, a length in the Y direction in FIG. 55). The fourth accommodating section 512 is in communication with the third accommodating section 511. Both the first movable column 221 and the second movable column 222 include a body 230, located in the fourth accommodating section 512. A part of the body 230 extends into the third accommodating section 511 and is connected to the guide base frame 521. During mounting, the first movable column 221 is inserted into the sliding groove 510 of the first fixed column 211 from the top of the first fixed column 211, and the second movable column 222 is inserted into the sliding groove 510 of the second fixed column 212 from the top of the second fixed column 212. By arranging the width of the fourth accommodating section 512 to be less than the width of the third accommodating section 511, the third guide wheel set 520 is thereby limited to be within the third accommodating section 511.

Referring to FIG. 52 to FIG. 62, in this application, the second guide assembly 500 further includes at least one third guide wheel set 530. The third guide wheel set 530 includes at least one fifth guide wheel 531. The third guide wheel set 530 further includes at least one sixth guide wheel 532. Fifth guide wheels 531 are rotatably arranged at two opposite sides of the fixed column frame 210 respectively, sixth guide wheels 532 are rotatably arranged at the two opposite sides of the fixed column frame 210 respectively, and the fifth guide wheels 531 and the sixth guide wheels 532 are located at the same two opposite sides of the fixed column frame 210. A part of the at least one fifth guide wheel 531 extends into the fourth accommodating section 512, and a wheel surface of at least one fifth guide wheel 531 is configured to abut against two opposite sides of the body 230 respectively, and/or a part of the at least one sixth guide wheel 532 extends into the fourth accommodating section 512, and a wheel surface of at least one sixth guide wheel 532 is configured to abut against the two opposite sides of the body 230 respectively.

In some embodiments, the at least one fifth guide wheel 531 and the at least one sixth guide wheel 532 may be arranged in the same manner as the third guide wheel 522 and the fourth guide wheel 523. The wheel surface of the at least one fifth guide wheel 531 and the wheel surface of the at least one sixth guide wheel 532 may be configured to abut against different sides of the body 230 respectively, that is, an axis of the at least one fifth guide wheel 531 may be perpendicular to an axis of the at least one sixth guide wheel 532.

In a specific implementation, the third guide wheel set 530 is arranged on the first fixed column 211 and the second fixed column 212 respectively, and third guide wheel sets 530 on the first fixed column 211 and the second fixed column 212 are symmetrical. Similarly, the third guide wheel set 520 is arranged on the first fixed column 211 and the second fixed column 212 respectively, and third guide wheel sets 520 on the first fixed column 211 and the second fixed column 212 are symmetrical.

In some embodiments, the body 230 includes a guide groove 231 extending along the vertical direction. The sixth guide wheel 532 is located in the guide groove 231. The sixth guide wheel 532 is configured to abut against opposite inner side walls 2311 of the guide groove 231, and/or the fifth guide wheel 531 is configured to abut against a bottom wall 2312 of the guide groove 231.

In the accompanying drawings of this embodiment, the at least one sixth guide wheel 532 is located in the guide groove 231, and the at least one fifth guide wheel 531 is configured to abut against the bottom wall 2312 of the guide groove 231. In this way, the at least one fifth guide wheel 531 is a main guide wheel, and the at least one sixth guide wheel 532 is an auxiliary guide wheel. When the movable column frame 220 shakes, the wheel surface of the at least one sixth guide wheel 532 can abut against side walls of the guide groove 231, so as to reduce the shaking of the movable column frame 220.

In order to facilitate fixing the at least one fifth guide wheel 531 and the at least one sixth guide wheel 532, the third guide wheel set 530 further includes at least two fixed plates 533. The at least one fifth guide wheel 531 and the at least one sixth guide wheel 532 are connected to the fixed plates 533. The fixed plates 533 are fixedly connected to the fixed column frame 210.

In this application, the third guide wheel sets 530 are located at an upper part of the fixed column frame 210, and/or the guide base frame 521 is located at a lower part of the movable column frame 220. In this way, when the third guide wheel set 520 rolls along the inner walls of the sliding groove 510, the movable column frame 220 is evenly guided by the third guide wheel set 520 and the third guide wheel set 530.

In some embodiments, in order to reduce the impact of the movable column frame 220 on the movable chassis 100, the vertical support further includes a shock absorbing member 800, fixedly connected to the fixed column frame 210 or the movable chassis 100. A shock absorbing surface of the shock absorbing member 800 faces the third guide wheel set 520. When the body 230 moves toward the movable chassis 100, the third guide wheel set 520 abuts against the shock absorbing member 800.

In a specific implementation, an abutting portion 5213 is arranged on the guide base frame 521, and the shock absorbing member 800 is located in the third accommodating section 511. When the body 230 moves toward the movable chassis 100, the abutting portion 5213 abuts against the shock absorbing member 800.

The shock absorbing member 800 is a shock absorber. It can be understood that, the shock absorbing member 800 may alternatively be one of a spring, a silicon piece, or a rubber piece, which is not limited in this embodiment.

The fixed column frame 210 may include a fixed beam 213. A first end of the first fixed column 211 and a first end of the second fixed column 212 are fixedly connected to the movable chassis 100. The first fixed column 211 and the second fixed column 212 (that is, a second end 210b of the fixed column frame) are also connected by the fixed beam 213. A second end of the first fixed column 211 and a second end of the second fixed column 212 may be connected by the fixed beam 213, or the fixed beam 213 is connected to a position close to the second end of the first fixed column 211 and the second end of the second fixed column 212. The first fixed column 211 and the second fixed column 212 are perpendicular to the movable chassis 100, the fixed beam 213 is perpendicular to the first fixed column 211, and the fixed beam 213 is perpendicular to the second fixed column 212. A support base 214 is arranged on the fixed column frame 210, and the driving assembly 400 is connected to the support base 214.

In this application, an indicator light 900 and/or a wireless module 1000 are further included. The indicator light 900 is configured to indicate a working state of the transport robot, and the wireless module 1000 is used for communication.

Specifically, the structures of the wireless module 1000 and the indicator light 900 are the same as those of Embodiment 8. Details are not described herein again.

In some embodiments, the vertical support further includes a detection module 700 and a control module (not shown). The structures of the detection module 700 and the control module are the same as those of Embodiment 8. Details are not described herein again.

In the transport robot provided in this application, the driving assembly 400 includes a retractable assembly 410 and at least one set of traction assembly 420. The structures of the retractable assembly 410 and the traction assembly 420 are the same as those of Embodiment 8. Details are not described herein again.

Embodiment 10

Referring to FIG. 63 to FIG. 69, the transport robot provided in this application includes a movable chassis 100, a column assembly 200, a carrying device 300, and a driving assembly 400.

A first end 200a of the column assembly is connected to the movable chassis 100. The column assembly 200 extends toward a vertical direction. The column assembly 200 and the driving assembly 400 are connected to the carrying device 300. The driving assembly 400 is configured to drive the carrying device 300 to ascend or descend relative to the column assembly 200.

At least one first shock absorbing member 240 and at least one second shock absorbing member 250 are further included. There is a distance between the first shock absorbing member 240 and the second shock absorbing member 250 in the vertical direction. The first shock absorbing member 240 and the second shock absorbing member 250 may be located at different heights of the column assembly 200 respectively. The carrying device 300 is located between the first shock absorbing member 240 and the second shock absorbing member 250.

Specifically, the movable chassis 100 may include a base plate 110, a driving wheel assembly 120, and a driven wheel assembly 130. Both the column assembly 200 and the driving assembly 400 may be connected to the base plate 110, or the driving assembly 400 and the carrying device 300 are connected to the column assembly 200. The column assembly 200 is connected to the base plate 110. The column assembly 200 extends upward from the base plate 110 along a vertical direction. An extending direction of the column assembly 200 may also be referred to as a height direction of the transport robot (that is, a Z direction in FIG. 65, or may be referred to as the vertical direction). The column assembly 200, the carrying device 300, and the driving assembly 400 are supported by the base plate 110, and the base plate 110 is driven to move by the driving wheel assembly 120, so that the transport robot moves on the ground.

The transport robot may further include a plurality of storage racks 600, and the storage racks 600 are the same as those of the foregoing embodiment. Details are not described herein again.

The carrying device 300 is driven to ascend or descend relative to the column assembly 200 by the driving assembly 400, so that the carrying device 300 can carry goods at different heights, or store goods at different heights. When ascending or descending relative to the column assembly 200, the carrying device 300 is likely to rigidly collide with a top end of the column assembly 200 or the movable chassis 100, thereby affecting the stability of the transport robot.

In view of this, in this application, at least one first shock absorbing member 240 and at least one second shock absorbing member 250 are arranged. There is a distance between the first shock absorbing member 240 and the second shock absorbing member 250 in the vertical direction, and the first shock absorbing member 240 and the second shock absorbing member 250 are located at different heights of the column assembly 200 respectively. The carrying device 300 is located between the first shock absorbing member 240 and the second shock absorbing member 250. In this way, when ascending or descending relative to the column assembly 200, the carrying device 300 abuts against the first shock absorbing member 240 and the second shock absorbing member 250 respectively. Therefore, when moving upward or downward, the carrying device 300 does not rigidly collide with the column assembly 200 of the support or the movable chassis 100, thereby improving the stability of the transport robot.

In order to ensure that the carrying device 300 has the largest moving stroke during the ascending or descending, the first shock absorbing member 240 may be located at the second end 200b of the column assembly or close to the second end 200b of the column assembly, and the second shock absorbing member 250 may be located at the first end 200a of the column assembly or close to the first end 200a of the column assembly, or the second shock absorbing member 250 may be located on the movable chassis 100. The first shock absorbing member 240 and the second shock absorbing member 250 are located on the same vertical line.

In the transport robot provided in this application, the column assembly 200 may include a fixed column assembly 210 and a movable column assembly 220. A first end of the fixed column assembly 210 is fixedly connected to the movable chassis 100, and the fixed column assembly 210 extends toward the vertical direction. The movable column assembly 220 is connected to the fixed column assembly 210. The carrying device 300 is connected to the movable column assembly 220 and is movable relative to the movable column assembly 220 along the vertical direction (that is, the carrying device 300 ascends or descends relative to the movable column assembly 220).

The first shock absorbing member 240 is located at one end of the movable column assembly 220 away from the movable chassis 300, and the second shock absorbing member 250 is located at the first end of the fixed column assembly 210.

In order to facilitate the carrying device 300 to carry goods at a relatively high position, or store goods at a relatively high position, the column assembly 200 can extend or retract. The movable column assembly 220 is configured to move relative to the fixed column assembly 210 along the vertical direction. In some embodiments, the driving assembly 400 may be connected to the movable column assembly 220, and is configured to drive the movable column assembly 220 to move along the extending direction of the fixed column assembly 210. That is, the movable column assembly 220 can move upward or downward relative to the fixed column assembly 210 along the vertical direction, so that the column assembly 200 can extend or retract. In some other embodiments, the driving assembly 400 is configured to drive the carrying device 300 to move relative to the movable column assembly 220. When the carrying device 300 moves to a top end of the movable column assembly 220, the driving assembly 400 drives the movable column assembly 220 to move along the extending direction of the fixed column assembly 210 through the carrying device 300.

In order to ensure that the carrying device 300 can move stably, the fixed column assembly 210 includes two fixed columns and a fixed beam 213 connected between the two fixed columns, and first ends of the fixed columns are connected to the movable chassis 100. The two fixed columns may be a first fixed column 211 and a second fixed column 212.

The movable column assembly 220 includes two movable columns, the movable columns are matched with and connected to the fixed columns, a sliding groove 260 extending along the vertical direction is provided on the movable columns, groove openings of sliding grooves 260 on the two movable columns are opposite, and the first shock absorbing member 240 is located in the sliding groove 260. The two movable columns may be a first movable column 221 and a second movable column 222. The first movable column 221 is inserted to the first fixed column 211. The second movable column 222 is inserted to the second fixed column 212. Groove openings of the sliding groove 260 on the first movable column 221 and the sliding groove 260 on the second movable column 222 are opposite to each other. Two opposite sides of the carrying device 300 are inserted into the two sliding grooves 260 respectively, so that the carrying device 300 moves along the sliding grooves 260, thereby guiding the carrying device 300.

In order to improve the stability of the carrying device 300 during the movement, the carrying device 300 may be connected to the sliding grooves 260 in a sliding or rolling manner. A slider may be arranged on the carrying device 300, and the slider is inserted into the sliding grooves 260, so that the carrying device 300 can be slidably connected to the sliding grooves 260. A roller assembly may be arranged on the carrying device 300, and the carrying device 300 may be connected to the sliding grooves 260 in a rolling manner by the roller assembly.

It can be understood that, in order to ensure the stability of the movable column assembly 220 during the movement, the first movable column 221 may be slidably connected to the first fixed column 211 through the sliding grooves and the slider, and the first movable column 221 may also be connected to the first fixed column 211 in a rolling manner by the roller assembly. The second movable column 222 may be slidably connected to the second fixed column 212 through the sliding grooves and the slider. The second movable column 222 may also be connected to the second fixed column 212 in a rolling manner by the roller assembly. This is not limited in this embodiment.

In some embodiments, a support plate 215 is arranged on the fixed columns, the support plate 215 is located below the movable columns, a first surface 215a of the support plate is connected to an upper surface of the movable chassis 100, and the second shock absorbing member 250 is located on a second surface of the support plate.

Specifically, the support plate 215 is arranged on the first fixed column 211 and the second fixed column 212 respectively, and support plates 215 are opposite to the first movable column 221 and the second movable column 222 respectively. In this way, while the second shock absorbing member 250 buffers the rigid impact of the carrying device 300 on the movable chassis 100, the second shock absorbing member 250 also buffers the first movable column 221 and the second movable column 222, so as to avoid the rigid impact of the first movable column 221 and the second movable column 222 on the movable chassis 100.

In some embodiments, an abutting portion 224 is arranged on the movable column, the second shock absorbing member 250 is arranged on the second surface of the support plate or on the movable chassis 100, and the movable column is configured to move toward the movable chassis 100, so that the abutting portion 224 abuts against the second shock absorbing member 250.

Specifically, the first shock absorbing member 240 may be one of a spring, a shock absorber, or a flexible plate. The second shock absorbing member 250 is one of a spring, a shock absorber, or a flexible plate. The flexible plate may be a rubber pad, a silicone pad, or the like.

Figure 63:
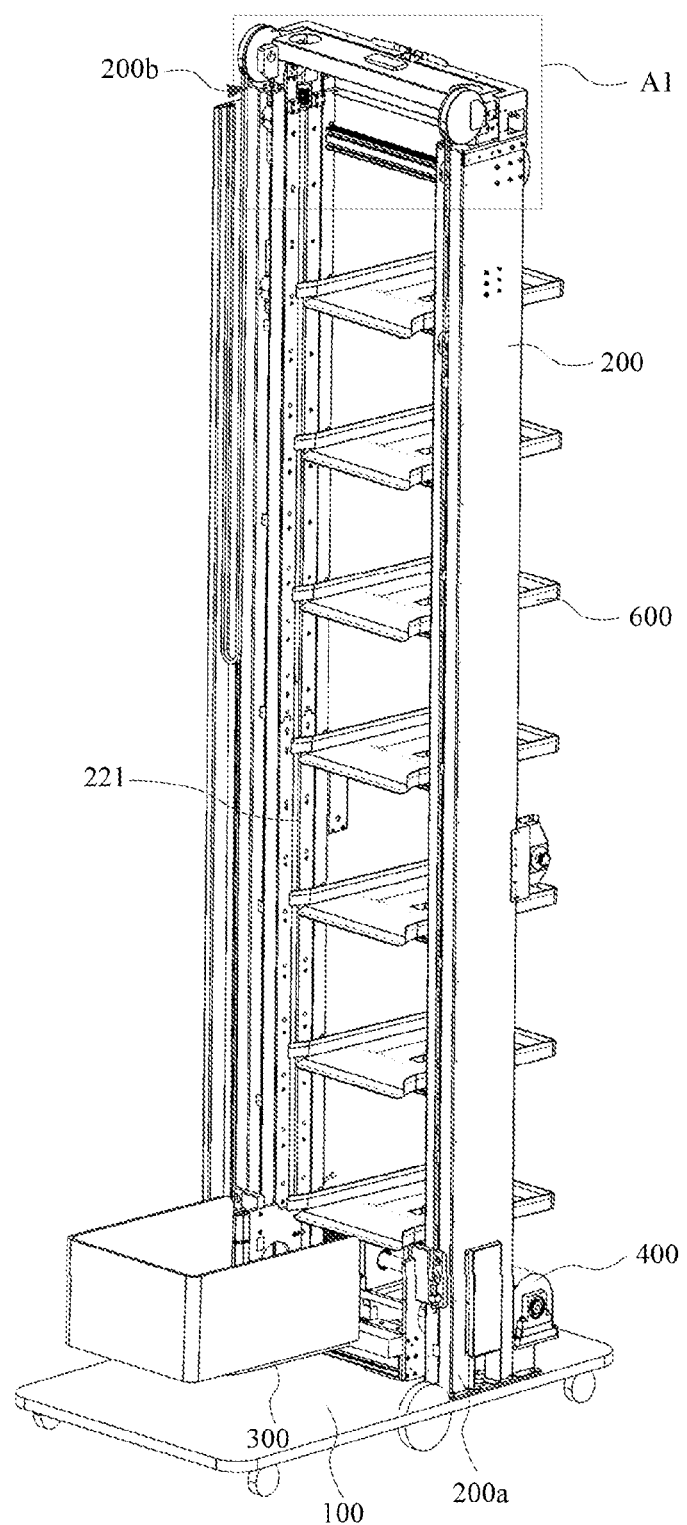
FIG. 63 is a schematic structural diagram of a transport robot according to an embodiment of this application.
Figure 64:
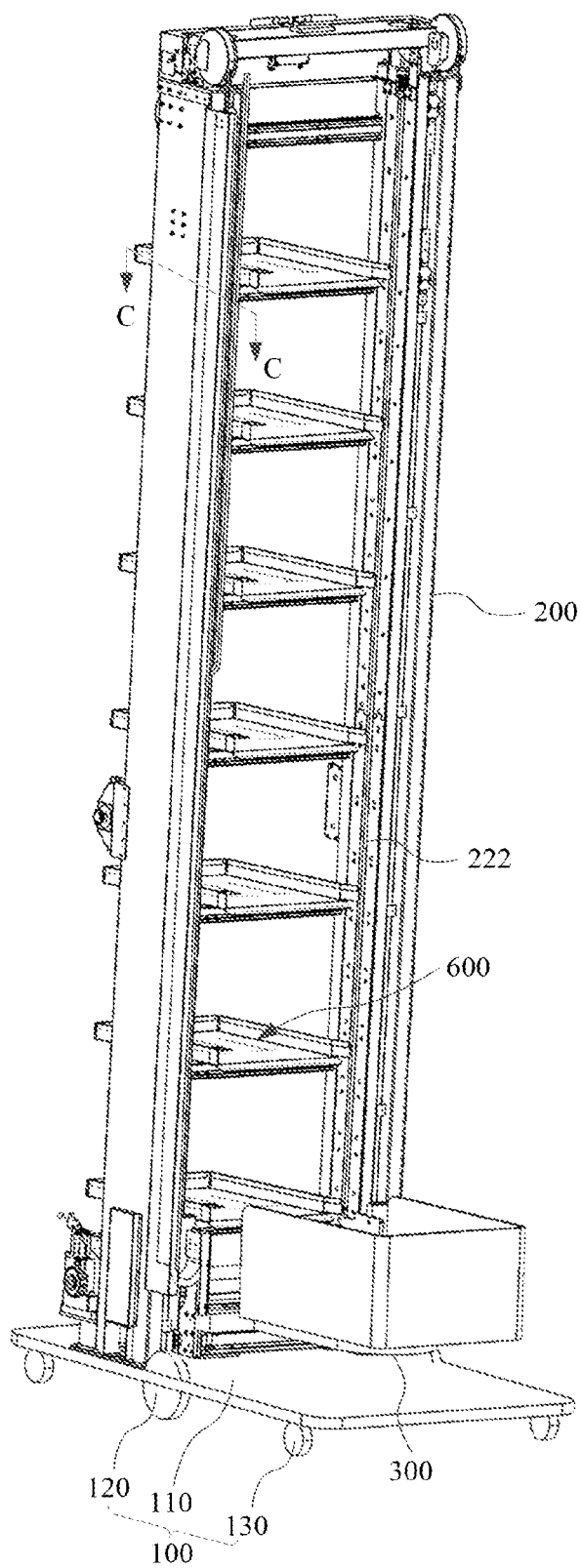
FIG. 64 is a schematic structural diagram of a transport robot viewed from another angle according to an embodiment of this application.
Figure 65:
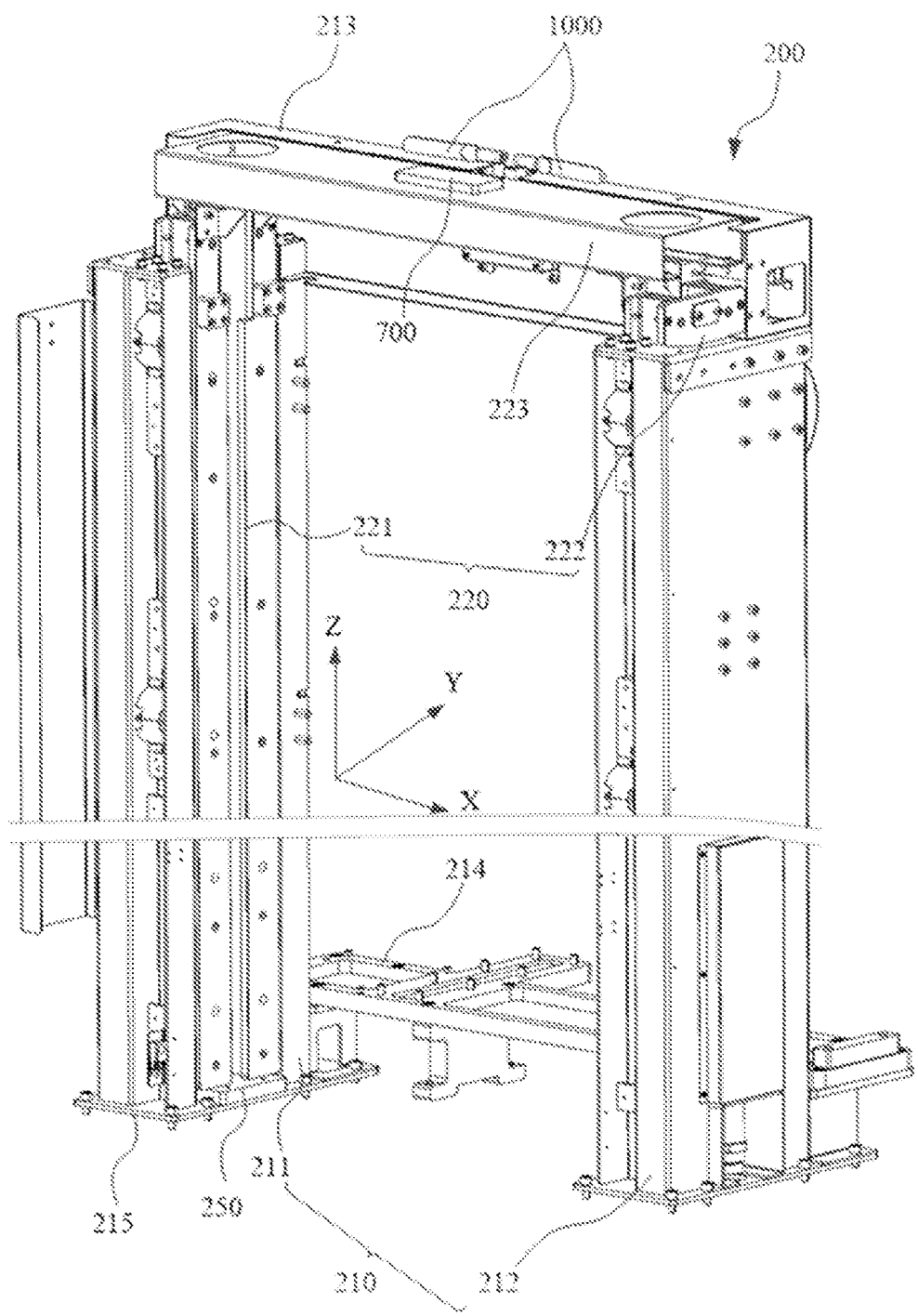
FIG. 65 is a schematic structural diagram of a vertical support in a transport robot according to an embodiment of this application.
Figure 66:
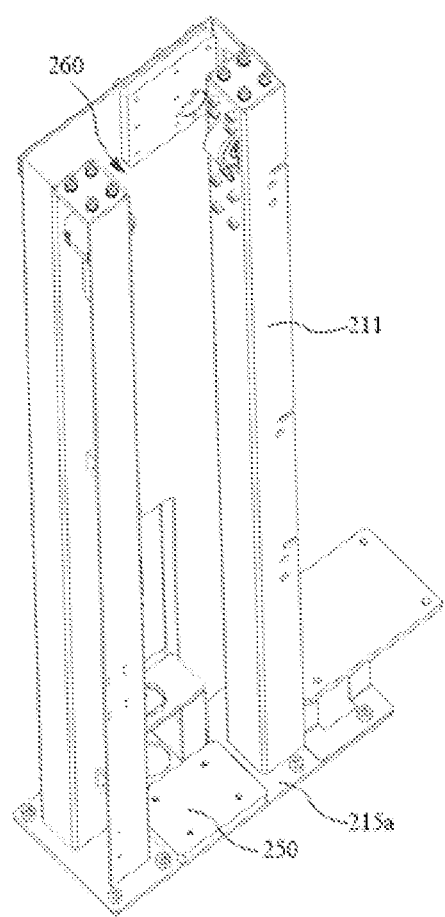
FIG. 66 is a schematic structural diagram of a first fixed column in a transport robot according to an embodiment of this application.
Figure 67:
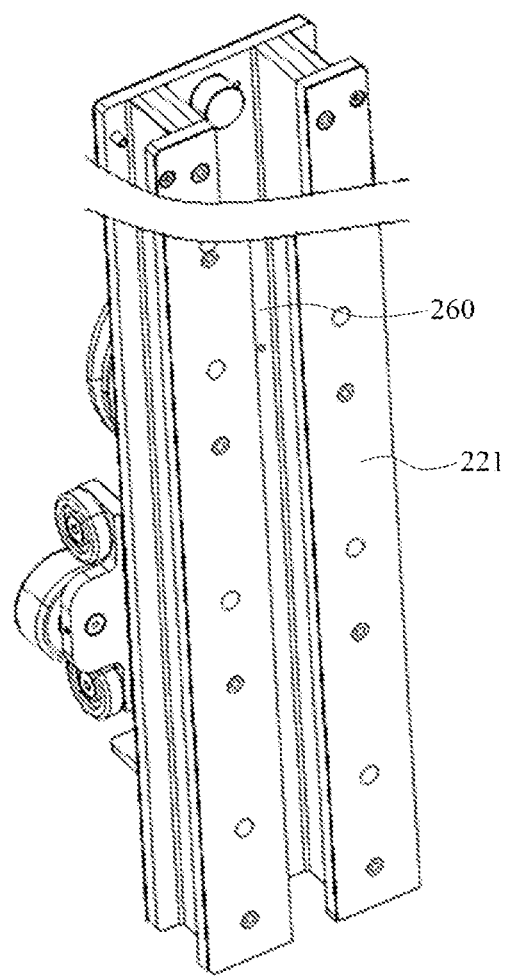
FIG. 67 is a schematic structural diagram of a first movable column in a transport robot according to an embodiment of this application.
Figure 68:
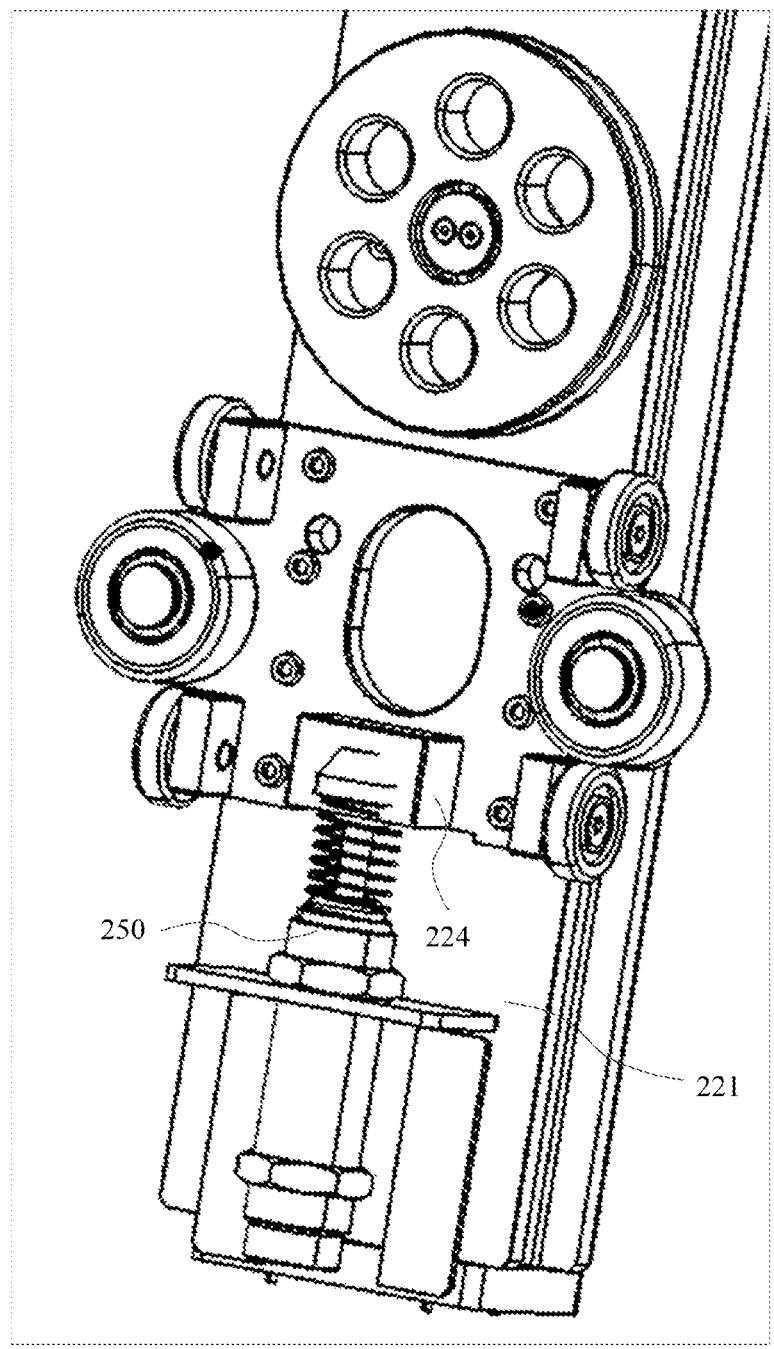
FIG. 68 is a partial schematic structural diagram of FIG. 67 viewed from another angle.
Figure 69:
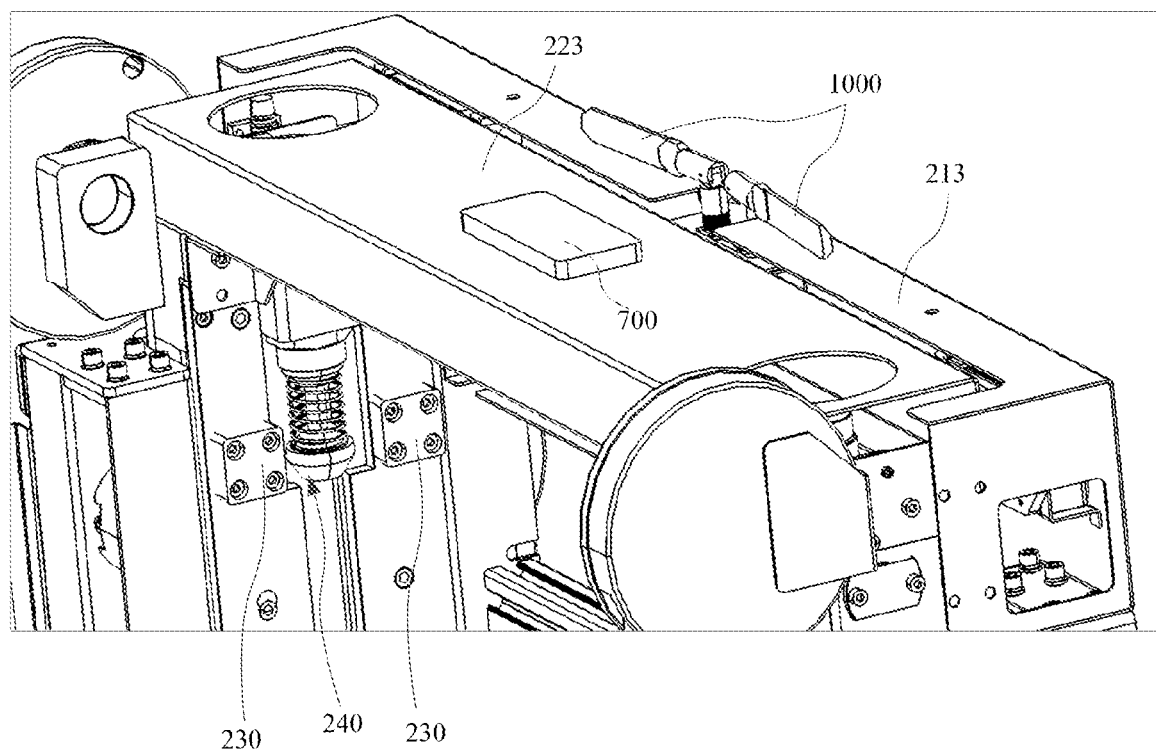
FIG. 69 is a partial enlarged view 1 at A2 in FIG. 63.
Figure 70:
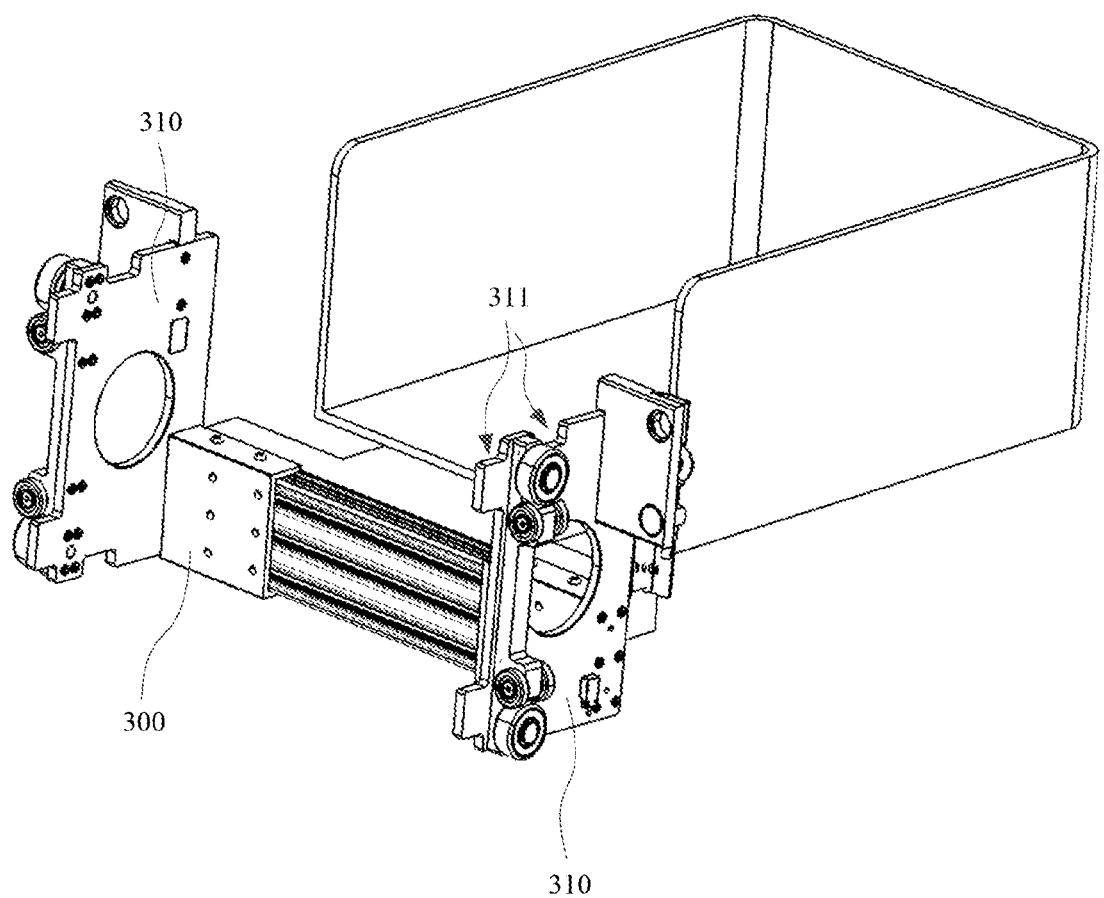
FIG. 70 is a schematic structural diagram of a carrying device in a transport robot according to an embodiment of this application.
Figure 71:
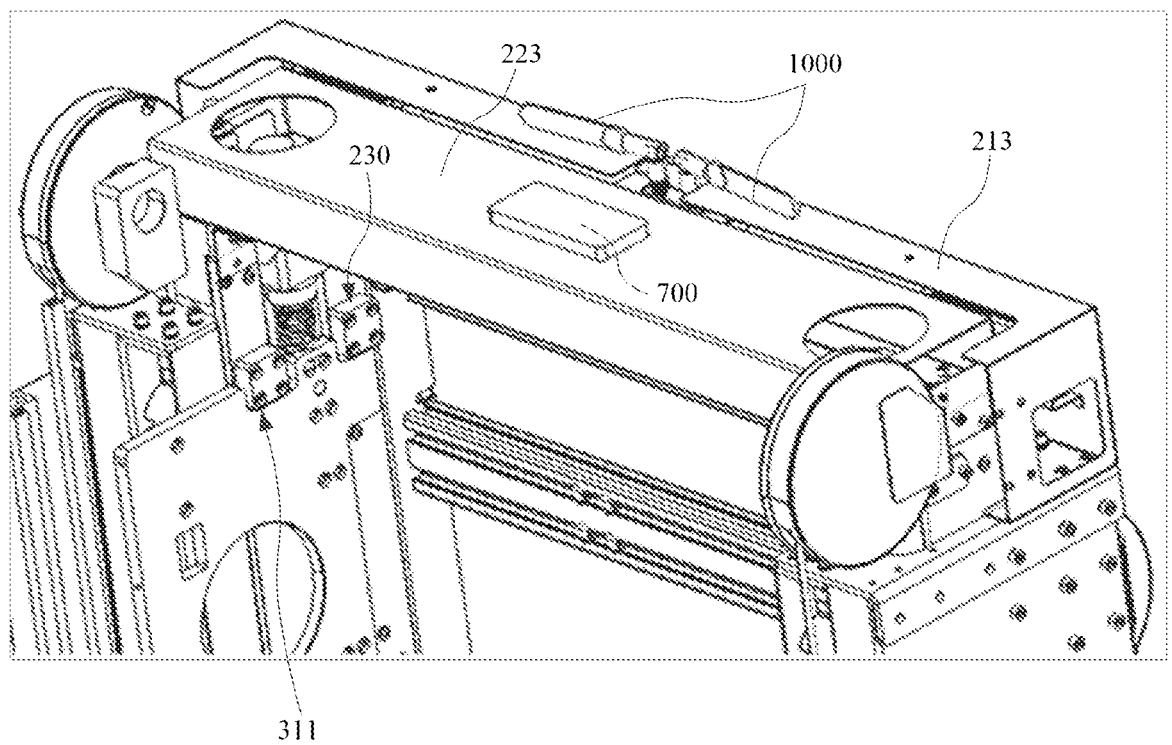
FIG. 71 is a partial enlarged view 2 at A2 in FIG. 63.
Figure 72:
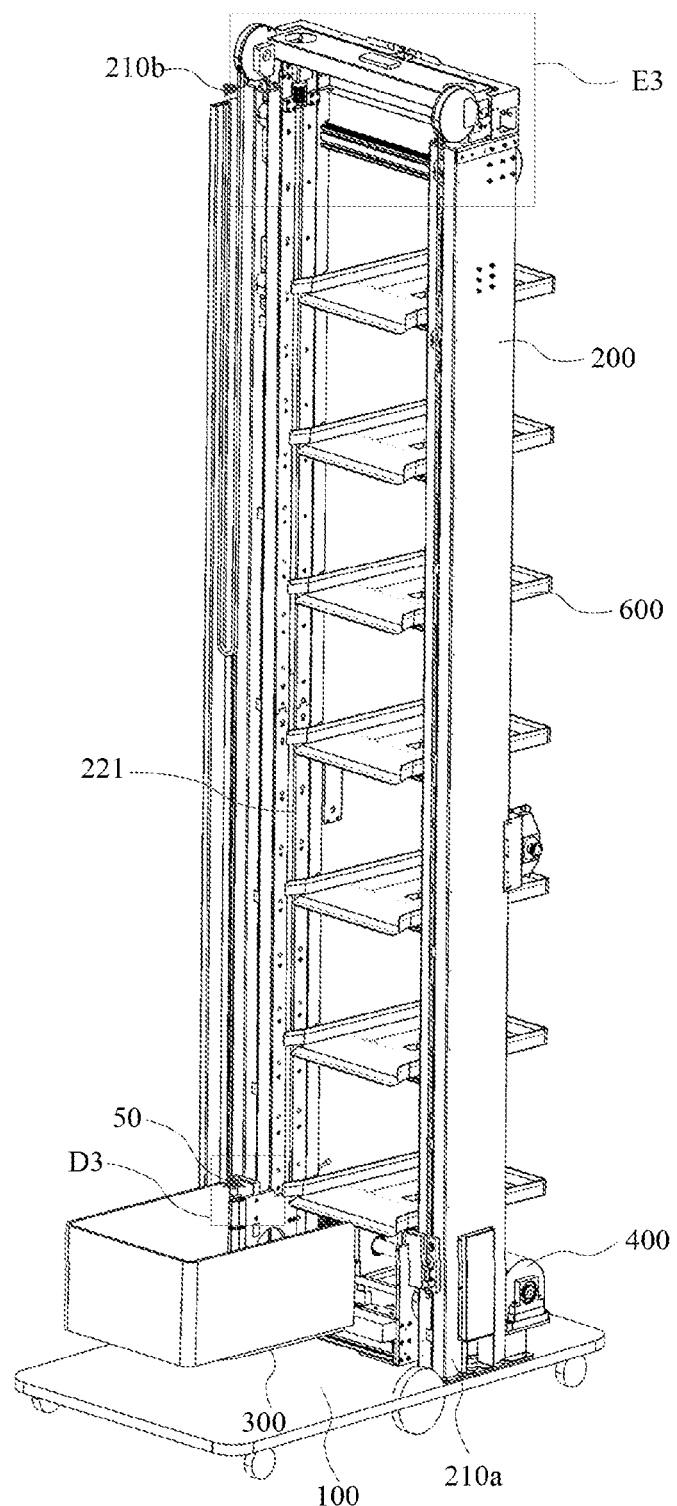
FIG. 72 is a schematic structural diagram of a transport robot according to an embodiment of this application.
Figure 73:
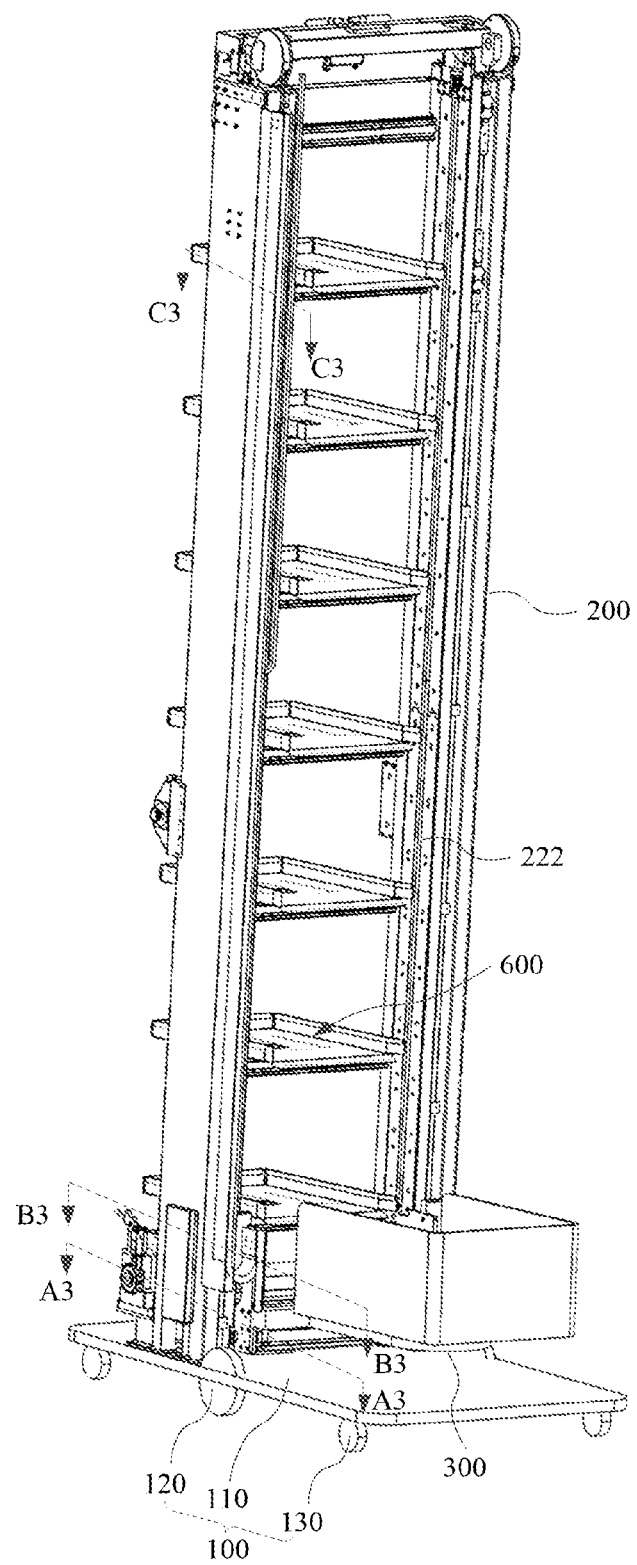
FIG. 73 is a schematic structural diagram of a transport robot viewed from another angle according to an embodiment of this application.
Figure 74:
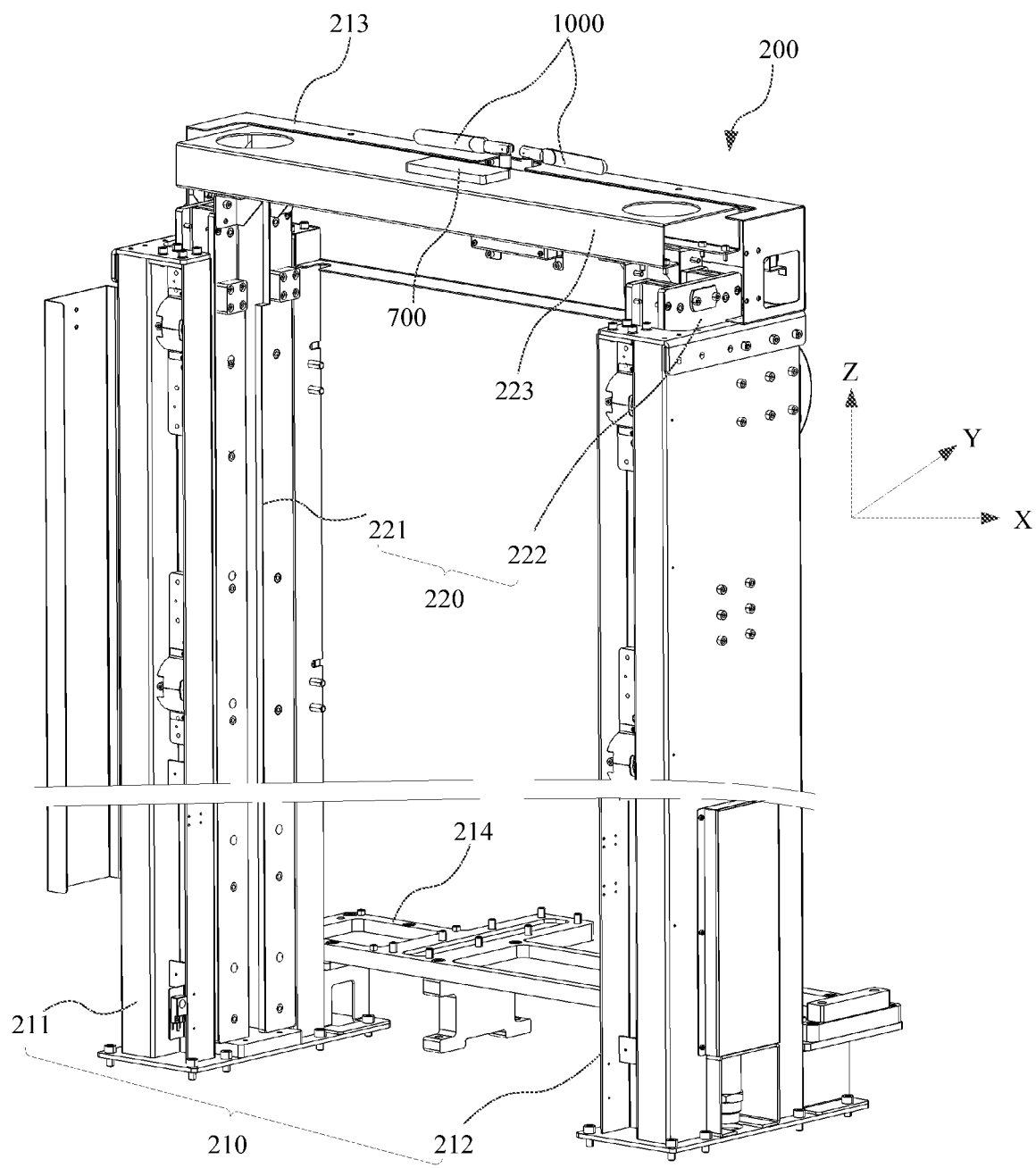
FIG. 74 is a schematic structural diagram of a vertical support in a transport robot according to an embodiment of this application.
Figure 75:
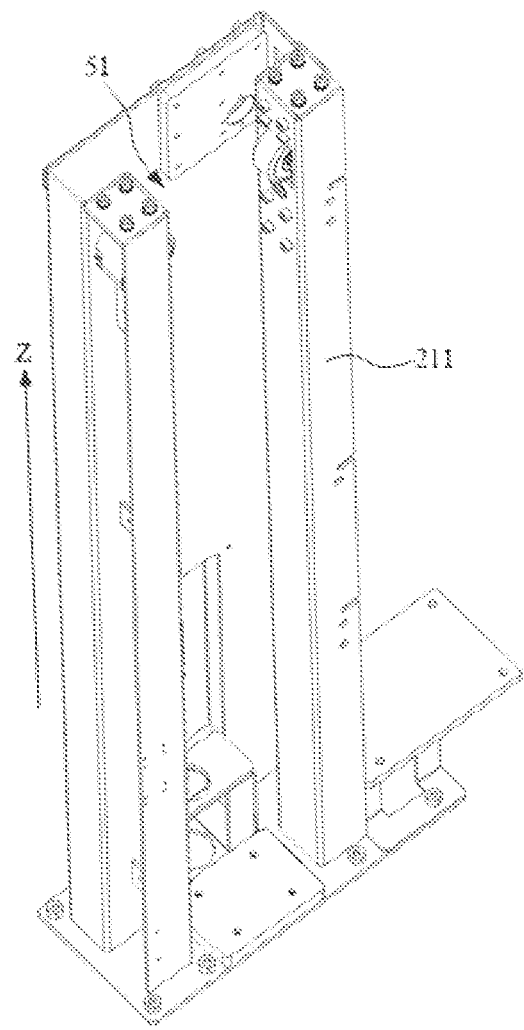
FIG. 75 is a schematic structural diagram of a first fixed column in a transport robot according to an embodiment of this application.
Figure 76:
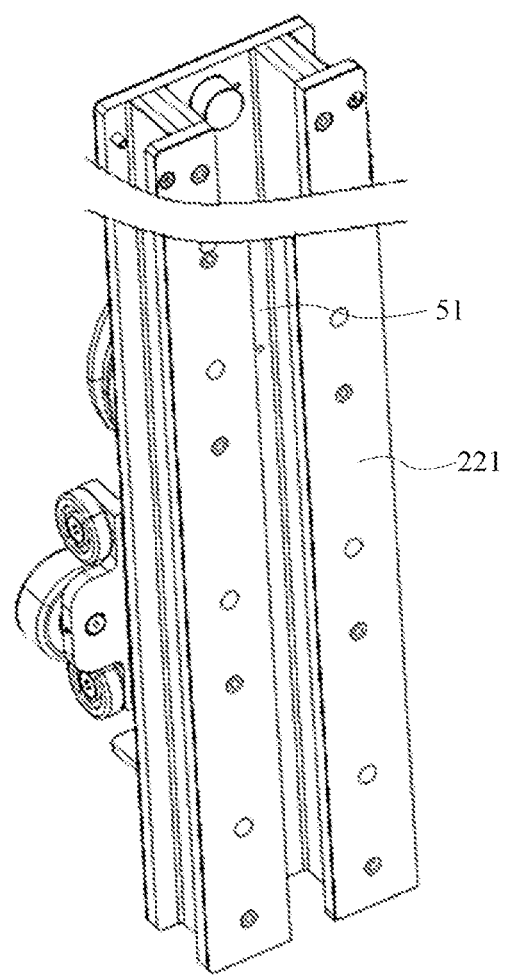
FIG. 76 is a schematic structural diagram of a first movable column in a transport robot according to an embodiment of this application.
Figure 77:
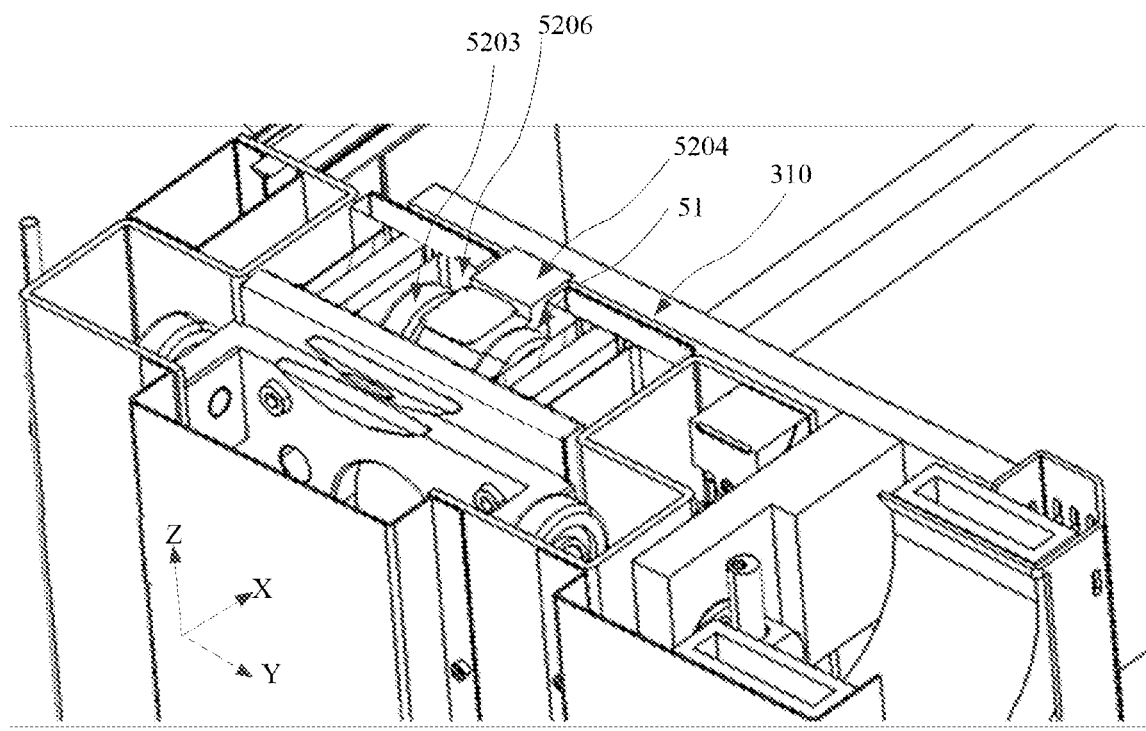
FIG. 77 is a schematic cross-sectional view of an internal structure along a Z-axis direction taken along a line A3-A3 in FIG. 73.
Figure 78:
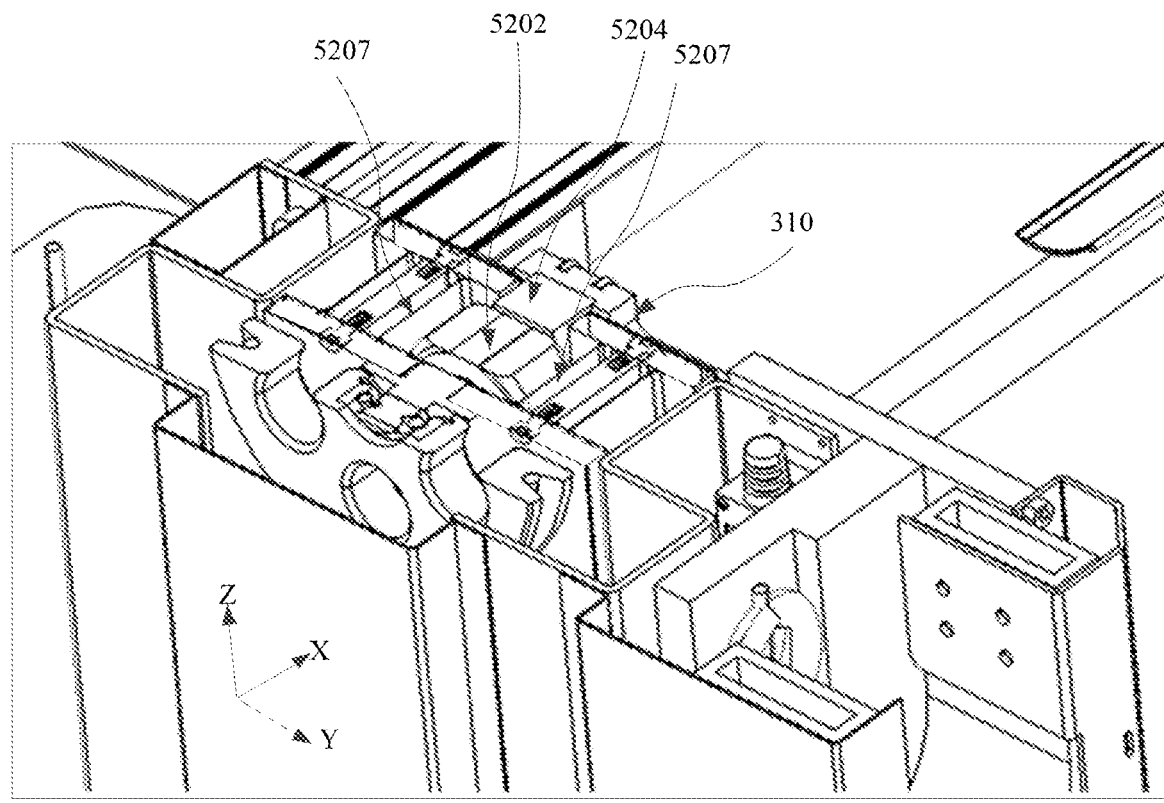
FIG. 78 is a schematic cross-sectional view of an internal structure along a Z-axis direction taken along a line B3-B3 in FIG. 73.
Figure 79:
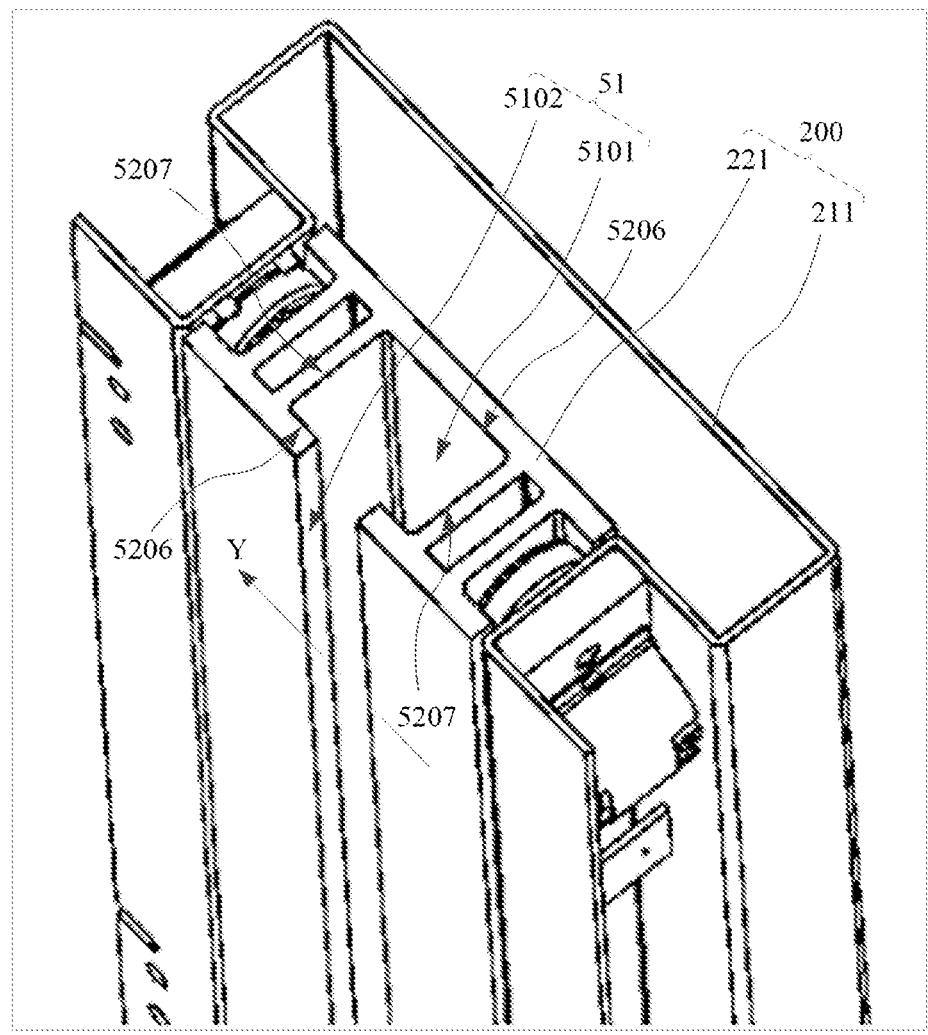
FIG. 79 is a schematic cross-sectional view of an internal structure along a Z-axis direction taken along a line C3-C3 in FIG. 73.
Figure 80:
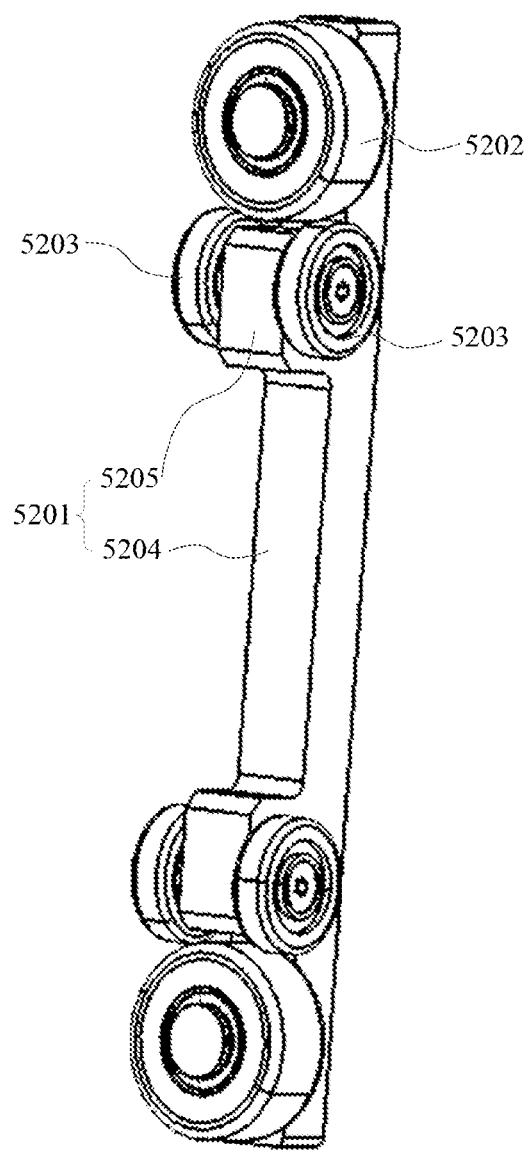
FIG. 80 is a schematic structural diagram of a guide wheel set in a transport robot according to an embodiment of this application.
Figure 81:
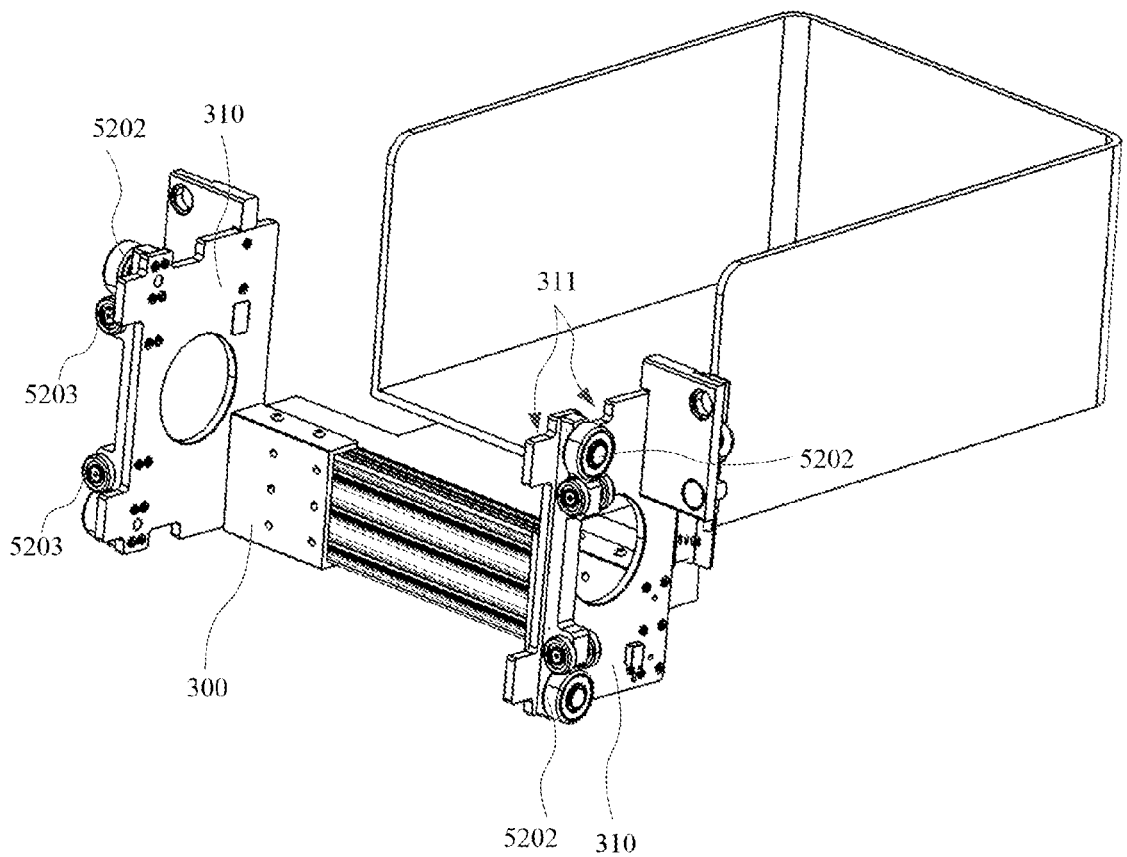
FIG. 81 is a schematic structural diagram of a guide wheel set and a carrying device in a transport robot according to an embodiment of this application.
Figure 82:
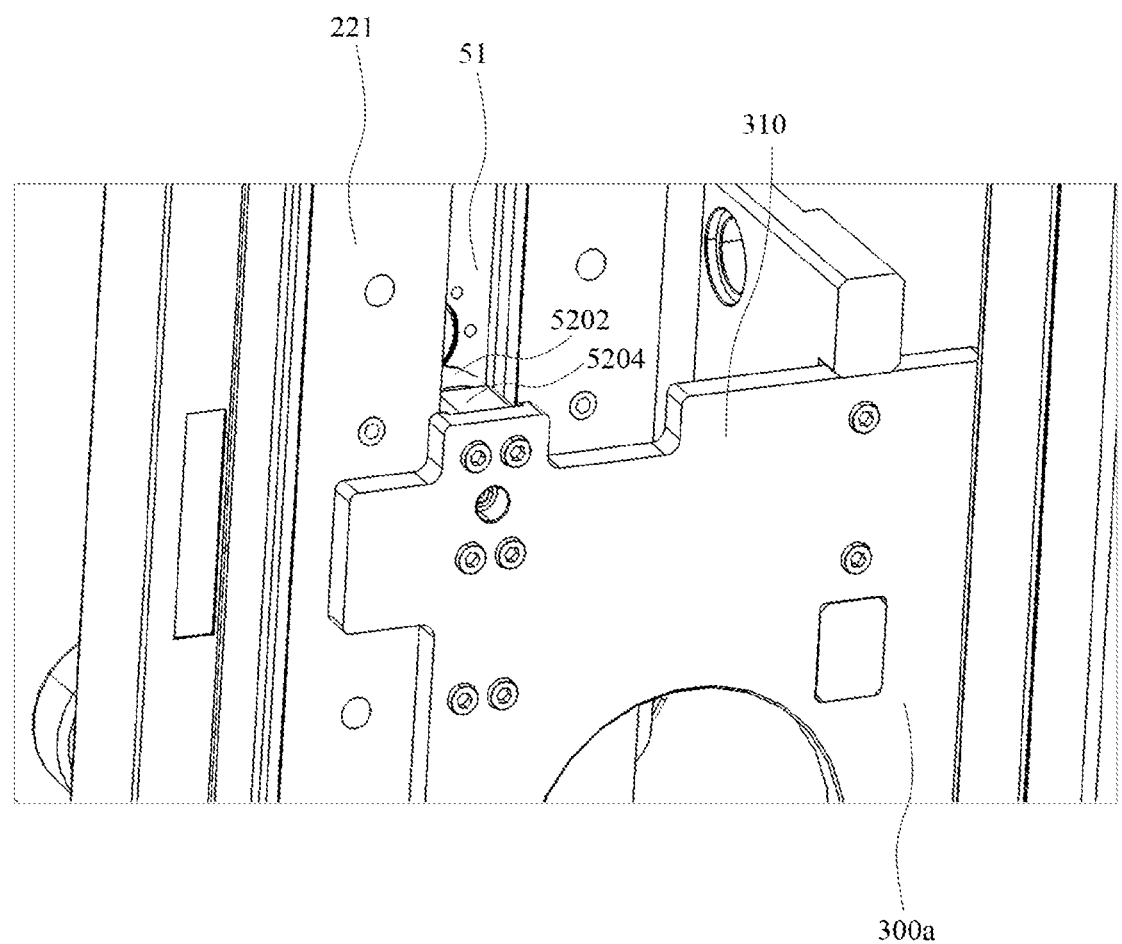
FIG. 82 is a partial schematic diagram at D3 in FIG. 72.
Figure 83:
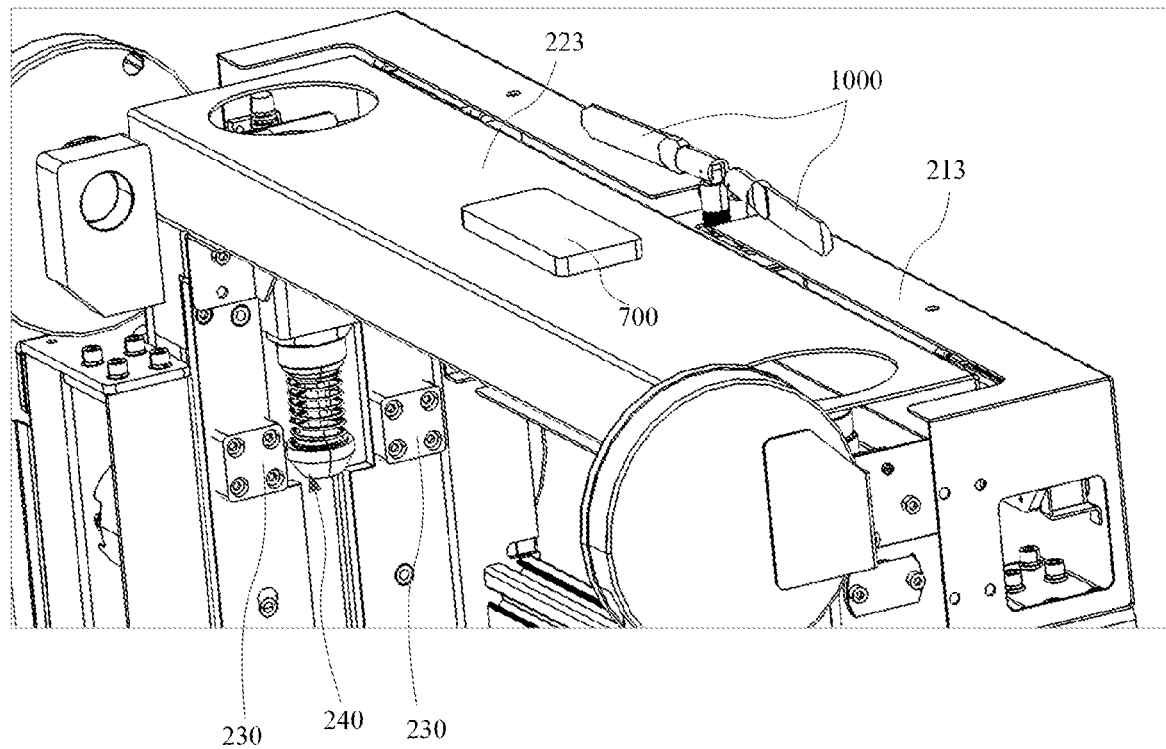
FIG. 83 is a partial schematic diagram 1 at E3 in FIG. 72.
Figure 84:
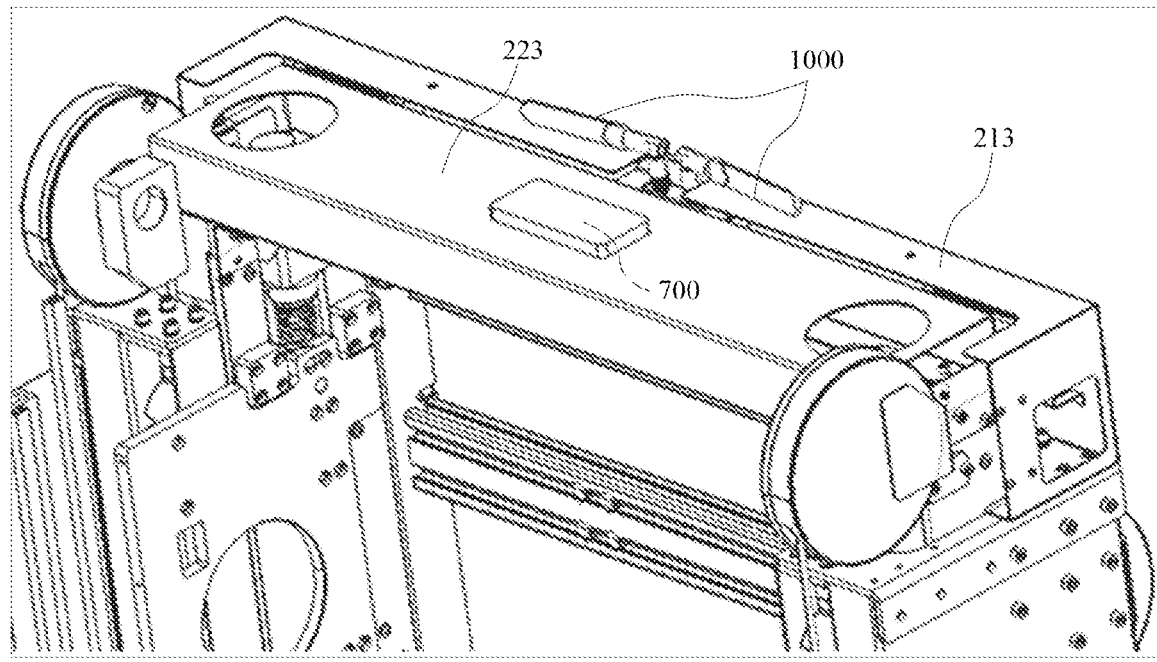
FIG. 84 is a partial schematic diagram 2 at E3 in FIG. 72.

Referring to FIG. 63, FIG. 70, and FIG. 71, in the transport robot provided in this application, at least one limiting member 230 is arranged at an upper part of the movable column, at least one connection member 310 is arranged on the carrying device 300, and the connection member 310 is provided with at least one notch 311, arranged in a one-to-one correspondence with the limiting member 230. When the carrying device 300 moves to a second end 200b of the column assembly, the notch 311 abuts against the limiting member 230, and the connection member 310 abuts against the first shock absorbing member 240.

In a specific implementation, the notch 311 may be in fit with the limiting member 230. For example, when the limiting member 230 is a rectangle, the notch 311 is a rectangular notch in fit with the limiting member 230. When the carrying device 300 moves to the second end 200b of the column assembly 200, the notch 311 abuts against the limiting member 230, so as to prevent the carrying device 300 from moving out of the column assembly 200. The limiting member 230 may also be one of a spring, a silicon piece, or a rubber piece.

In a specific implementation, the limiting member 230 is located at two opposite sides of the sliding groove 260 respectively. In this way, the carrying device 300 is brought into contact with the limiting member 230 smoothly and stably, so as to avoid the impact on the goods on the carrying device 300.

In the transport robot provided in this application, the movable column assembly 220 further includes a movable beam 223, and the two movable columns are connected by the movable beam 223. That is, the first movable column 221 and the second movable column 222 are connected by the movable beam 223. One end of the first movable column 221 and one end of the second movable column 222 that are away from the movable chassis 100 are connected by the movable beam 223, so as to avoid the influence of the movable beam 223 on a stroke of the carrying device 300.

In this application, an indicator light 900 and/or a wireless module 1000 are further included. The indicator light 900 is configured to indicate a working state of the transport robot, and the wireless module 1000 is used for communication.

Specifically, the structures of the wireless module 1000 and the indicator light 900 are the same as those of Embodiment 8. Details are not described herein again.

In some embodiments, the vertical support further includes a detection module 700 and a control module (not shown). The structures of the detection module 700 and the control module are the same as those of Embodiment 8. Details are not described herein again.

In the transport robot provided in this application, the driving assembly 400 includes a retractable assembly 410 and at least one set of traction assembly 420. The structures of the retractable assembly 410 and the traction assembly 420 are the same as those of Embodiment 8. Details are not described herein again.

Embodiment 11

Referring to FIG. 63 to FIG. 71, the transport robot provided in this application includes a movable chassis 100, a column assembly 200, a carrying device 300, and a driving assembly 400.

A first end 200a of the column assembly 200 is connected to the movable chassis 100. The column assembly 200 extends toward a vertical direction. The column assembly 200 and the driving assembly 400 are connected to the carrying device 300. The driving assembly 400 is configured to drive the carrying device 300 to ascend or descend relative to the column assembly 200.

There is a moving path on the column assembly 200 for the carrying device 300 to move. The moving path extends from the first end 200a of the column assembly 200 to a second end 200b of the column assembly 200. The carrying device 300 is movable on the moving path. The moving path is an unblocked space.

Specifically, the movable chassis 100 may include a base plate 110, a driving wheel assembly 120, and a driven wheel assembly 130. Both the column assembly 200 and the driving assembly 400 may be connected to the base plate 110, or the driving assembly 400 and the carrying device 300 are connected to the column assembly 200. The column assembly 200 is connected to the base plate 110. The column assembly 200 extends upward from the base plate 110 along a vertical direction. An extending direction of the column assembly 200 may also be referred to as a height direction of the transport robot (that is, a Z direction in FIG. 33, or may be referred to as the vertical direction). The column assembly 200, the carrying device 300, and the driving assembly 400 are supported by the base plate 110, and the base plate 110 is driven to move by the driving wheel assembly 120, so that the transport robot moves on the ground.

The transport robot may further include a plurality of storage racks 600, and the storage racks 600 are the same as those of the foregoing embodiment. Details are not described herein again.

The carrying device 300 is driven to ascend or descend relative to the column assembly 200 by the driving assembly 400, so that the carrying device 300 can carry goods at different heights, or store goods at different heights. In order to prevent the carrying device 300 from being blocked by other components of the transport robot when the carrying device 300 ascends or descends relative to the column assembly 200, in a specific implementation, a moving path for the carrying device 300 to move on may be set on the column assembly 200. The moving path extends from the first end 200a of the column assembly 200 to the second end 200b of the column assembly 200. The moving path is an unblocked space. That is, when moving on the moving path, the carrying device 300 is not blocked by other components of the transport robot. In this way, the carrying device 300 may smoothly move back and forth between the first end 200a of the column assembly 200 and the second end 200b of the column assembly 200, to ensure a maximum moving stroke of the carrying device 300, so that the utilization of the column assembly 200 is improved.

In one embodiment, the carrying device 300 and the driving assembly 400 are located at two opposite sides of the column assembly 200 respectively. In this way, the structure of the transport robot is made more compact while avoiding the space inside the moving path of the carrying device 300 being occupied by the driving assembly 400.

Specifically, the driving assembly 400 and the storage racks 600 are located at the same side of the column assembly 200. Correspondingly, the driving assembly 400 and the storage racks 600 are opposite to the carrying device 300. It is easy for the carrying device 300 to store or retrieve goods on the storage racks 600 while preventing the storage racks 600 from occupying the space inside the moving path of the carrying device 300.

In order to prevent the driving assembly 400 from affecting the carrying device 300 to store or retrieve the goods on the storage racks 600, in some embodiments, the driving assembly 400 is located between the storage racks 600 and the movable chassis 100. That is, the driving assembly 400 is located between the lowest storage rack 600 and the movable chassis 100. That is, two adjacent storage racks 600 are not blocked by the driving assembly 400, so that it is easy for the carrying device 300 to store or retrieve the goods on the storage racks 600, thereby providing a relatively compact structure.

The driving assembly 400 is also connected to the movable chassis 100. The driving assembly 400 is stably fixed by the movable chassis 100. In addition, the driving assembly 400 may add a counterweight to the movable chassis 100, so that the movable chassis 100 can move smoothly and stably.

The transport robot provided in this application further includes at least one first shock absorbing member 240 and at least one second shock absorbing member 250. There is a distance between the first shock absorbing member 240 and the second shock absorbing member 250 in the vertical direction. The first shock absorbing member 240 and the second shock absorbing member 250 may be located at different heights of the column assembly 200 respectively. The carrying device 300 is located between the first shock absorbing member 240 and the second shock absorbing member 250.

When ascending or descending relative to the column assembly 200, the carrying device 300 is likely to rigidly collide with a top end of the column assembly 200 or the movable chassis 100, thereby affecting the stability of the transport robot.

In view of this, in this application, at least one first shock absorbing member 240 and at least one second shock absorbing member 250 are arranged. There is a distance between the first shock absorbing member 240 and the second shock absorbing member 250 in the vertical direction, and the first shock absorbing member 240 and the second shock absorbing member 250 are located at different heights of the column assembly 200 respectively. The carrying device 300 is located between the first shock absorbing member 240 and the second shock absorbing member 250. In this way, when ascending or descending relative to the column assembly 200, the carrying device 300 abuts against the first shock absorbing member 240 and the second shock absorbing member 250 respectively. Therefore, when moving upward or downward, the carrying device 300 does not rigidly collide with the column assembly 200 of the support or the movable chassis 100, thereby improving the stability of the transport robot.

In order to ensure that the carrying device 300 has the largest moving stroke during the ascending or descending, the first shock absorbing member 240 may be located at the second end 200b of the column assembly or close to the second end 200b of the column assembly, and the second shock absorbing member 250 may be located at the first end 200a of the column assembly or close to the first end 200a of the column assembly, or the second shock absorbing member 250 may be located on the movable chassis 100. The first shock absorbing member 240 and the second shock absorbing member 250 are located on the same vertical line.

The remaining structures in this application are the same as those of Embodiment 10, and reference may be made to Embodiment 10. Details are not described herein again.

Embodiment 12

Referring to FIG. 72 to FIG. 82, the transport robot provided in this application includes a movable chassis 100, a driving assembly 400, a column assembly 200, a carrying device 300, and at least one guide assembly 50.

A first end of the column assembly 200 is connected to the movable chassis 100. The column assembly 200 extends along a vertical direction, and is connected to the carrying device 300 in a rolling manner by the guide assembly 50. The carrying device 300 is configured to move relative to the column assembly 200 along the vertical direction. The guide assembly 50 is configured to guide the carrying device 300 during the movement.

In a specific implementation, the movable chassis 100 may include a base plate 110, a driving wheel assembly 120, and a driven wheel assembly 130. Both the column assembly 200 and the driving assembly 400 may be connected to the base plate 110, or the driving assembly 400 and the carrying device 300 are connected to the column assembly 200. The column assembly 200 is connected to the base plate 110. The column assembly 200 extends upward from the base plate 110 along the vertical direction. An extending direction of the column assembly 200, that is the vertical direction, may also be referred to as a height direction of the transport robot (that is, a Z direction in FIG. 74). The column assembly 200, the carrying device 300, and the driving assembly 400 are supported by the base plate 110, and the base plate 110 is driven to move by the driving wheel assembly 120, so that the transport robot moves on the ground.

The transport robot may further include a plurality of storage racks 600, and the storage racks 600 are the same as those of the foregoing embodiment. Details are not described herein again.

In this application, the driving assembly 400 is connected to the carrying device 300, and the carrying device 300 is driven by the driving assembly 400 to move relative to the column assembly 200 along the vertical direction (that is, the carrying device 300 ascends or descends relative to the column assembly 200). However, when the carrying device 300 moves, the stability is poor, and shaking is likely to occur. Therefore, in this application, the column assembly 200 is connected to the carrying device 300 in a rolling manner by the guide assembly 50. In this way, the shaking of the carrying device 300 is reduced, the stability of the carrying device 300 during the movement is improved, and the abnormal noise generated during the use of the transport robot is reduced.

In this application, the guide assembly 50 includes a sliding groove 51 and a guide wheel set 52 inserted in the sliding groove 51. The sliding groove 51 is located on the column assembly 200, and extends along the vertical direction. The guide wheel set 52 is connected to the carrying device 300, and configured to roll along an extending direction of the sliding groove 51.

Specifically, the guide wheel set 52 includes a guide rod 5201 and at least one first guide wheel 5202. The guide wheel set 52 may further include at least one pair of second guide wheels 5203. The guide rod 5201 is connected to the carrying device 300. The at least one first guide wheel 5202 and the at least one pair of second guide wheels 5203 are connected to the guide rod 5201, and the at least one first guide wheel 5202 and the at least one pair of second guide wheels 5203 are configured to rotate relative to the guide rod 5201. The at least one first guide wheels 5202 and the at least one pair of second guide wheels 5203 are located in a sliding groove 51. At least one first guide wheel 5202 and/or at least one second guide wheel 5203 are configured to abut against inner walls of the sliding groove 51. Each of the at least one first guide wheel 5202 may abut against a same inner wall or different inner walls of the sliding groove 51. Each second guide wheel 5203 may also abut against a same inner wall or different inner walls of the sliding groove 51. The first guide wheel 5202 and the second guide wheel 5203 are configured to abut against different inner walls of the sliding groove 51 respectively.

The guide rod 5201 is configured to support the at least one first guide wheel 5202 and the at least one pair of second guide wheels 5203. A wheel surface of the at least one first guide wheel 5202 and/or a wheel surface of the at least one pair of second guide wheels 5203 are configured to abut against different inner walls of the sliding groove 51 respectively, so as to reduce the shaking during the movement of the carrying device 300.

In this application, there is an included angle between an axis of each first guide wheel 5202 and an axis of each second guide wheel 5203, and there is an included angle between the axis of each first guide wheel 5202 and the extending direction of the sliding groove 51, and there is an included angle between the axis of each second guide wheel 5203 and the extending direction of the sliding groove 51 respectively. In this way, it is ensured that the wheel surface of each first guide wheel 5202 and the wheel surface of each second guide wheel 5203 are configured to abut against different inner walls of the sliding groove 51 respectively.

Optionally, the axis of each first guide wheel 5202 and the axis of each second guide wheel 5203 may be perpendicular to each other, and the axis of each first guide wheel 5202 and the axis of each second guide wheel 5203 are perpendicular to the extending direction of the sliding groove 51. In this way, wheel surfaces of each first guide wheels 5202 and each second guide wheel 5203 do not affect each other. The axis of each first guide wheel 5202 is along an X direction in FIG. 7, the axis of each second guide wheel 5203 is along a Y direction in FIG. 8, and the extending direction of the sliding groove 51 is along a Z direction in FIG. 77.

The carrying device 300 includes at least one connection member 310, arranged in a one-to-one correspondence with the guide assembly 51. The guide rod 5201 includes a guide rod body 5204 and at least one extension portion 5205 arranged on the guide rod body 5204. The at least one pair of second guide wheels 5203 are rotatably connected to the extension portion 5205. The at least one first guide wheel 5202 is rotatably connected to the guide rod body 5204. The guide rod body 5204 is connected to the connection member 310.

Specifically, the guide rod body 5204 extends along the vertical direction, the extension portion 5205 is perpendicular to the guide rod body 5204, and two opposite sides of the extension portion 5205 are connected to the at least one pair of second guide wheels 5203.

Positions of the at least one first guide wheels 5202 and the at least one pair of second guide wheels 5203 in the guide wheel set 52 are described below with reference to the column assembly 200.

The column assembly 200 includes a fixed column frame 210 and a movable column frame 220. The sliding groove 51 is located on the movable column frame 220. A first end 210a of the fixed column frame is fixedly connected to the movable chassis 100, and the fixed column frame 210 extends toward the vertical direction. The movable column frame 220 is connected to the fixed column frame 210. The carrying device 300 is connected to the movable column frame 220 and configured to move relative to the movable column frame 220 along the vertical direction.

Optionally, the movable column frame 220 is configured to move relative to the fixed column frame 210 along the vertical direction. In this way, the column assembly 200 can extend or retract, which facilitates the carrying device 300 to carry goods at a relatively high position or store goods at a relatively high position.

In some embodiments, the driving assembly 400 may be connected to the movable column frame 220, and is configured to drive the movable column frame 220 to move along the extending direction of the fixed column frame 210. That is, the movable column frame 220 can move upward or downward relative to the fixed column frame 210 along the vertical direction, so that the column assembly 200 can extend or retract. In some other embodiments, the driving assembly 400 is configured to drive the carrying device 300 to move relative to the movable column frame 220. When the carrying device 300 moves to a top end of the movable column frame 220, the driving assembly 400 drives the movable column frame 220 to move along the extending direction of the fixed column frame 210 through the carrying device 300.

In this application, the fixed column frame 210 includes a first fixed column 211 and a second fixed column 212 that are fixedly connected to the movable chassis 100.

The movable column frame 220 includes a first movable column 221 and a second movable column 222. The first movable column 221 is connected to the first fixed column 211. The second movable column 222 is connected to the second fixed column 212. The first movable column 221 and the second movable column 222 are provided with a sliding groove 51 respectively.

The first movable column 221 may be slidably connected to the first fixed column 211 through the sliding grooves and a slider. The first movable column 221 may also be connected to the first fixed column 211 in a rolling manner by the guide wheel set 52. The second movable column 222 may be slidably connected to the second fixed column 212 through the sliding grooves and the slider. The second movable column 222 may also be connected to the second fixed column 212 in a rolling manner by the guide wheel set 52. This is not limited in this embodiment.

In this embodiment, the carrying device 300 is located between the first movable column 221 and the second movable column 222, and two opposite sides of the carrying device 300 are connected to the first movable column 221 and the second movable column 222 in a rolling manner by different guide assemblies 50 respectively.

Specifically, at least one connection member 310 is arranged on the two opposite sides of the carrying device 300 respectively, and the connection member 310 at a first side 300a of the carrying device is connected to the guide rod body 5204 in the guide wheel set 52 in the sliding groove 51 of the first movable column 221. Correspondingly, the connection member 310 at a second side of the carrying device is connected to the guide rod body 5204 in the guide wheel set 52 in the sliding groove 51 of the second movable column 222. In this way, the carrying device 300 is firmly connected, and the stability of the carrying device 300 when moving relative to the movable column frame 220 is maintained.

The structure of a rolling connection between the carrying device 300 and the first movable column 221 is the same as that of a rolling connection between the carrying device 300 and the second movable column 222. For the convenience of description, an example in which the connection member 310 at the first side 300a of the carrying device is connected to the guide rod body 5204 in the guide wheel set 52 in the sliding groove 51 of the first movable column 221 is used for description in this embodiment and the accompanying drawings.

In this application, the sliding groove 51 may include a first accommodating section 5101 and a second accommodating section 5102 that extend along the extending direction of the sliding groove 51. The first accommodating section 5101 is in communication with the second accommodating section 5102, and a width of the second accommodating section 5102 (that is, a length in a Y direction in FIG. 79) is less than a width of the first accommodating section 5101. That is, a cross section of the sliding groove 51 is in a convex shape. The at least one first guide wheel 5202 and the at least one pair of second guide wheels 5203 are located in the first accommodating section 5101. The guide rod body 5204 is located in the second accommodating section 5102. The extension portion 5205 extends into the first accommodating section 5101. In this way, the at least one first guide wheel 5202 and at least one pair of second guide wheels 5203 are limited to be within the first accommodating section 5101.

The wheel surface of the at least one first guide wheel 5202 is configured to abut against two opposite first side surfaces 5206 of the first accommodating section 5101; and/or the wheel surface of the at least one pair of second guide wheels 5203 are configured to abut against two opposite second side surfaces 5207 of the first accommodating section 5101.

Referring to FIG. 72 to FIG. 84, in some embodiments, at least one limiting member 230 is arranged at an upper part of the column assembly 200. The connection member 310 is provided with at least one notch 311, arranged in a one-to-one correspondence with the limiting member 230. When the carrying device 300 moves to a second end of the column assembly 200, the notch 311 abuts against the limiting member 230.

In a specific implementation, the notch 311 may be in fit with the limiting member 230. For example, when the limiting member 230 is a rectangle, the notch 311 is a rectangular notch in fit with the limiting member 230. When the carrying device 300 moves to the upper part of the column assembly 200, the notch 311 abuts against the limiting member 230, so as to prevent the carrying device 300 from moving out of the column assembly 200. The limiting member 230 may also be one of a spring, a silicon piece, or a rubber piece.

In order to avoid the impact of the carrying device 300 on the column assembly 200, in some embodiments, at least one shock absorbing member 240 is arranged on the column assembly 200. When the notch 311 abuts against the limiting member 230, the connection member 310 abuts against the shock absorbing member 240, and the shock absorbing member 240 buffers the impact of the carrying device 300 on the column assembly 200.

In a specific implementation, the shock absorbing member 240 may be located at an upper part of the column assembly 200, or the shock absorbing member 240 is located at the second end of the column assembly 200. The shock absorbing member 240 is a shock absorber. It can be understood that, the shock absorbing member 240 may alternatively be one of a spring, a silicon piece, or a rubber piece, which is not limited in this embodiment.

In some embodiments, the shock absorbing member 240 is located in the sliding groove 51, and the limiting member 230 is located at two opposite sides of the sliding groove 51 respectively.

In this application, a shock absorbing member 240 is arranged in the sliding groove 51 of the first movable column 221 and in the sliding groove 51 of the second movable column 222 respectively. In this way, the impact of the carrying device 300 on the column assembly 200 is balanced.

The fixed column frame 210 may include a fixed beam 213. A first end of the first fixed column 211 and a first end of the second fixed column 212 are fixedly connected to the movable chassis 100. The first fixed column 211 and the second fixed column 212 are also connected by the fixed beam 213. A second end of the first fixed column 211 and a second end of the second fixed column 212 (that is, a second end 210b of the fixed column frame) may be connected by the fixed beam 213, or the fixed beam 213 is connected to a position close to the second end of the first fixed column 211 and the second end of the second fixed column 212. The first fixed column 211 and the second fixed column 212 are perpendicular to the movable chassis 100, the fixed beam 213 is perpendicular to the first fixed column 211, and the fixed beam 213 is perpendicular to the second fixed column 212. A support base 214 is arranged on the fixed column frame 210, and the driving assembly 400 is connected to the support base 214.

In this application, an indicator light 900 and/or a wireless module 1000 are further included. The indicator light 900 is configured to indicate a working state of the transport robot, and the wireless module 1000 is used for communication.

Specifically, the structures of the wireless module 1000 and the indicator light 900 are the same as those of Embodiment 8. Details are not described herein again.

In some embodiments, the vertical support further includes a detection module 700 and a control module (not shown). The structures of the detection module 700 and the control module are the same as those of Embodiment 8. Details are not described herein again.

In the transport robot provided in this application, the driving assembly 400 includes a retractable assembly 410 and at least one set of traction assembly 420. The structures of the retractable assembly 410 and the traction assembly 420 are the same as those of Embodiment 8. Details are not described herein again.

It should be noted that, in this application, names of some components in the embodiments are the same, but numbers of the components are different, and correspond to different positions in the accompanying drawings, which should be particularly understood with reference to the accompanying drawings in the embodiments and the descriptions corresponding to the accompanying drawings.

Finally, it should be noted that the foregoing embodiments are merely used for describing the technical solutions of this application, but are not intended to limit this application. Although this application is described in detail with reference to the foregoing embodiments, a person of ordinary skill in the art should understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of this application.

What is claimed is:

1. A method for controlling a transport robot, wherein the transport robot comprises:
a vertical support,
a driving assembly; and
a carrying device, wherein the vertical support comprises a fixed column frame and a movable column frame, the carrying device is movably arranged on the movable column frame, the movable column frame is movably arranged on the fixed column frame, and the carrying device is configured to carry goods, the driving assembly comprises a traction assembly and a retractable assembly connected to the traction assembly, the traction assembly is connected to the carrying device, the retractable assembly is arranged on the fixed column frame; the retractable assembly is configured to drive, through the traction assembly, at least one of: the carrying device to move relative to the movable column frame, and the movable column frame to move relative to the fixed column frame; the traction assembly comprises two sets of traction assemblies located at two opposed sides of the carrying device respectively, the retractable assembly is configured to drive the two sets of the traction assemblies to synchronously drive the carrying device to ascend or descend; the method comprises:
receiving a movement instruction; and
driving, according to the movement instruction, at least one of: the carrying device to move relative to the movable column frame; and the movable column frame to move relative to the fixed column frame;
wherein the driving, according to the movement instruction, the carrying device to move relative to the movable column frame and/or the movable column frame to move relative to the fixed column frame comprises:
obtaining a first specified ascending height according to a first ascending instruction comprised in the movement instruction;
driving the carrying device to move upward relative to the movable column frame;
when the carrying device moves to the first specified ascending height before the carrying device moves to a top of the movable column frame, stopping lifting the carrying device; and when the carrying device has not moved to the first specified ascending height after the carrying device moves to the top of the movable column frame, driving the carrying device and the movable column frame to simultaneously move upward relative to the fixed column frame until the carrying device reaches the first specified ascending height.

2. The method according to claim 1, wherein the driving, according to the movement instruction, the carrying device to move relative to the movable column frame and/or the movable column frame to move relative to the fixed column frame further comprises one of:

obtaining a first specified descending height according to a first descending instruction comprised in the movement instruction; driving the carrying device and the movable column frame to simultaneously move downward relative to the fixed column frame; controlling, when the carrying device descends to the first specified descending height before the movable column frame moves to a bottom of the fixed column frame, the movable column frame and the carrying device to stop moving; and controlling, when the carrying device has not descended to the first specified descending height after the movable column frame moves to the bottom of the fixed column frame, the carrying device to move downward relative to the movable column frame until the carrying device moves to the first specified descending height;

obtaining a second specified descending height according to a second descending instruction the movement instruction; driving the carrying device to move downward relative to the movable column frame first, then driving the movable column frame to move downward relative to the fixed column frame, and stopping descending when the carrying device moves to the second specified descending height before the carrying device moves to a bottom of the movable column frame; or driving, when the carrying device has not moved to the second specified descending height after the carrying device moves to the bottom of the movable column frame, the movable column frame and the carrying device to synchronously descend until the carrying device reaches the second descending height; and obtaining a third specified descending height according to a third descending instruction the movement instruction; driving the movable column frame to move downward relative to the fixed column frame first, then driving the carrying device to move downward relative to the movable column frame, and stopping descending when the carrying device moves to the third specified descending height before the carrying device moves to a bottom of the movable column frame; or driving, when the carrying device has not moved to the third specified descending height after the carrying device moves to the bottom of the movable column frame, the movable column frame and the carrying device to synchronously descend until the carrying device reaches the third descending height.

3. A vertical support for a transport robot, wherein the transport robot comprises a chassis and a carrying device; the vertical support comprises:

a column assembly, configured to mount the carrying device; the column assembly comprises a fixed column frame and a movable column frame, one end of the fixed column frame is configured to be mounted on the chassis of the transport robot; the movable column frame is mounted on the fixed column frame, and the movable column frame is capable of ascending or descending relative to the fixed column frame within a preset stroke; and a driving assembly, comprising a traction assembly and a retractable assembly connected to the traction assembly, the traction assembly is connected to the carrying device, the retractable assembly is arranged on the fixed column frame; the retractable assembly is configured to drive, through the traction assembly, at least one of: the carrying device to move relative to the movable column frame, and the movable column frame to move relative to the fixed column frame;

wherein the traction assembly comprises two sets of traction assemblies located at two opposed sides of the carrying device respectively, the retractable assembly is configured to drive the two sets of the traction assemblies to synchronously drive the carrying device to ascend or descend;

the vertical support further comprising a guide structure; wherein the guide structure comprises a second guide assembly;

the second guide assembly comprises a second sliding groove and a second guide wheel set, the second sliding groove extends along the vertical direction, the second guide wheel set is located in the second sliding groove and configured to move along an extending direction of the second sliding groove, the second sliding groove is located on one of the fixed column frame and the movable column frame, and the second guide wheel set is located on the other;

wherein the second guide wheel set is configured to abut against different inner walls of the second sliding groove.

4. The vertical support according to claim 3, wherein the traction assembly comprises a traction rope and a guide wheel set; one end of the traction rope winds around the guide wheel set and is tied to the retractable assembly, and the other end of the traction rope is tied to the carrying device;

the retractable assembly comprises a spool, a transmission shaft, a speed control box, and a motor; the spool is configured to wind the traction rope; an output shaft of the motor is connected to an input end of the speed control box, and the transmission shaft is mounted at an output end of the speed control box, and is configured to drive the spool to rotate;

the spool comprises two spools, and one of the spools is connected to one end of the transmission shaft, the other one of the spools is connected to the other one end of the transmission shaft.

5. The vertical support according to claim 3, wherein the second guide assembly further comprises at least one third guide wheel set configured to abut against different side walls of the movable column frame;

the at least one third guide wheel set is located at an upper part of the fixed column frame, the second guide wheel set is fixed to a lower part of the movable column frame; and the second guide wheel set and the third guide wheel set are located on different side walls of the movable column frame respectively.

6. The vertical support according to claim 5, wherein the second guide wheel set comprises a guide base frame and at least one pair of third guide wheels, the guide base frame is connected to the movable column frame, the at least one pair of third guide wheels are rotatably arranged on the guide base frame, and wheel surfaces of at least one pair of third guide wheels are configured to abut against inner walls of the second sliding groove;

wherein the second guide wheel set further comprises at least one pair of fourth guide wheels, rotatably arranged on the guide base frame, wheel surfaces of at least one pair of fourth guide wheels are configured to abut against inner walls of the second sliding groove, and the wheel surfaces of the at least one pair of third guide wheels and the wheel surfaces of the at least one pair of fourth guide wheels are configured to abut against different inner walls of the second sliding groove respectively;

wherein there is an included angle between an axis of each third guide wheel and an axis of each fourth guide wheel, and there is an included angle between the axis of each third guide wheel and the extending direction of the second sliding groove, and between the axis of each fourth guide wheel and the extending direction of the second sliding groove respectively.

7. The vertical support according to claim 6, wherein at least one support portion is arranged at opposite edges of the guide base frame respectively, and the at least one pair of third guide wheels are arranged at an outer side of the support portion; or at least two extension portions are arranged on the guide base frame that extend toward opposite outer sides of the guide base frame respectively, and the at least one pair of fourth guide wheels are arranged on the extension portions;

wherein the extension portions and support portions are located at the same two opposite sides of the guide base frame, and the extension portions are located between the support portions at the same side of the guide base frame.

8. The vertical support according to claim 6, wherein the second sliding groove comprises a third accommodating section extending along the extending direction of the second sliding groove, and the third accommodating section comprises two opposite first sliding groove side walls and two opposite second sliding groove side walls; and the second guide wheel set is located in the third accommodating section, the at least one pair of third guide wheels are located between the two first sliding groove side walls, and wheel surfaces of the at least one pair of fourth guide wheels are configured to abut against the two second sliding groove side walls respectively;

wherein the fixed column frame comprises a first fixed column and a second fixed column that are connected to the chassis and provided with the second sliding groove respectively; and the movable column frame comprises a first movable column and a second movable column, and the second guide wheel set is arranged on the first fixed column or the second fixed column;

wherein the second sliding groove further comprises a fourth accommodating section extending along the extending direction of the second sliding groove; a width of the fourth accommodating section is less than a width of the third accommodating section, and the fourth accommodating section is in communication with the third accommodating section; and both the first movable column and the second movable column comprise a body, the body is located in the fourth accommodating section, and a part of the body extends into the third accommodating section and is connected to the guide base frame.

9. The vertical support according to claim 8, wherein the at least one third guide wheel set comprises at least one fifth guide wheel, the at least one fifth guide wheel is rotatably arranged on the fixed column frame; a part of the at least one fifth guide wheel extends into the fourth accommodating section, and a wheel surface of the at least one fifth guide wheel is configured to abut against a side wall of the body;

the at least one third guide wheel set further comprises at least one sixth guide wheel, rotatably arranged on the fixed column frame, a part of the at least one sixth guide wheel extends into the fourth accommodating section, and a wheel surface of the at least one sixth guide wheel is configured to abut against the side wall of the body.

10. The vertical support according to claim 9, wherein the body comprises a guide groove extending along the vertical direction, the at least one sixth guide wheel is located in the guide groove, and configured to abut against opposite inner side walls of the guide groove, and/or the at least one fifth guide wheel is configured to abut against a bottom wall of the guide groove.

11. The vertical support according to claim 8, further comprising a second shock absorbing member, fixedly connected to the fixed column frame or the chassis, a shock absorbing surface of the second shock absorbing member faces the second guide wheel set;

wherein an abutting portion is arranged on the guide base frame, the second shock absorbing member is located in the third accommodating section, and the abutting portion is configured to abut against the second shock absorbing member.

12. A transport robot, comprising:

a vertical support, comprising a fixed column frame and a movable column frame movably arranged on the fixed column frame;

a carrying device, movably arranged on the movable column frame; and a driving assembly, comprising a traction assembly and a retractable assembly connected to the traction assembly; the traction assembly is connected to the carrying device, and the retractable assembly is arranged on the fixed column frame;

wherein the traction assembly comprises two sets of traction assemblies located at two opposed sides of the carrying device respectively; the retractable assembly is configured to drive the two sets of the traction assemblies to synchronously drive at least one of the carrying device and the movable column frame to ascend or descend;

wherein the retractable assembly is configured to:

drive the carrying device to move upward relative to the movable column frame;

when the carrying device moves to a first specified ascending height before the carrying device moves to a top of the movable column frame, stop lifting the carrying device; and when the carrying device has not moved to the first specified ascending height after the carrying device moves to the top of the movable column frame, drive the carrying device and the movable column frame to simultaneously move upward relative to the fixed column frame until the carrying device reaches the first specified ascending height.

13. The transport robot according to claim 12, wherein the traction assembly comprises a traction rope and a guide wheel set; one end of the traction rope winds around the guide wheel set and is tied to the retractable assembly, and the other end of the traction rope is tied to the carrying device;

the retractable assembly comprises a spool, a transmission shaft, a speed control box, and a motor; the spool is configured to wind the traction rope; an output shaft of the motor is connected to an input end of the speed control box, and the transmission shaft is mounted at an output end of the speed control box, and is configured to drive the spool to rotate;

the spool comprises two spools, and one of the spools is connected to one end of the transmission shaft, the other one of the spools is connected to the other one end of the transmission shaft.

14. The transport robot according to claim 12, further comprising a guide structure; wherein the guide structure comprises a second guide assembly;

the second guide assembly comprises a second sliding groove and a second guide wheel set, the second sliding groove extends along the vertical direction, the second guide wheel set is located in the second sliding groove and configured to move along an extending direction of the second sliding groove, the second sliding groove is located on one of the fixed column frame and the movable column frame, and the second guide wheel set is located on the other;

wherein the second guide wheel set is configured to abut against different inner walls of the second sliding groove.

15. The transport robot according to claim 14, wherein the second guide assembly further comprises at least one third guide wheel set configured to abut against different side walls of the movable column frame;

the at least one third guide wheel set is located at an upper part of the fixed column frame, the second guide wheel set is fixed to a lower part of the movable column frame; and the second guide wheel set and the third guide wheel set are located on different side walls of the movable column frame respectively.

16. The transport robot according to claim 15, wherein the second guide wheel set comprises a guide base frame and at least one pair of third guide wheels, the guide base frame is connected to the movable column frame, the at least one pair of third guide wheels are rotatably arranged on the guide base frame, and wheel surfaces of at least one pair of third guide wheels are configured to abut against inner walls of the second sliding groove;

wherein the second guide wheel set further comprises at least one pair of fourth guide wheels, rotatably arranged on the guide base frame, wheel surfaces of at least one pair of fourth guide wheels are configured to abut against inner walls of the second sliding groove, and the wheel surfaces of the at least one pair of third guide wheels and the wheel surfaces of the at least one pair of fourth guide wheels are configured to abut against different inner walls of the second sliding groove respectively;

wherein there is an included angle between an axis of each third guide wheel and an axis of each fourth guide wheel, and there is an included angle between the axis of each third guide wheel and the extending direction of the second sliding groove, and between the axis of each fourth guide wheel and the extending direction of the second sliding groove respectively.

17. The transport robot according to claim 16, wherein the second sliding groove comprises a third accommodating section extending along the extending direction of the second sliding groove, and the third accommodating section comprises two opposite first sliding groove side walls and two opposite second sliding groove side walls; and the second guide wheel set is located in the third accommodating section, the at least one pair of third guide wheels are located between the two first sliding groove side walls, and wheel surfaces of the at least one pair of fourth guide wheels are configured to abut against the two second sliding groove side walls respectively;

wherein the fixed column frame comprises a first fixed column and a second fixed column that are connected to the chassis and provided with the second sliding groove respectively; and the movable column frame comprises a first movable column and a second movable column, and the second guide wheel set is arranged on the first fixed column or the second fixed column;

wherein the second sliding groove further comprises a fourth accommodating section extending along the extending direction of the second sliding groove; a width of the fourth accommodating section is less than a width of the third accommodating section, and the fourth accommodating section is in communication with the third accommodating section; and both the first movable column and the second movable column comprise a body, the body is located in the fourth accommodating section, and a part of the body extends into the third accommodating section and is connected to the guide base frame.

18. The transport robot according to claim 17, wherein the at least one third guide wheel set comprises at least one fifth guide wheel, the at least one fifth guide wheel is rotatably arranged on the fixed column frame; a part of the at least one fifth guide wheel extends into the fourth accommodating section, and a wheel surface of the at least one fifth guide wheel is configured to abut against a side wall of the body;

the at least one third guide wheel set further comprises at least one sixth guide wheel, rotatably arranged on the fixed column frame, a part of the at least one sixth guide wheel extends into the fourth accommodating section, and a wheel surface of the at least one sixth guide wheel is configured to abut against the side wall of the body.

19. The vertical support according to claim 3, wherein the retractable assembly is configured to:

drive the carrying device to move upward relative to the movable column frame;

when the carrying device moves to a first specified ascending height before the carrying device moves to a top of the movable column frame, stop lifting the carrying device; and when the carrying device has not moved to the first specified ascending height after the carrying device moves to the top of the movable column frame, drive the carrying device and the movable column frame to simultaneously move upward relative to the fixed column frame until the carrying device reaches the first specified ascending height.

* * * * *